(12) United States Patent
Gholmieh et al.

(10) Patent No.: US 9,807,144 B2
(45) Date of Patent: Oct. 31, 2017

(54) FURTHER DEVICE TIMING ADJUSTMENTS AND METHODS FOR SUPPORTING DASH OVER BROADCAST

(71) Applicant: QUALCOMM Incorporated, San Diego, CA (US)

(72) Inventors: Ralph Akram Gholmieh, San Diego, CA (US); Osama Lotfallah, San Diego, CA (US); Carlos Marcelo Dias Pazos, Carlsbad, CA (US); Nagaraju Naik, San Diego, CA (US); Nagaraja Shivashankar, San Diego, CA (US); Nermeen Ahmed Bassiouny, San Diego, CA (US); Thadi Manjunath Nagaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/812,461

(22) Filed: Jul. 29, 2015

(65) Prior Publication Data
US 2016/0308928 A1 Oct. 20, 2016

Related U.S. Application Data

(60) Provisional application No. 62/149,776, filed on Apr. 20, 2015.

(51) Int. Cl.
*H04L 29/08* (2006.01)
*H04L 29/06* (2006.01)
(Continued)

(52) U.S. Cl.
CPC ............ *H04L 67/02* (2013.01); *H04L 47/283* (2013.01); *H04L 65/4076* (2013.01);
(Continued)

(58) Field of Classification Search
USPC ......................... 709/219, 217, 231, 230, 250
See application file for complete search history.

(56) References Cited

U.S. PATENT DOCUMENTS 9,706,572 B2 * 7/2017 Bhushan ................ H04W 74/08
2006/0059256 A1 * 3/2006 Kakani ................. H04L 1/1671
709/224
(Continued)

FOREIGN PATENT DOCUMENTS

WO 2014076052 A1 5/2014
WO 2014121857 A1 8/2014

OTHER PUBLICATIONS

3GPP Draft; DASH-AVC-264-Live-Services-V0.5, 3rd Generation Partnership Project (3GPP), Mobile Competence Centre ; 650, Route Des Lucioles ; F-06921 Sophia-Antipolis Cedex ; France Aug. 5, 2014, KP050839847, Retrieved from the Internet: URL:http://www.3gpp.org/ftp/tsg_sa/WG4_COD EC/TSGS4_80/Docs/ [retrieved on Aug. 8, 2014].
(Continued)

*Primary Examiner* — Jude Jean Gilles
(74) *Attorney, Agent, or Firm* — The Marbury Law Group, PLLC

(57) ABSTRACT

Systems, methods, and devices of the various embodiments enable a receiver device to use a modified segment availability time. In various embodiments, a receiver device may be enabled to modify availability start times for segments in a segment availability timeline, such as a Media Presentation Description (MPD), to account for the actual times when segments will be available to a DASH client.

29 Claims, 40 Drawing Sheets

(51) Int. Cl.
  *H04N 21/24* (2011.01)
  *H04N 21/262* (2011.01)
  *H04N 21/442* (2011.01)
  *H04N 21/6377* (2011.01)
  *H04N 21/845* (2011.01)
  *H04L 12/841* (2013.01)
  *H04L 29/14* (2006.01)

(52) U.S. Cl.
  CPC .......... *H04L 65/601* (2013.01); *H04L 65/602* (2013.01); *H04L 65/608* (2013.01); *H04L 67/04* (2013.01); *H04L 67/32* (2013.01); *H04L 67/325* (2013.01); *H04L 69/28* (2013.01); *H04L 69/40* (2013.01); *H04N 21/2402* (2013.01); *H04N 21/2407* (2013.01); *H04N 21/2408* (2013.01); *H04N 21/26258* (2013.01); *H04N 21/44209* (2013.01); *H04N 21/6377* (2013.01); *H04N 21/8456* (2013.01)

(56) References Cited

U.S. PATENT DOCUMENTS

| | | | |
|---|---|---|---|
| 2006/0234684 A1* | 10/2006 | Shin | H04L 65/607 455/414.1 |
| 2007/0101394 A1* | 5/2007 | Fu | G11B 27/105 725/134 |
| 2007/0291692 A1* | 12/2007 | Choi | H04W 72/087 370/330 |
| 2013/0030873 A1* | 1/2013 | Davidson | G06Q 10/06 705/7.36 |
| 2013/0036234 A1* | 2/2013 | Pazos | H04L 12/189 709/231 |
| 2013/0198335 A1* | 8/2013 | Goel | H04N 21/234336 709/219 |
| 2014/0040970 A1* | 2/2014 | Alexander | H04L 67/141 725/116 |
| 2014/0189052 A1 | 7/2014 | Gholmieh et al. | |
| 2014/0189066 A1 | 7/2014 | Gholmieh et al. | |
| 2014/0195651 A1 | 7/2014 | Stockhammer et al. | |
| 2014/0317306 A1 | 10/2014 | Giladi | |
| 2015/0172066 A1* | 6/2015 | Gholmieh | H04L 12/189 370/312 |
| 2015/0172340 A1 | 6/2015 | Lohmar et al. | |
| 2015/0373074 A1* | 12/2015 | Lohmar | H04L 65/4076 709/219 |
| 2016/0198220 A1* | 7/2016 | Yamagishi | H04N 21/2343 725/94 |
| 2016/0204887 A1* | 7/2016 | Lee | H04H 20/71 375/295 |
| 2016/0218883 A1* | 7/2016 | Lee | H04L 67/06 |
| 2016/0308927 A1 | 10/2016 | Gholmieh et al. | |
| 2016/0308934 A1 | 10/2016 | Gholmieh et al. | |

OTHER PUBLICATIONS

International Search Report and Written Opinion—PCT/US2016/019768—ISA/EPO—May 3, 2016.

ISO/IEC 23009-1: "Information technology—Dynamic adaptive streaming over HTTP (DASH)—Part 1: Media presentation description and segment formats," Technologies de l'information—Diffusion en flux adaptatif dynamique sur HTTP (DASH)—Part 1: Description of the presentation and delivery of media formats, ISO/IEC 23009-1 International Standard, First Edition, Apr. 1, 2012, pp. I-VI, 1-126, XP002712145, paragraph A.7-A.9 paragraph [OA.4].

Mazhar K., "Compliance Procedures for Dynamic Adaptive Streaming over HTTP (DASH)," 2011, 87 Pages.

* cited by examiner

```xml
<?xml version="1.0" encoding="UTF-8"?>
<MPD xmlns="urn:mpeg:dash:schema:mpd:2011" profiles="urn:mpeg:dash:profile:isoff-live:2011" type="dynamic" availabilityStartTime="2014-11-17T14:00:00" minBufferTime="PT8S" minimumUpdatePeriod="PT1S">
<Period id="1" start="PT0S">
<AdaptationSet id="1" bitstreamSwitching="true" segmentAlignment="true">
<SegmentTemplate startNumber="1" timescale="1000" duration="1000" initialization="video$Bandwidth$/$RepresentationID$/init.mp4" media="video$Bandwidth$/$RepresentationID$/chunk_$Number$.mp4" />
<Representation id="0" bandwidth="150000" mimeType="video/mp4" startWithSAP="1" width="640" height="360" frameRate="30000/1000" scanType="progressive" codecs="avc1.4d401e" />
</AdaptationSet>
<AdaptationSet id="2" segmentAlignment="true">
<SegmentTemplate startNumber="1" timescale="1000" duration="1000" initialization="audio$Bandwidth$/$RepresentationID$/init.mp4" media="audio$Bandwidth$/$RepresentationID$/chunk_$Number$.mp4" />
<Representation id="0" bandwidth="40000" mimeType="audio/mp4" startWithSAP="1" codecs="mp4a.40.2">
<AudioChannelConfiguration schemeIdUri="urn:mpeg:dash:23003:3:audio_channel_configuration:2011" value="1" />
</Representation>
</AdaptationSet>
</Period>
<Period id="2" start="PT35.5S">
<AdaptationSet id="1" bitstreamSwitching="true" segmentAlignment="true">
<SegmentTemplate startNumber="40" timescale="1000" duration="1000" initialization="video$Bandwidth$/$RepresentationID$/init.mp4" media="video$Bandwidth$/$RepresentationID$/chunk_$Number$.mp4" />
<Representation id="0" bandwidth="150000" mimeType="video/mp4" startWithSAP="1" width="640" height="360" frameRate="30000/1000" scanType="progressive" codecs="avc1.4d401e" />
</AdaptationSet>
<AdaptationSet id="2" segmentAlignment="true">
<SegmentTemplate startNumber="40" timescale="1000" duration="1000" initialization="audio$Bandwidth$/$RepresentationID$/init.mp4" media="audio$Bandwidth$/$RepresentationID$/chunk_$Number$.mp4" />
<Representation id="0" bandwidth="40000" mimeType="audio/mp4" startWithSAP="1" codecs="mp4a.40.2">
<AudioChannelConfiguration schemeIdUri="urn:mpeg:dash:23003:3:audio_channel_configuration:2011" value="1" />
</Representation>
</AdaptationSet>
</Period>
</MPD>
```

FIG. 20

```xml
<?xml version="1.0" encoding="UTF-8"?>
<MPD xmlns="urn:mpeg:dash:schema:mpd:2011" profiles="urn:mpeg:dash:profile:isoff-live:2011" type="dynamic"
availabilityStartTime="2014-11-17T14:00:00" minBufferTime="PT8S" minimumUpdatePeriod="PT1S">
<Period id="1" start="PT0S">
<AdaptationSet id="1" bitstreamSwitching="true" segmentAlignment="true">
<Representation id="0" bandwidth="40000" mimeType="audio/mp4" startWithSAP="1" codecs="mp4a.40.2">
<SegmentTemplate startNumber="1" timescale="1000" duration="1000" initialization="audio$Bandwidth$/$RepresentationID$/init.mp4"
media="audio$Bandwidth$/$RepresentationID$/chunk_$Number$.mp4" />
</Representation>
<Representation id="1" bandwidth="30000" mimeType="audio/mp4" startWithSAP="1" codecs="mp4a.40.2">
<SegmentTemplate startNumber="1" timescale="1000" duration="2000" initialization="audio$Bandwidth$/$RepresentationID$/init.mp4"
media="audio$Bandwidth$/$RepresentationID$/chunk_$Number$.mp4" />
</Representation>
</AdaptationSet>
</Period>
<Period id="2" start="PT8S">
<AdaptationSet id="1" bitstreamSwitching="true" segmentAlignment="true">
<Representation id="1" bandwidth="30000" mimeType="audio/mp4" startWithSAP="1" codecs="mp4a.40.2">
<SegmentTemplate startNumber="9" timescale="1000" duration="1000" initialization="audio$Bandwidth$/$RepresentationID$/init.mp4"
media="audio$Bandwidth$/$RepresentationID$/chunk_$Number$.mp4" />
</Representation>
<Representation id="1" bandwidth="30000" mimeType="audio/mp4" startWithSAP="1" codecs="mp4a.40.2">
<SegmentTemplate startNumber="5" timescale="1000" duration="2000" initialization="audio$Bandwidth$/$RepresentationID$/init.mp4"
media="video$Bandwidth$/$RepresentationID$/chunk_$Number$.mp4" />
</Representation>
</AdaptationSet></Period>
</MPD>
```

FIG. 23

FURTHER DEVICE TIMING ADJUSTMENTS AND METHODS FOR SUPPORTING DASH OVER BROADCAST

RELATED APPLICATIONS

This application claims the benefit of priority to U.S. Provisional Patent Application No. 62/149,776 entitled "Further Device Timing Adjustments and Methods for Supporting DASH Over Broadcast" filed Apr. 20, 2015, the entire contents of which are hereby incorporated by reference.

BACKGROUND

Hypertext Transfer Protocol (HTTP) streaming is currently the most popular method of delivering content over the Internet. For live events, content is made available progressively through constant duration segments. The segment availability follows a timeline that indicates when each successive segment becomes available at the HTTP server.

Dynamic Adaptive Streaming Over Hypertext Transfer Protocol (DASH) is a standard that implements HTTP streaming DASH announces the segment availability in a Media Presentation Description (MPD). The MPD is a segment availability timeline that announces the segments, the times that segments are available, and the size of the segments.

In current systems, the MPD is provided to a receiver device via Over-the-Air (OTA) delivery. In the provided MPD, the segment availability start times may correspond to the encoder output times of the network side encoder generating the segments. Because the segment availability start times may correspond to the encoder output times, the availability start times may not account for differences in actual segment availability to a DASH client running on a receiver device, such as delivery path delays, receiver device processing delays, or receiver device clock drift. Thus, the announced availability start times in current MPDs may not correspond to the actual times when segments will be available to a DASH client.

SUMMARY

The systems, methods, and devices of the various embodiments enable a receiver device to use a modified segment availability time. In various embodiments, a receiver device may be enabled to modify availability start times for segments in a segment availability timeline, such as a Media Presentation Description (MPD), to account for the actual times when segments will be available to a DASH client.

In some embodiments, a method for accounting for actual times when segments will be available on a receiver device may include determining a receipt time of a transmission associated with a base segment, determining an adjusted availability start time of the base segment at the receiver device based at least in part on the receipt time of the transmission associated with the base segment, determining a delay adjustment at the receiver device as a difference between the adjusted availability start time of the base segment and an availability start time of the base segment in a segment availability timeline received at the receiver device, and storing the delay adjustment in memory of the receiver device.

In some embodiments, a method for accounting for actual times when segments will be available on a receiver device may include determining whether unicast fetch is active on a receiver device, receiving a file delivery table (FDT) via broadcast or multicast transmission on the receiver device, setting a segment associated with the received FDT as a base segment in response to receiving the FDT, determining a receipt time for the received FDT for the base segment, determining an adjusted availability start time of the base segment at the receiver device based at least in part on the receipt time of the received FDT for the base segment, determining a delay adjustment at the receiver device as a difference between the adjusted availability start time of the base segment and an availability start time of the base segment in a segment availability timeline received at the receiver device, and storing the delay adjustment in a memory of the receiver device.

Further embodiments may include a receiver device with a processor configured to perform operations of either method summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 20 is an example schema portion of a single segment duration MPD according to an embodiment.

FIG. 23 is an example schema portion of a two-segment duration MPD according to an embodiment.

DETAILED DESCRIPTION

Figure 1:
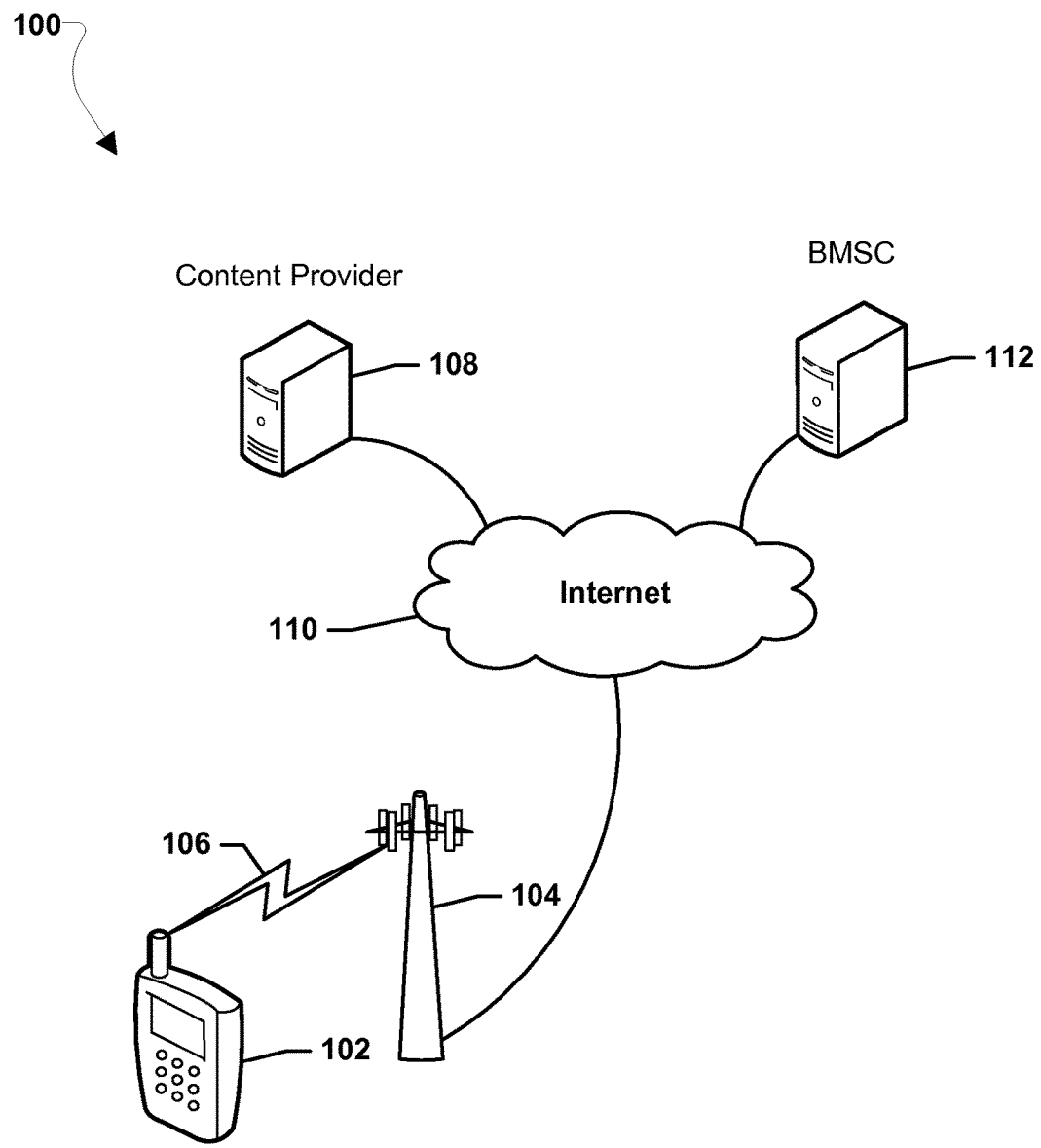
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments enable a receiver device to account for delays in the availability of data segments ("segment availability") in a data stream for use on the receiver device. In an embodiment, a receiver device may adjust the availability start times in a segment availability timeline received from a network (e.g., an Media Presentation Description (MPD) received Over-the-Air (OTA) from a Broadcast Multimedia Service Center (BMSC) server) to generate a modified MPD listing based on the actual times received segments will be available to applications/clients on the receiver device (e.g., a Dynamic Adaptive Streaming Over Hypertext Transfer Protocol (DASH) client retrieving segments for a media player application). Various embodiments may enable the modified MPD to be generated when the network and receiver device clocks are synchronized or unsynchronized.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, smart televisions, set-top boxes, digital video recorders (DVRs) and similar personal electronic devices which include a programmable processor and memory and circuitry for receiving an MPD and making the MPD available to a DASH client.

DASH is a standard that implements HTTP streaming DASH announces the segment availability in a MPD. The MPD is a segment availability timeline that announces the segments, the times segments are available, and the size of the segments. In current systems, the MPD is provided to a receiver device via OTA delivery. The Third Generation Partnership Project (3GPP) has standardized DASH over Download Delivery as a method to be used for providing HTTP streaming using broadcast over Long Term Evolution (LTE)(i.e., evolved Multimedia Broadcast Multicast Services (eMBMS)).

Various examples of different applications/clients, middleware, segment availability timelines, radio technologies, and transport protocols are discussed herein, specifically DASH clients, Multicast Service Device Clients (MS-DCs), MPDs, eMBMS, and HTTP. The discussions of DASH clients, Multicast Service Device Clients, MPDs, eMBMS, and HTTP are provided merely as examples to better illustrate the aspects of the various embodiments, and are not intended to limit the various embodiments in any way. Other applications/clients, middleware, segment availability timelines, radio technologies, and transport protocols may be used with the various embodiments, and the other applications/clients, middleware, segment availability timelines, radio technologies, and transport protocols may be substituted in the various examples without departing from the spirit or scope of the invention.

In an embodiment, a receiver device may determine a delay adjustment to account for delays in the availability of segments to a client application on the receiver device. In an embodiment, the delay adjustment may be provided in a delay adjustment message. A delay adjustment message may be parameter and/or indication of a delay adjustment, such as a file including a delay adjustment. In an embodiment, the delay adjustment message may enable a client application on the receiver device to modify the availability start times in a manifest file describing the segment availability, such as a segment availability timeline, received from a network (e.g., an MPD received OTA from a BMSC server) to generate a modified MPD listing based on the actual times received segments will be available to applications/clients on the receiver device (e.g., a DASH client retrieving segments for a media player application). While various embodiments may be discussed in terms of segment availability timelines and/or MPDs, segment availability timelines and/or MPDs are merely examples of manifest files describing the segment availability and any manifest file describing segment availability may be substituted in the various examples for the segment availability timelines and/or MPDs discussed herein. Various embodiments may enable the delay adjustment message and modified MPD to be generated when the network and receiver device clocks are synchronized or unsynchronized. In another embodiment, the delay adjustment message may enable a client application on the receiver device to adjust the timing of its requests for segments based on the actual times received segments will be available to applications/clients on the receiver device (e.g., a DASH client retrieving segments for a media player application) without modifying the segment availability timeline itself.

In various embodiments, a receiver device processor may monitor the segment index number or base Uniform Resource Identifier (URI) of segment fragments as segment fragments are received and compare the segment index numbers or base URIs of successively received segments to one another. When the segment index number or base URI of the most recent segment fragment is different from the segment index number or base URI of the previous segment fragment (e.g., a segment index number or base URI change is detected), the most recent segment fragment may be the first packet of the next segment in the timeline, such as the first File Delivery Over Unidirectional Transport (FLUTE) file delivery table (FDT) of the next segment in the timeline. The receiver device processor (e.g., the Multicast Service Device Client running on the processor) may identify that next segment as a base segment and may use the arrival time of that first packet, such as the first FDT, to modify the availability start time of the base segment in the timeline and shift all subsequent availability times for subsequent segments based on the modified availability start time. In this manner, the receiver device processor may modify the availability start times in the timeline (e.g., ASTs in the MPD) to account for actual arrival time of segments.

In various embodiments, the receiver device processor may crawl (e.g., parse) the received MPD to determine the URL format corresponding to every period and representation pair. For example, the URL format may be a format "XXX$number$YYY" where XXX may be a prefix, YYY may be a suffix, and $number$ may be the index number of the segment (e.g., the segment number in DASH). The receiver device processor may use this information to first determine whether the URL of a received segment matches the segment URL format of a specific period and representation pair, and then may determine the segment number. The receiver device processor may also determine whether the segment number results in a segment that corresponds to the period and representation pair, and may determine the actual segment number. Once, the segment number is determined, the receiver device processor may compare the segment number to that of a previously detected segment number. In an embodiment, the URL format may be a number based URL scheme. In a further embodiment, the base URL may always be an absolute URL. In an embodiment, baseURL@availabilityTimeOffset may be supported by applying an adjustment to an availability time calculation. In an embodiment, the URL format or template may be time based, rather than segment number based. For example, audio and video segments corresponding to the same time duration may have the same $time$ tag in the template. The receiver device processor may determine the availability start time of each incoming segment and determine the base segment based on the change in availability start time of each incoming segment.

In various embodiments, the modified availability start time of the base segment may be determined as the first FDT arrival time plus the number of segment fragments (SF) per segment multiplied times the Multicast Channel (MCH) scheduling period (MSP) plus a margin (M), or modified availability start time=$1^{st}$ FDT Arrival Time+(SF*MSP)+M. In an embodiment, the value of the MSP may be a default value pre-provisioned to the receiver device. In another embodiment, the MSP may be a variable value associated with the temporary mobile group identifier (TMGI) for receiving the segments. The margin (M) may be an additional margin to account for processing delay by the receiver device and may be configured as a value pre-provisioned in a memory of the receiver device. In an embodiment, SF may be equal to the cell segment duration/MSP). SF may be adjusted by a multiplicative factor (for example, a value smaller or greater than 1, but greater than 0 in value, such as 0.8, 0.9, 1.1, 1.2, etc.) to account for the variability in segment sizes as generated in the encoder and the scheduling method in the broadcast system.

In the various embodiments, multiple representations, such as audio and video, broadcast simultaneously on the same bearer may not impact the ability of the receiver device processor to identify an index change and modify the segment availability start times. In some embodiments, the two or more representations may have the same start index and the same segment duration. In some embodiments, the two or more representations may have different start indexes and/or different segment duration. Separate audio and video representations may still include index values and regardless of whether two segments are audio and/or video segments, the receiver device processor may handle an index value change as an indication to track the FDT arrival time of the next segment.

In an embodiment, the receiver device processor may monitor the segment availability times of segment fragments as segment fragments are received and compare the segment availability start times of successively received segments to one another. When the segment availability start time of the most recent segment fragment is different from the segment availability start time of the previous segment fragment, the most recent segment fragment may be the first File Delivery Over Unidirectional Transport (FLUTE) file delivery table (FDT) of the next segment in the timeline. The receiver device processor (e.g., the Multicast Service Device Client running on the processor) may identify that next segment as a base segment and may use the arrival time of that first FDT to modify the availability start time of the base segment in the timeline and shift all subsequent availability start times for subsequent segments based on the modified availability start time.

In an embodiment, when the segment durations are different for different broadcast representations (e.g. audio at 2 s segment duration and video at 1s segment duration), the receiver device processor may use the video representation only to determine the adjustment. The receiver device processor may also use the higher segment duration across representations to determine super-segments whose availability may be aligned and for which the same calculations may be applied. The receiver device processor may use the video representation only to determine the adjustment when the segment durations are multiples of each other. The receiver device processor may us the lowest common multiple of the segment durations when the segment durations are not multiples of each other.

In various embodiments, when a receiver device processor determines that Unicast fetch is active, the receiver device processor (e.g., the Multicast Service Device Client running on the processor) may determine the receipt time of any FDT of any segment received at the receiver device, and may modify the availability start time of that segment based on the receipt time of the FDT. In this manner, the availability time in the MPD may be immediately shifted without waiting for a next segment to be received or a segment index change, and a tighter timeline may be leveraged to enable Unicast fetch to be used to request segments through unicast earlier. Setting the availability timeline based on the first broadcast FDT describing a segment may ensure a tighter deadline than the timeline determined by using any FDT describing the segment. For example, the last FDT describing a segment may be approximately a segment duration later than the first FDT describing the segment and using it for setting the segment availability start time may lead to a delayed availability of segments by the same duration. Thus, the MPD may be made available as soon as the FDT is encountered, enabling play out to start earlier than waiting for a next segment to be received or a segment index change. In an embodiment, the first one or more segments may be fetched through unicast.

The availability time of a media segment per the DASH standard may be determined as the value of the availability start time (AST) of the MPD (e.g., the time indicated in the MPD element "MPD@availabilityStartTime" representing an anchor time for the availability of all segments described in the MPD), plus the PeriodStart time of the containing period, plus the MPD availability start time (AST) of that media segment (e.g., the AST of the segment itself), plus the segment duration. In the various embodiments, based on the URI of the identified base segment, the receiver device processor (e.g., the Multicast Service Device Client running on a processor of the receiver device), may determine the corresponding availability start times of all remaining segments in the MPD. In an embodiment, the receiver device processor may modify the availability start time (AST) of the MPD based on the modified availability start time of the base segment determined based on the first FDT arrival time. For example, the AST of the MPD may be modified to equal the modified availability start time minus the PeriodStart time minus the availability start time to within the period (segment duration times segment number minus start segment number) of the base segment. In the various embodiments, upon receiving an MPD update that has the same AST as a previous MPD, the receiver device processor may adjust the AST of the MPD update to match the modified AST determined for the previous MPD. In the various embodiments, upon receiving an MPD update that has a different AST than the previous MPD, the receiver device processor may adjust the AST of the MPD update using the modified availability start time of the base segment determined based on the first FDT arrival time. In various embodiments, receiving an MPD update with a different AST may trigger a new availability start time determination.

In another embodiment, the receiver device processor may adjust the segmentAvailabilityOffset attribute of the baseURL element that corresponds to the received segment. The segmentAvailabilityOffset parameter may modify the calculated availability start time and may itself be adjusted instead of the availability start time.

In various embodiments, the receiver device processor may match the base segment to two different period and representation pairs. The correct match may be the period and representation pair that results in the smaller timeline adjustment since that period and representation pair may be the more likely timeline adjustment in a live streaming system.

In various embodiments, timing drift at the receiver device may be tracked, and in response to detecting timing drift, the receiver device processor may determine a new availability start time for the MPD. In various embodiments, the segment number or segment URI associated with a failed HTTP request by the DASH client may be tracked by the receiver device processor (e.g., the Multicast Service Device Client running on the receiver device processor). Once a segment number or segment URI is being tracked, the receiver device processor may determine whether each subsequent HTTP request by the DASH client is for the same or different segment number or segment URI.

Upon receiving an HTTP request for a different segment number or segment URI, the receiver device processor may determine whether the failed HTTP request was cleared or is still outstanding and whether the requested segment is now present in the cache. When the failed HTTP request is still outstanding and the requested segment is in the cache, timing drift on the receiver device may have occurred causing the segment to arrive after the DASH client may have given up requesting the segment (i.e., a drift condition is met). When timing drift is detected (i.e., the drift condition is met), the availability start time may be recalculated and the MPD may be modified by the receiver device to account for the timing drift.

In an embodiment, to avoid tracking segments when a DASH client issues a multitude of HTTP requests at once (e.g., upon start-up to determine a line edge of a media stream), tracking of a next segment may be delayed, such as for a time equal to ninety percent of a segment duration. In a further embodiment, the check for a drift condition may be applied only when the next segment number is one segment index greater than the current tracked segment. In some embodiments, only one segment may be tracked at a time. In other embodiments, multiple segments may be tracked at once.

In various embodiments, URL matching of the URL of a segment to a corresponding period and representation couple in a MPD may be utilized to determine whether timing drift has occurred. In an embodiment, in response to determining that the decoding time for a segment minus the availability start time of the segment per the MPD based on the matching period and representation couple is greater than half the segment duration, the receiver device processor may determine that timing drift has occurred and trigger recalculation of the availability start time (i.e., triggering an availability start time recalculation). In another embodiment, timing drift may be determined in response to determining that segment index change has occurred based at least in part on URL matching. In an embodiment, an AST change resulting from a received segment may be determined based at least in part on URL matching. In response to the AST change being greater than a threshold, such as one segment duration, the receiver device processor may determine timing drift has occurred and trigger an availability start time recalculation.

FIG. 1 illustrates a cellular network system 100 suitable for use with the various embodiments. The cellular network system 100 may include multiple devices, such as a receiver device 102, one or more cellular towers or base stations 104, and servers 108 and 112 connected to the Internet 110. The receiver device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router, which may connect to the Internet 110. In this manner, via the connections to the cellular tower or base station 104, and/or Internet 110, data may be exchanged between the receiver device 102 and the server(s) 108 and 112. In an embodiment, server 108 may be a content provider server or encoder providing MPDs and segments for output via a DASH client. In an embodiment, server 112 may be a Broadcast Multimedia Service Center (BMSC) server, which may receive MPDs and segments output from the encoder and control the OTA transmission of the MPDs and segments to the receiver device 102. Of course, while features of receiver devices described herein may be described with reference to OTA transmissions, these features may be used in connection with wired transmissions, wireless transmissions, or a combination of wired and wireless transmissions. Thus, OTA transmission is not required.

Figure 2:
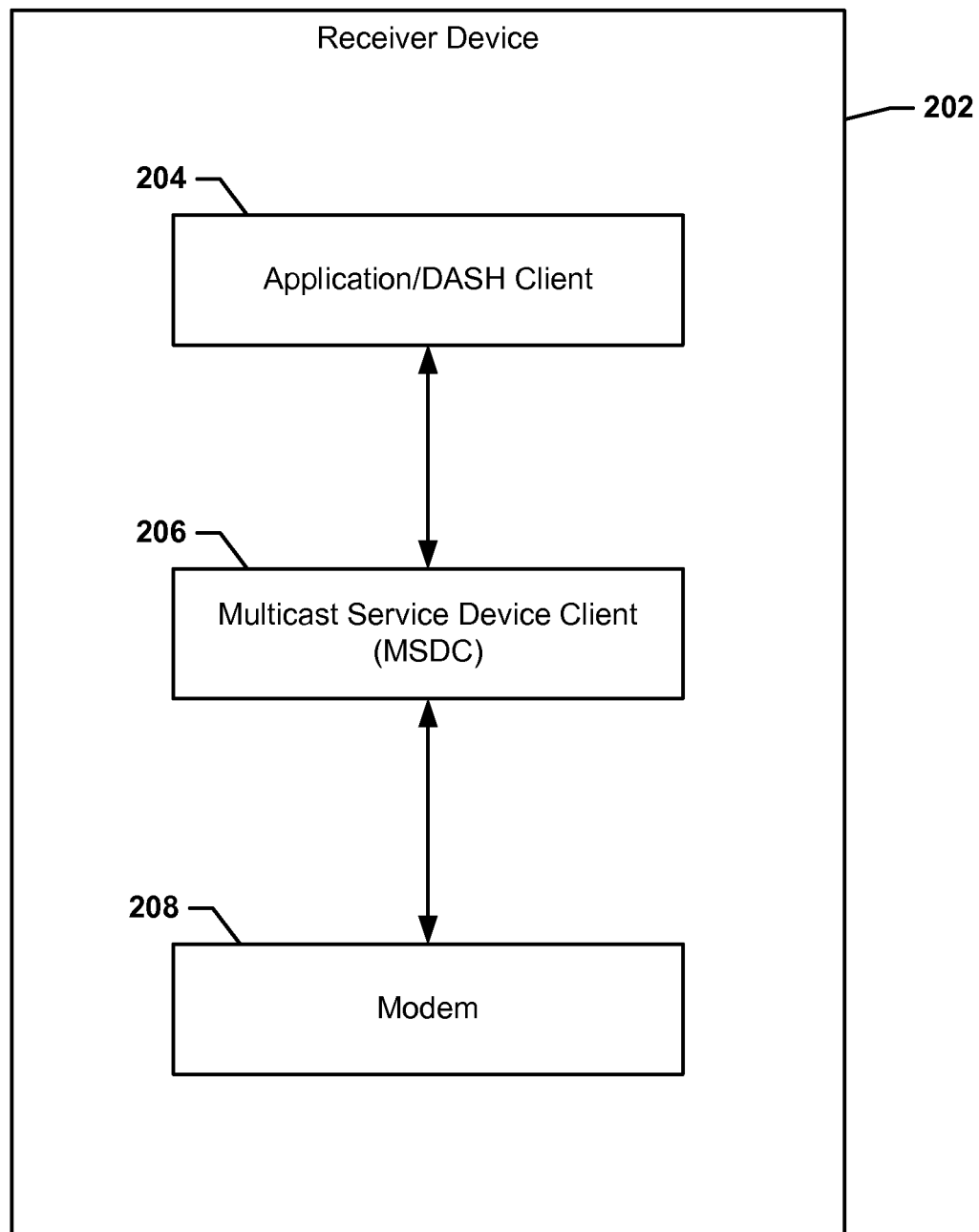
FIG. 2 is a block diagram illustrating the architecture of a receiver device according to an embodiment.

FIG. 2 illustrates a simplified receiver device 202 architecture according to an embodiment. The receiver device 202 may include a modem layer 208 that manages all radio aspects of the receiver device 202, such as acquisition, handoff, link maintenance, etc. The modem layer 208 may decode a received eMBMS bearer signal and deliver Internet Protocol (IP) packets to the Multicast Service Device Client (MSDC) 206.

The Multicast Service Device Client 206 may be a service layer of the receiver device 202 that recovers segments from the delivered IP packets and makes segments available to applications/clients, such as Application/DASH client 204. As an example, the Multicast Service Device Client 206 may be a service layer that is part of the operating system of the receiver device 202. The Multicast Service Device Client 206 may also recover an MPD from the delivered IP packets. The Multicast Service Device Client 206 may store received segments in a memory of the receiver device.

In an embodiment, the Multicast Service Device Client 206 may adjust the MPD to generate a modified MPD, store the modified MPD in a memory of the receiver device, and may deliver the modified MPD to the Application/DASH client 204. In another embodiment, the Multicast Service Device Client 206 may determine a delay adjustment for the MPD, store the delay adjustment for the MPD in a memory of the receiver device (e.g., in a delay adjustment message), store the MPD in a memory of the receiver device, and may deliver the MPD and the delay adjustment for the MPD to the Application/DASH client 204.

The Application/DASH client 204 may be a DASH enabled application and/or an application which launches a DASH client to present media (directly and/or via another application such as a media player). In an embodiment, the Application/DASH client 204 may obtain the modified MPD location (e.g., Uniform Resource Locator (URL)) from the Multicast Service Device Client 206, request and receive the modified MPD from the Multicast Service Device Client 206, and may request segments from the Multicast Service Device Client 206 per the availability timeline in the modified MPD. In another embodiment, the Application/DASH client 204 may obtain the MPD location (e.g., Uniform Resource Locator (URL)) from the Multicast Service Device Client 206 and the delay adjustment for the MPD location (e.g., URL), request and receive the MPD and the delay adjustment for the MPD from the Multicast Service Device Client 206, modify the MPD according to the delay adjustment for the MPD to generate a modified MPD, and may request segments from the Multicast Service Device Client 206 per the availability timeline in the modified MPD. The Application/DASH client 204 may receive the requested segments from the Multicast Service Device Client 206 and may render the segment contents (directly and/or via another application such as a media player).

In an embodiment, the functions of the Multicast Service Device Client 206 used to determine a delay adjustment for the MPD may be integrated into the client 206 and the client 206 may determine delay adjustments and/or modify the MPD itself.

Figure 3A:
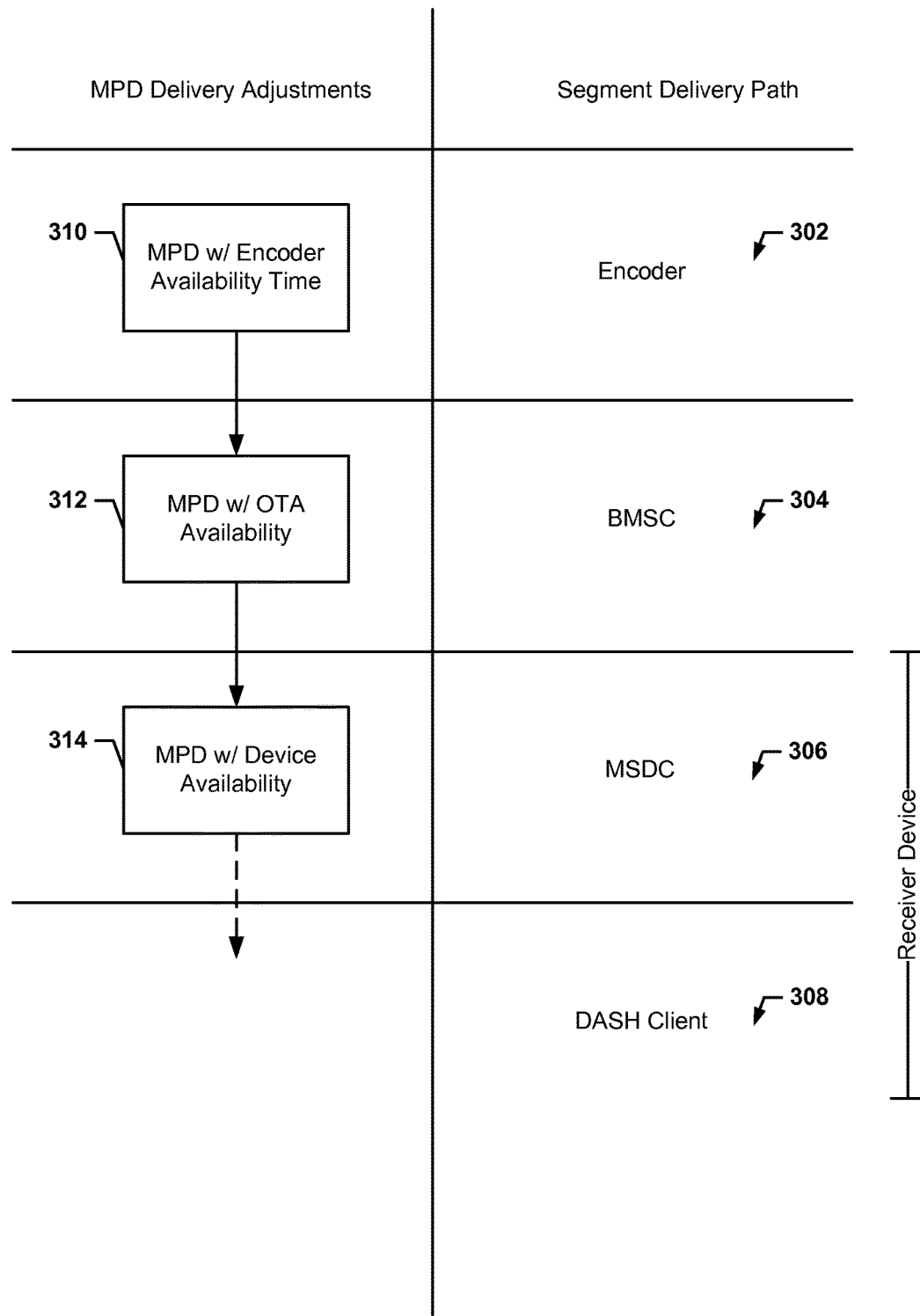
FIG. 3A illustrates the relationship between a segment delivery path and MPD delivery adjustments according to an embodiment.

FIG. 3A illustrates the delivery adjustments that may be made to a segment availability timeline, such as an MPD, along a segment delivery path according to an embodiment. The segment delivery path may include an encoder 302, BMSC 304, Multicast Service Device Client 306 of a receiver device, and a DASH client 308 of the receiver device. The encoder 302 may encode media content into segments and deliver segments periodically to the BMSC 304. For example, segments may be periodically delivered from the encoder 302 to the BMSC 304 via the eMBMS Gateway. The BMSC 304 may receive the segments and broadcast the segments over a bearer (e.g., via OTA broadcast). In an embodiment, the latency and jitter of the headend may be known. The Multicast Service Device Client 306 executing in the receiver device may receive the segments via a modem, and the Multicast Service Device Client 306 may process the segments (e.g., decode the segments, apply FEC, etc.) to make the segments available to a DASH client 308 executing on the receiver device. The DASH client 308 may provide the segments to applications (e.g., a media player) or codecs of the receiver device to enable output of the media content by the receiver device.

In addition to generating segments, the encoder 302 may generate an MPD 310. The encoder generated MPD 310 may list the segments generated and/or to be generated by the encoder 302, the segment lengths (e.g., size), and the availability start times of the segments. In an embodiment, the availability start times in the encoder generated MPD 310 may correspond to the output times of the encoder 302 generated segments. The encoder 302 may provide the generated MPD 310 to the BMSC 304. In an embodiment, the BMSC 304 may receive the generated MPD 310 and adjust the segment availability timeline to account for any OTA delivery delay (e.g., network jitter) to generate an MPD 312. The BMSC 304 may send the MPD 312 to the receiver device. The MPD 312 may list the segment availability start times corresponding to the OTA availability start times of the segments.

In an embodiment, the receiver device may receive the MPD 312, and the Multicast Service Device Client 306 of the receiver device may adjust the availability start times per the local receiver device clock based on receiver device delays (e.g., processing delays, receiver device clock drift margin, etc.) to generate a modified MPD 314 listing the actual estimated availability start time for the segments at the receiver device. The Multicast Service Device Client 306 may provide the modified MPD 314 to the DASH client 308, and the DASH client may use the segment availability start times in the MPD to request segments from the local HTTP server of the receiver device using the receiver device clock. In another embodiment, the Multicast Service Device Client 306 of the receiver device may adjust the availability start times in the MPD 312 per the local receiver device clock based on receiver device delays (e.g., processing delays, clock drift, etc.) and communicate the adjustments to the availability start times to the DASH client 308 separate from any MPD sent to the DASH client 308. In a further embodiment, the adjustments made by the Multicast Service Device Client 306 may vary based on whether the presentation is received via Unicast or Broadcast transmission and/or the segment sizes of each presentation.

Figure 3B:
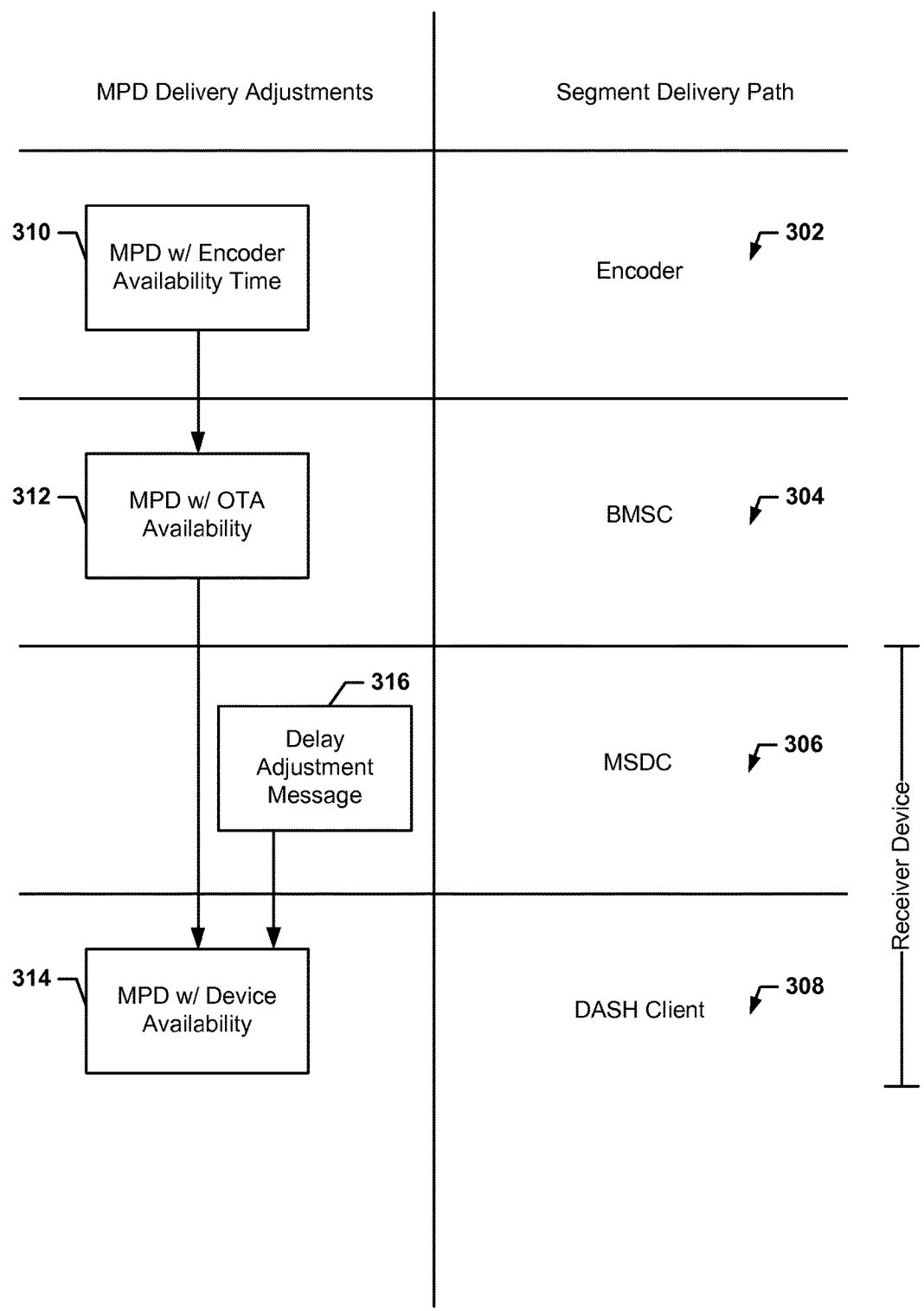
FIG. 3B illustrates the relationship between a segment delivery path and MPD delivery adjustments according to another embodiment.

FIG. 3B illustrates the delivery adjustments that may be made to a segment availability timeline, such as an MPD, along a segment delivery path according to another embodiment. The delivery adjustments illustrated in FIG. 3B are similar to those described above with reference to FIG. 3A, except that in FIG. 3B the Multicast Service Device Client 306 may not modify the MPD before sending it to the DASH client 308.

In an embodiment, the receiver device may receive the MPD 312, and the Multicast Service Device Client 306 of the receiver device may provide the MPD 312 to the DASH client 308 without modifying the segment availability start times. In an embodiment, the Multicast Service Device Client 306 may determine a delay adjustment that may be used to adjust the availability start times per the local receiver device clock based on receiver device delays (e.g., processing delays, clock drift, etc.) and generate a delay adjustment message 316 listing the delay adjustments. The Multicast Service Device Client 306 may provide the delay adjustment message to the DASH client 308.

In an embodiment, the DASH client 308 may use the delay adjustment indications in delay adjustment message 316 to modify the segment availability start times in the MPD 312 to generate a modified MPD 314. The DASH client 308 may request segments from the local HTTP server of the receiver device using the receiver device clock. In another embodiment, the DASH client 308 may receive the delay adjustment message 316 and use the delay adjustment message 316 to modify requests for segments from the local HTTP server of the receiver device without generating the modified MPD 314.

Figure 4:
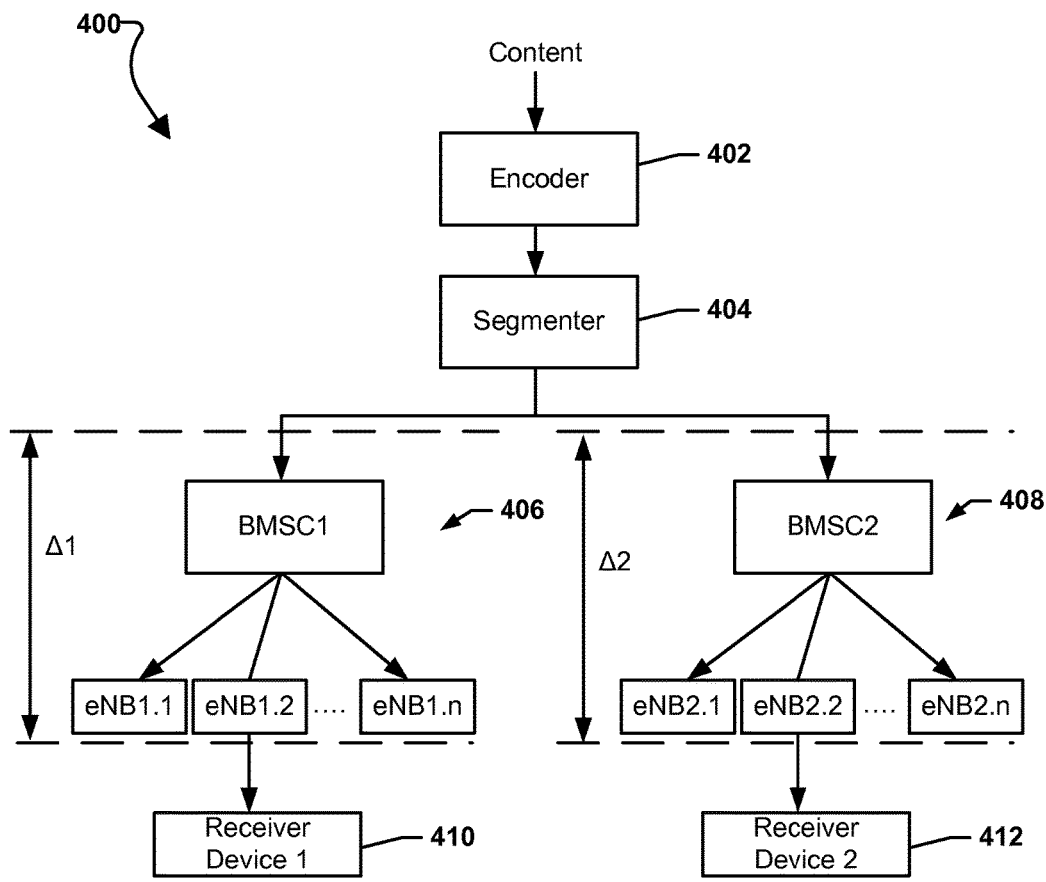
FIG. 4 illustrates the relationship between delivery path delays in different parts of a network according to an embodiment.

FIG. 4 illustrates the relationship between two example delivery path delays $\Delta 1$ and $\Delta 2$ in different parts of a network 400. The content from the encoder 402 may pass from the encoder 402 to the segmenter 404 and be provided to two different portions of the network 406, 408 served by different BMSCs, BMSC1 and BMSC2 and their respective eNode Bs, eNB1.1, eNB1.2, eNB1.n, eNB2.1, eNB2.2, eNB2.n, etc. ENode B eNB1.2 may provide the content to receiver device 1 410 in the first portion 406, and eNode B eNB2.2 may provide the content to the receiver device 2 412 in the second portion 408. In some deployments of network 400, network portions 406 and 408 may be managed by different infrastructure vendors and/or may be different Multicast-broadcast single-frequency networks (MBSFNs).

The path delay $\Delta 1$ may be the processing delay for BMSC1 and the delay experienced in providing segments from BMSC1 through the respective eNodeBs, eNB1.1, eNB1.2, eNB1.n, to receiver device 1 410. The path delay $\Delta 2$ may be the processing delay for BMSC2 and the delay experienced in providing segments from BMSC2 through the respective eNodeBs, eNB2.1, eNB2.2, eNB2.n, to receiver device 2 412. The path delay $\Delta 1$ in the first portion 406 may be different than the path delay $\Delta 2$ in the second portion 408. Thus, the same segment of the content may become available at receiver device 1 410 at a different time than the content may become available at receiver device 2 412 because of the different path delays $\Delta 1$ and $\Delta 2$ in the different portions 406, 408. The different path delays $\Delta 1$ and $\Delta 2$ may be caused by various factors, including network deployments with multiple infrastructure vendors and/or receiver device mobility among different MBSFNs that use different MSPs for the same content.

When the path delay is less than the estimated worst case delay for the network 400, the actual availability start time of segments of the content at receiver device 1 410 or receiver device 2 412 may be earlier than the availability start time listed in the MPD provided to the receiver devices. For example, in some synchronized network deployments path delay $\Delta 1$ may be shorter than path delay $\Delta 2$, and to account for the longest path delay in the network (e.g., $\Delta 2$), the MPD in the network may synchronize the availability start times to match the availability start time commensurate with the longer path delay $\Delta 2$. In such an example, the segment availability timeline in receiver device 2 412 may be offset by approximately $\Delta 2 - \Delta 1$, and receiver device 1 410 may unnecessarily store a first received segment for at least $\Delta 2 - \Delta 1$ before playback commences. The various embodiments may enable the receiver device 1 410 and/or receiver device 2 412 to account for their actual experienced path delays 41 and/or 42, and request segments of the content when they may actually be available.

Figure 5A:
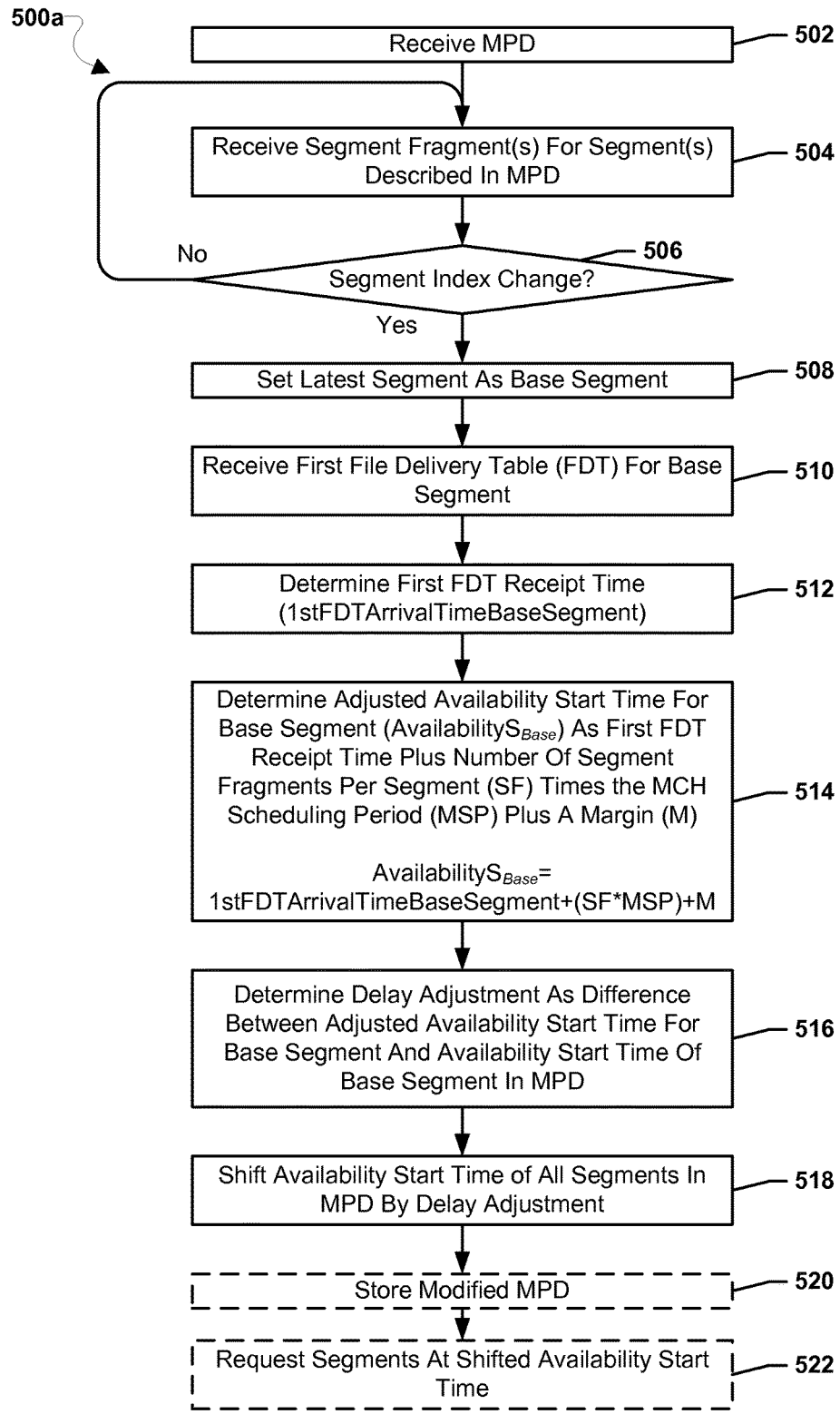
FIG. 5A is a process flow diagram illustrating an embodiment method for modifying a segment availability start time in response to a segment index change based on a determined first FDT receipt time.

FIG. 5A illustrates an embodiment method 500a for modifying a segment availability start time in response to a segment index change based on a determined first FDT receipt time. In an embodiment, the operations of the method 500a may be performed by a Multicast Service Device Client running on a processor of a receiver device, such as a smart phone. In another embodiment, the operations of the method 500a may be performed by a client application, such as a DASH client, running on a processor of a receiver device.

In block 502, the Multicast Service Device Client or client application may receive an MPD. In an embodiment, the receiver device may receive the MPD via OTA transmission. In an embodiment, the MPD may be received from the network, and the headend may set the availability start times of the segments in the MPD. In an embodiment, the availability start times in the MPD may be set by the network and may account for the worst case end-to-end transport delay from the encoder generating the segments to the receiver device. In an embodiment the client application may receive the MPD via the Multicast Service Device Client. In block 504, the Multicast Service Device Client or client application may receive one or more segment fragments for one or more segments described in the MPD. For example, the segment fragments may be received OTA during a Multicast Channel (MCH) scheduling period (MSP).

In determination block 506, the Multicast Service Device Client or client application may determine whether a segment index change has occurred. In an embodiment, the Multicast Service Device Client or client application may determine whether a segment index change has occurred by comparing the segment index indicated in two successively received segment fragments to one another, and a segment index change may be indicated by a mismatch between the segment indexes of the successively received segment fragments. In the various embodiments, the segment fragments that are received may be compared to one another regardless of the type of segment with which each is associated (e.g., video or audio). In response to determining that a segment index change has not occurred (i.e., determination block 506="No"), the Multicast Service Device Client or client application may continue to receive segment fragments in block 504.

In response to determining that a segment index change has occurred (i.e., determination block 506="Yes"), the Multicast Service Device Client or client application may set the latest segment received as the base segment in block 508. In an embodiment, the latest segment received may be the segment with the highest index number. In block 510, the Multicast Service Device Client or client application may receive a first FDT for the base segment. In block 512, the Multicast Service Device Client or client application may determine the first FDT receipt time (1stFDTArrivalTimeBaseSegment). In an embodiment, the Multicast Service Device Client or client application may determine a receipt time of a first packet of an object corresponding to the base segment as described in the first FDT for the base segment as the first FDT receipt time (1stFDTArrivalTimeBaseSegment).

In block 514, the Multicast Service Device Client or client application may determine the adjusted availability start time for the base segment (e.g., Availability$_{SBASE}$) as the first FDT receipt time (e.g., 1stFDTArrivalTimeBaseSegment) plus the number of segment fragments per segment (SF) times the MSP plus a margin (M), such as:

Availability$_{SBASE}$=1stFDTArrivalTimeBaseSegment+ (SF*MSP)+M.

In an embodiment, the value of the MSP may be a default value pre-provisioned to the receiver device. In another embodiment, the MSP may be a variable value associated with the temporary mobile group identifier (TMGI) for receiving the segments. The margin (M) may be an additional margin to account for processing delay by the receiver device and may be" pre-provisioned in a memory of the receiver device. In an embodiment, a Multicast Service Device Client or client application may determine the adjusted availability start time of the base segment based at least in part on the receipt time of a first packet of an object corresponding to the base segment.

In block 516, the Multicast Service Device Client or client application may determine a delay adjustment as the difference between the adjusted availability start time for the base segment (AvailabilityS$_{BASE}$) and the availability start time of the base segment in the received MPD. In block 518, the Multicast Service Device Client or client application may shift the availability start time of the segment in the MPD by the delay adjustment. In this manner the Multicast Service Device Client or client application may shift the availability start time to reflect when the segments may actually be available at the receiver device.

In optional block 520, the Multicast Service Device Client or client application may store the modified MPD in a memory available to the Multicast Service Device Client or client application. In an embodiment, storing the modified MPD may include storing the modified MPD at a memory location associated with a URL at which some or all MPDs are stored on the receiver device. In another embodiment, the client application may not specifically store the modified MPD in a separate memory location. Rather, in optional block 522 the client application may merely use the modified MPD to request segments at a shifted availability start time.

Figure 5B:
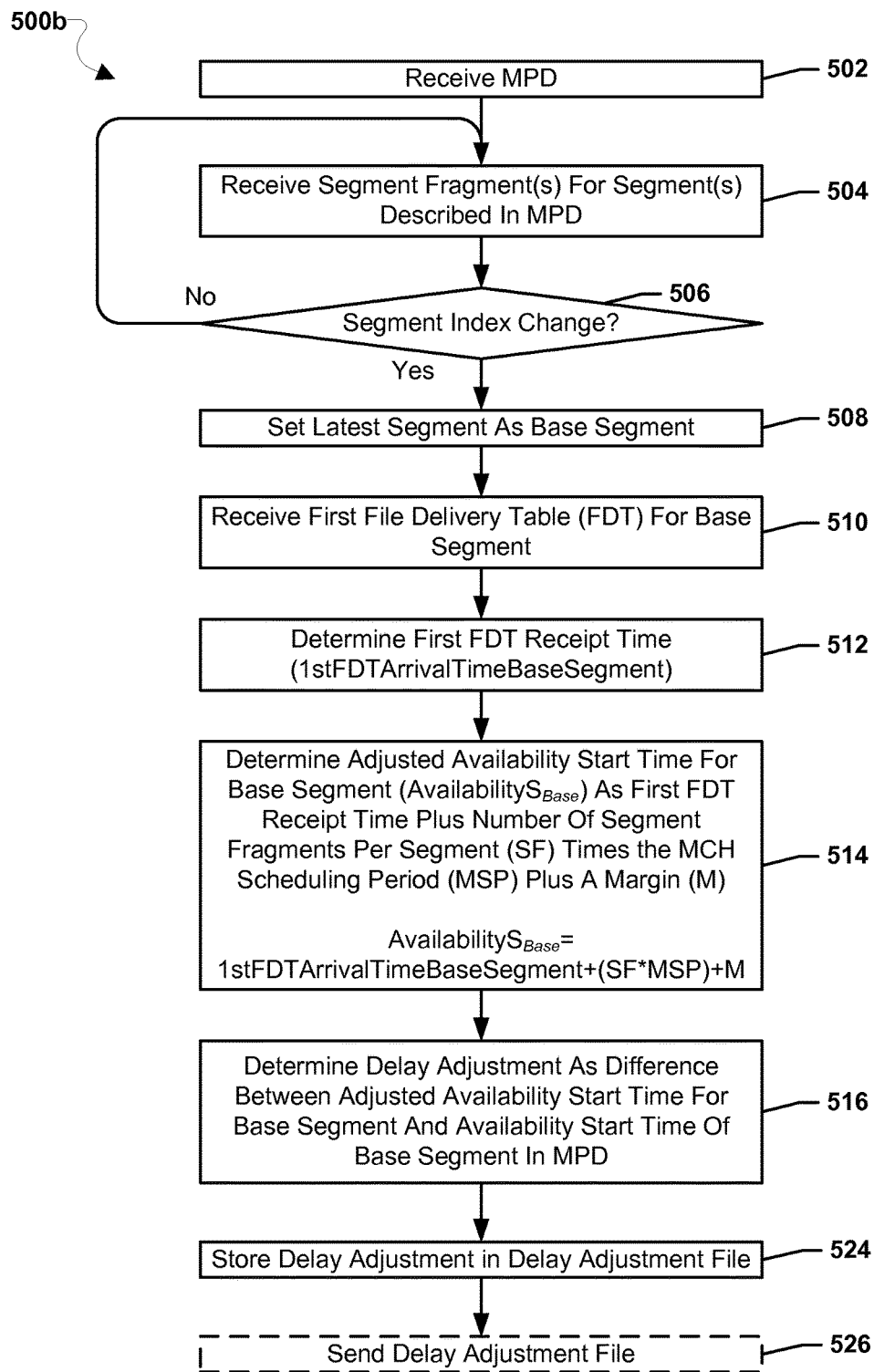
FIG. 5B is a process flow diagram illustrating an embodiment method for generating a delay adjustment message in response to a segment index change based on a determined first FDT receipt time.

FIG. 5B illustrates an embodiment method 500b for generating a delay adjustment message in response to a segment index change based on a determined first FDT receipt time. The method 500b is similar to the method 500a described above with reference to FIG. 5A, except that a delay adjustment message indicating shifts in the segment availability timeline may be generated without necessarily shifting the segment availability timeline. In an embodiment, the operations of the method 500b may be performed by a Multicast Service Device Client running on a processor of a receiver device, such as a smart phone. In another embodiment, the operations of the method 500b may be performed by a client application, such as a DASH client, running on a processor of a receiver device. In blocks 502, 504, 506, 508, 510, 512, 514, and 516 the Multicast Service Device Client or client application may perform operations of like numbered blocks of the method 500a described above with reference to FIG. 5A to determine the delay adjustment.

In block 524, the Multicast Service Device Client or client application may store an indication of the delay adjustment in a delay adjustment message. In an embodiment, a delay adjustment message may be a data file which a client application may use to determine delay adjustments that, to account for segment availability at the receiver device, and may be used to shift the availability start time of one or more segments. In an embodiment, a delay adjustment message may be stored at a memory location associated with a URL at which some or all delay adjustment messages are stored on the receiver device. In optional block 521, the Multicast Service Device Client may send the delay adjustment message to the client application for the client application's use in shifting the availability start time of one or more segments. In another embodiment, the delay adjustment message may not be sent, but rather accessed at or requested from its stored memory location as needed by the client application.

Figure 6A:
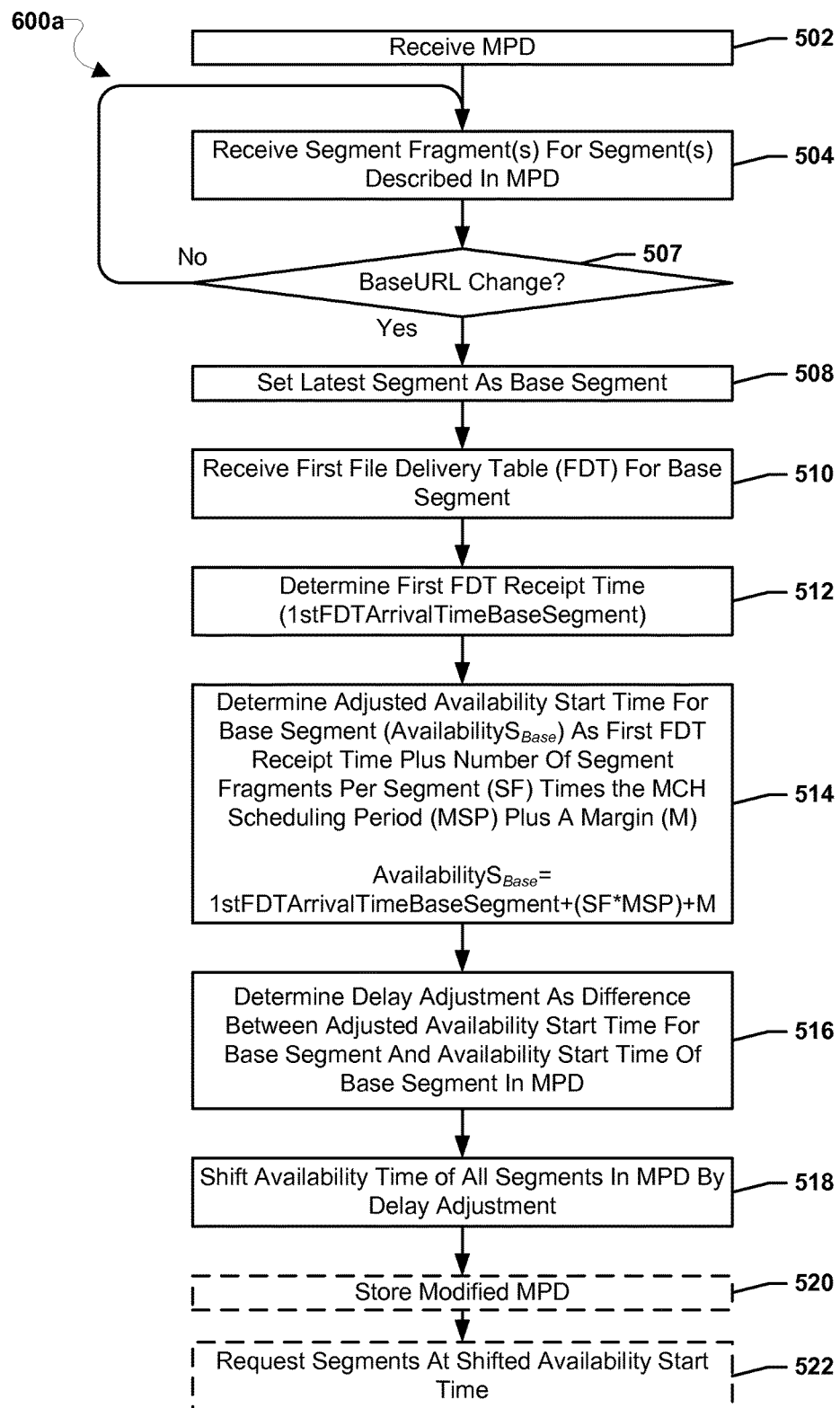
FIG. 6A is a process flow diagram illustrating an embodiment method for modifying a segment availability start time in response to a base URL change based on a determined first FDT receipt time.

FIG. 6A illustrates an embodiment method 600a for modifying a segment availability start time in response to a base URL change based on a determined first FDT receipt time. The method 600a is similar to the method 500a described above with reference to FIG. 5A, except that rather than a segment index change indicating segment fragments from a new segment have been received, a BaseURL change between segments may indicate a segment fragments for a new segment have been received. In an embodiment, the operations of the method 600a may be performed by a Multicast Service Device Client running on a processor of a receiver device, such as a smart phone. In another embodiment, the operations of the method 600a may be performed by a client application, such as a DASH client, running on a processor of a receiver device. In blocks 502 and 504 the Multicast Service Device Client or client application may perform operations of like numbered blocks of the method 500a described above with reference to FIG. 5A.

In block 507, the Multicast Service Device Client or client application may determine whether a baseURL change has occurred. In an embodiment, the Multicast Service Device Client or client application may determine whether a baseURL change has occurred by comparing the baseURLs indicated in two successively received segment fragments to one another, and a baseURL change may be indicated by a mismatch between the baseURLs of the successively received segment fragments. For example, while the overall URL for each segment fragment of a segment may be unique, the baseURL forming the initial portion of the URL may be the same for each segment fragment of a common segment. Thus, a change in the baseURL (e.g., the initial portion of the URL), may indicate fragments of a new segment are being received. In response to determining a baseURL has not changed (i.e., determination block 507="No"), the Multicast Service Device Client or client application may continue to receive segment fragments in block 504. In response to determining a baseURL has changed (i.e., determination block 507="Yes"), the Multicast Service Device Client or client application may perform operations of like numbered blocks 508, 510, 512, 514, 516, 518, 520, and 522 of the method 500a described above with reference to FIG. 5A.

Figure 6B:
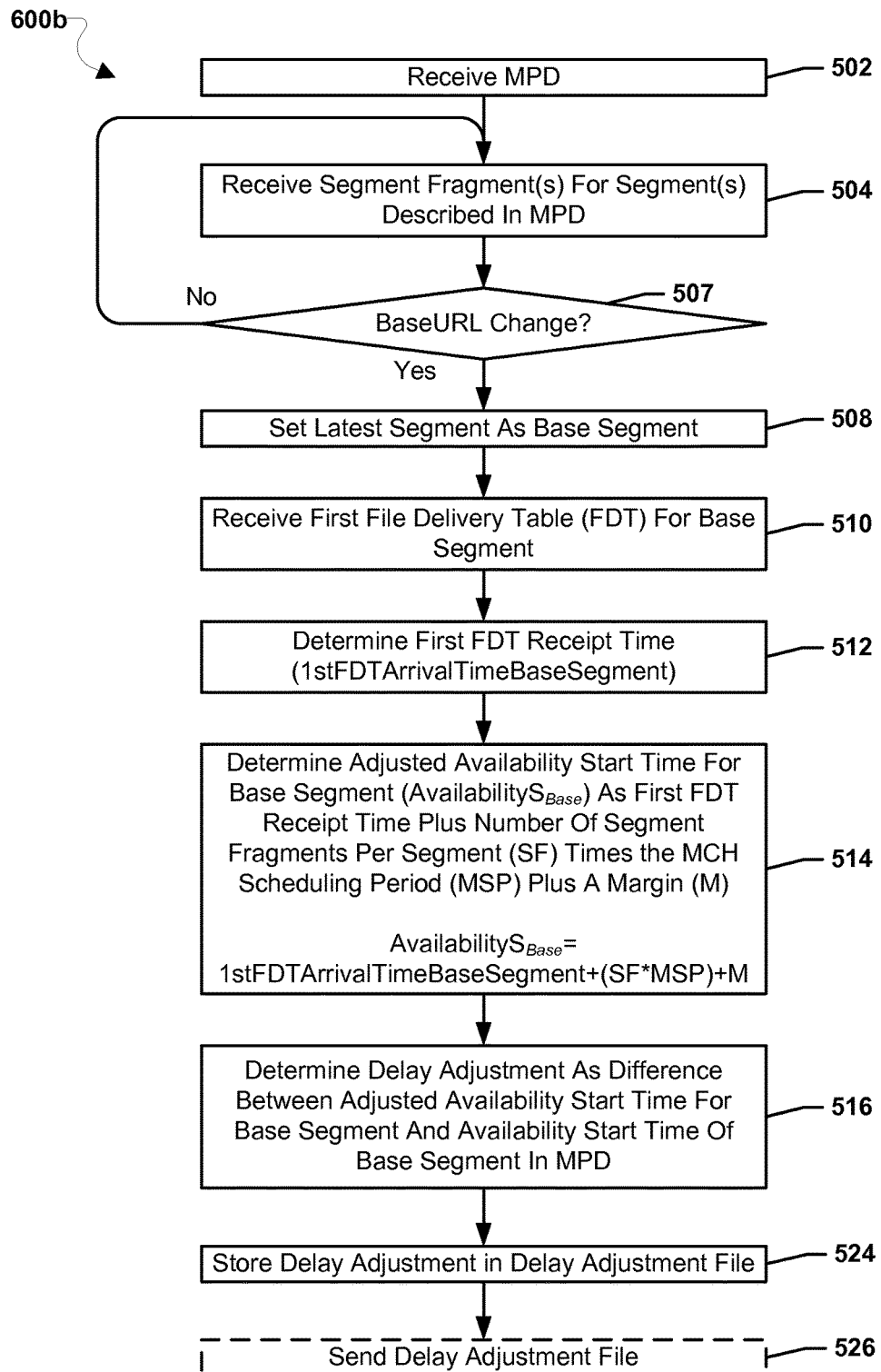
FIG. 6B is a process flow diagram illustrating an embodiment method for generating a delay adjustment message in response to a base URL change based on a determined first FDT receipt time.

FIG. 6B illustrates an embodiment method 600b for generating a delay adjustment message in response to a base URL change based on a determined first FDT receipt time. Embodiment method 600b is similar to method 600a described above with reference to FIG. 6A, except that a delay adjustment message indicating shifts in the segment availability timeline may be generated without necessarily shifting the segment availability timeline. In an embodiment, the operations of the method 600b may be performed by a Multicast Service Device Client running on a processor of a receiver device, such as a smart phone. In another embodiment, the operations of the method 600b may be performed by a client application, such as a DASH client, running on a processor of a receiver device. In blocks 502, 504, 507, 508, 510, 512, 514, and 516 the Multicast Service Device Client or client application may perform operations of like numbered blocks of the method 600a described above with reference to FIG. 6A to determine the delay adjustment. In blocks 524 and 526 the Multicast Service Device Client or client application may perform operations of like numbered blocks of the method 500b described above with reference to FIG. 5B to store and send the delay adjustment file. In an embodiment, the operations of the method 600b may be performed by the Multicast Service Device Client or client application in parallel with the operations of the methods 500a or 500b described above with reference to FIGS. 5A and 5B, respectively.

Figure 7:
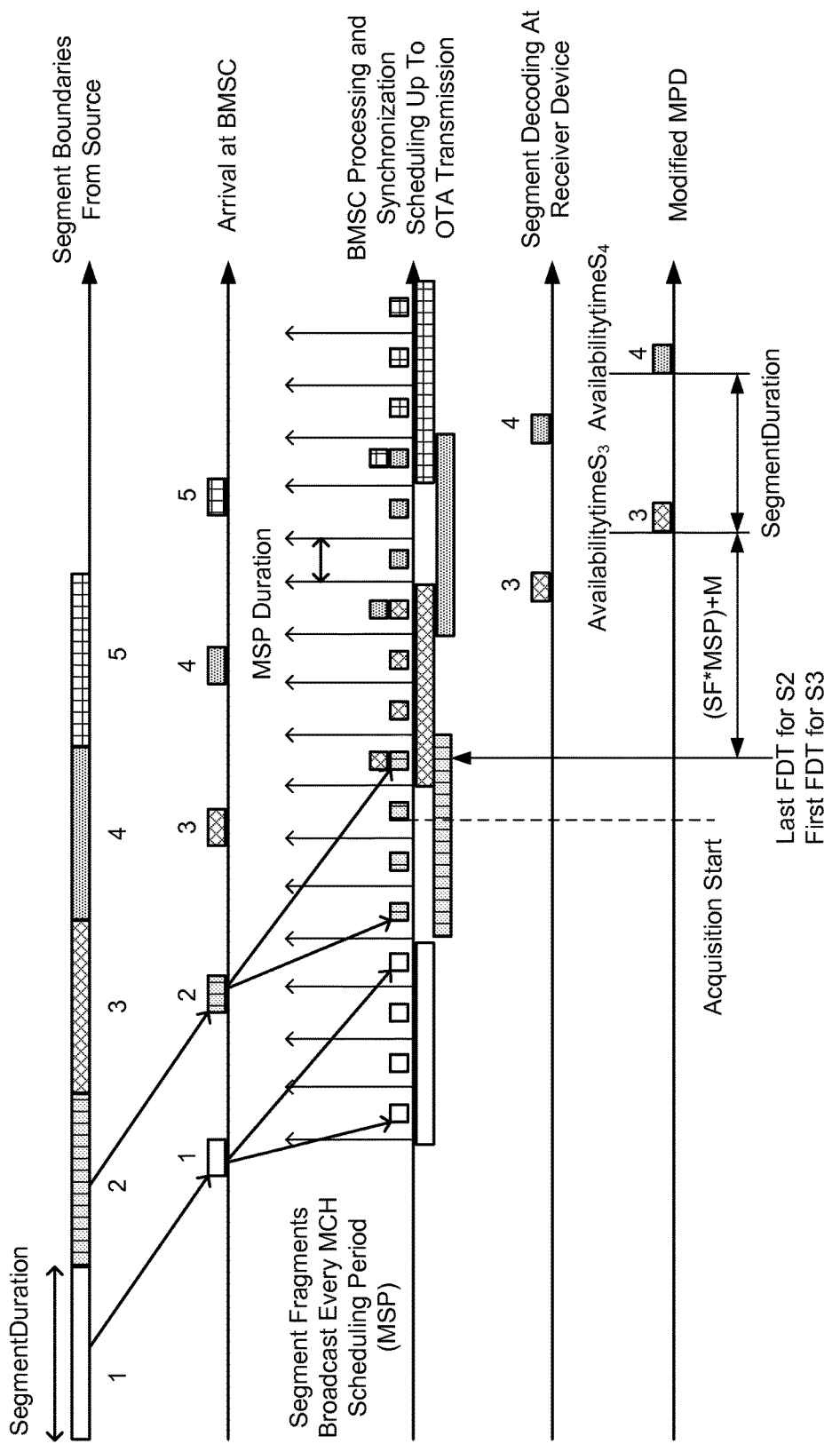
FIG. 7 illustrates availability time lines, MPD availability start times, transmission times, and arrival times according to an embodiment.

FIG. 7 illustrates availability time lines, MPD availability start times, transmission times, and arrival times according to an embodiment. As illustrated in FIG. 7, segments 1, 2, 3, 4, and 5 may be sent from the source to the BMSC, and the BMSC may split the segments 1, 2, 3, 4, and 5 into a series of segment fragments to be broadcast each MSP duration. The BMSC processing and synchronization scheduling operations may cause delays in OTA transmissions of the segment fragments to the receiver device, and fragments from more than one segment may be sent per MSP duration. The segments may be decoded and made available at the receiver device some period after their OTA transmission by the BMSC.

In the various embodiments discussed above with reference to FIGS. 5A, 5B, 6A, and 6B, after acquisition start the Multicast Service Device Client or client application may compare attributes of segment fragments (e.g., segment indexes or baseURLs) as segment fragments are received until a segment fragment for a new segment is identified by a mismatch in the attributes. As illustrated in FIG. 7, the mismatch may occur when the last FDT for segment 2 and the first FDT for segment 3 are received. Based on the arrival time of the first FDT for segment 3, according to the methods 500a, 500b, 600a, and 600b described above with reference to FIGS. 5A, 5B, 6A, and 6B, the Multicast Service Device Client or client application may indicate the availability start time of segment 3 as the FDT arrival time plus the number of segment fragments per segment (SF) times the MSP plus a margin (M) (e.g., (SF*MSP)+M)). The modified MPD may indicate the availability start time for segment 3 accordingly, and each subsequent segment's availability start time, such as the availability start time of segment 4, may be successive segment durations from the indicated availability start time for segment 3 in the modified MPD. Thus, the availability start time of the base segment may be determined in a first step, and the MPD may be adjusted in a second step such that the availability start time of the base segment in the MPD matches the one determined in the first step.

Figure 8A:
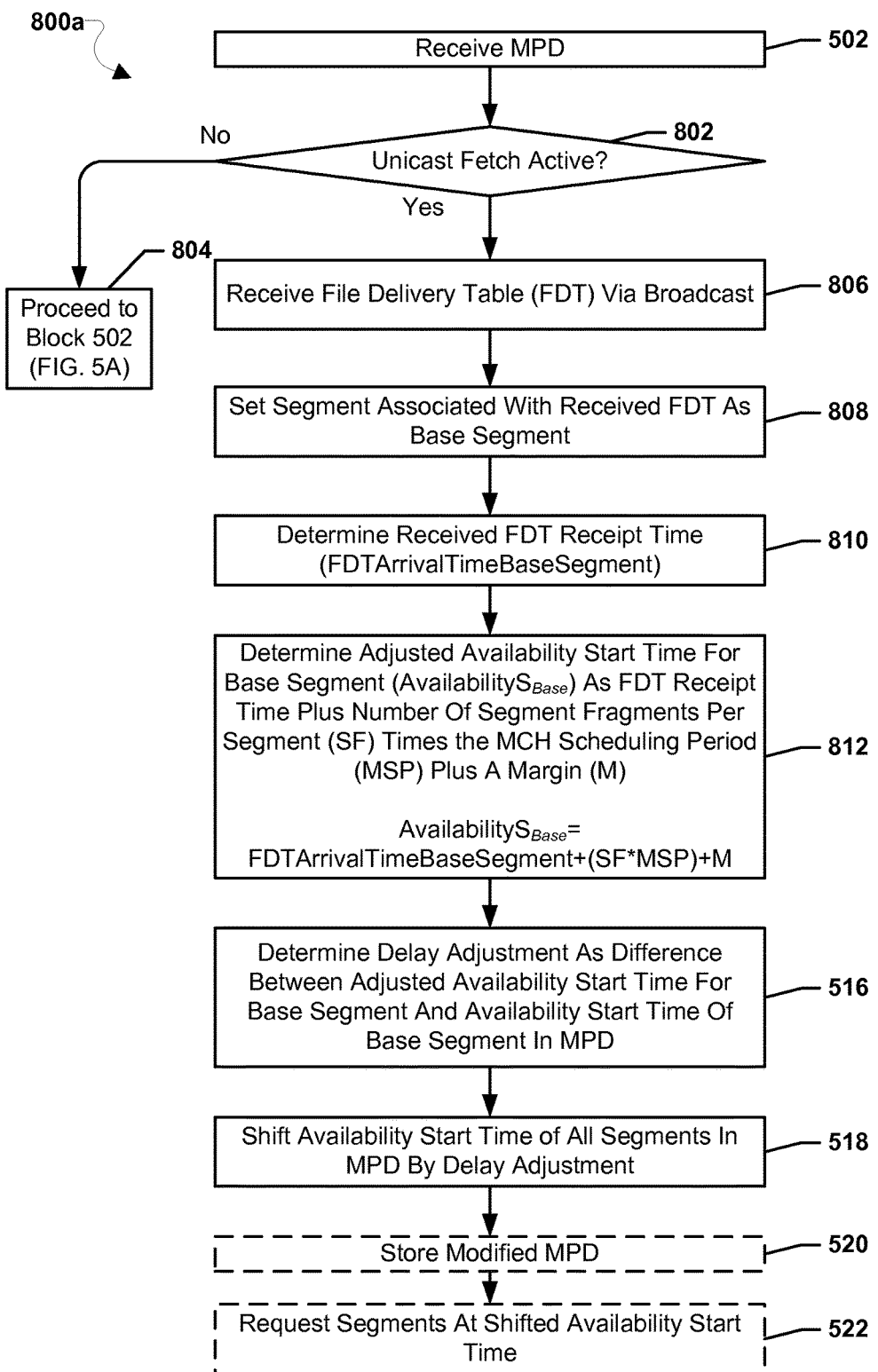
FIG. 8A is a process flow diagram illustrating an embodiment method for modifying a segment availability start time in a unicast mode based on any determined FDT receipt time.

FIG. 8A illustrates an embodiment method 800a for modifying a segment availability start time in a unicast mode based on any determined FDT receipt time. In an embodiment, the operations of the method 800a may be performed by a Multicast Service Device Client running on a processor of a receiver device, such as a smart phone. In another embodiment, the operations of the method 800a may be performed by a client application, such as a DASH client, running on a processor of a receiver device. As discussed above, in block 502 the Multicast Service Device Client or client application may receive an MPD. In yet another embodiment, the FDT may be used to determine the change in the segment index or baseURL, and the actual arrival time may be the time when a first packet carrying the identifier of the file (the transport object identifier, TOI, in the case of FLUTE) was received.

In determination block 802, the Multicast Service Device Client or client application may determine whether Unicast Fetch is active. In an embodiment, Unicast Fetch may be active in mode 1 (e.g., using unicast to request segments at start-up) or in mode 2 (e.g., using unicast at any time). In mode 1 or mode 2, Unicast Fetch may enable the Multicast Service Device Client or client application to request segments via unicast without waiting for broadcast/multicast reception of the segments. Unicast Fetch being active or inactive may be indicated in any manner, such as by a flag setting associated with Unicast Fetch in a memory of the receiver device. In response to determining that Unicast Fetch is not active (i.e., determination block 802="No"), the Multicast Service Device Client or client application may proceed to block 502 of FIG. 5A to perform operations of the method 500a.

In response to determining that Unicast Fetch is active (i.e., determination block 802="Yes"), the Multicast Service Device Client or client application may receive a FDT via a broadcast or multicast transmission in block 806. The FDT may be received OTA and may be any FDT for a segment, such as a first FDT, last FDT, or intermediate FDT. In block 808, the Multicast Service Device Client or client application may set the segment associated with the received FDT as the base segment. In block 810, the Multicast Service Device Client or client application may determine the received FDT receipt time (FDTArrivalTimeBaseSegment).

In block 812, the Multicast Service Device Client or client application may determine the adjusted availability start time for the base segment (e.g., $AvailabilityS_{BASE}$) as the FDT receipt time (e.g., FDTArrivalTimeBaseSegment) plus the number of segment fragments per segment (SF) times the MSP plus a margin (M), such as:

Availability$_{S_{BASE}}$=FDTArrivalTimeBaseSegment+
(SF*MSP)+M).

In an embodiment, the value of the MSP may be a default value pre-provisioned to the receiver device. In another embodiment, the MSP may be a variable value associated with the temporary mobile group identifier (TMGI) for receiving the segments. The margin (M) may be an additional margin to account for processing delay by the receiver device and may be configured as a value pre-provisioned in a memory of the receiver device. In blocks 516, 518, 520, and 522 the Multicast Service Device Client or client application may perform operations of like numbered blocks of the method 600a described above with reference to FIG. 6A to determine the delay adjustment.

Figure 8B:
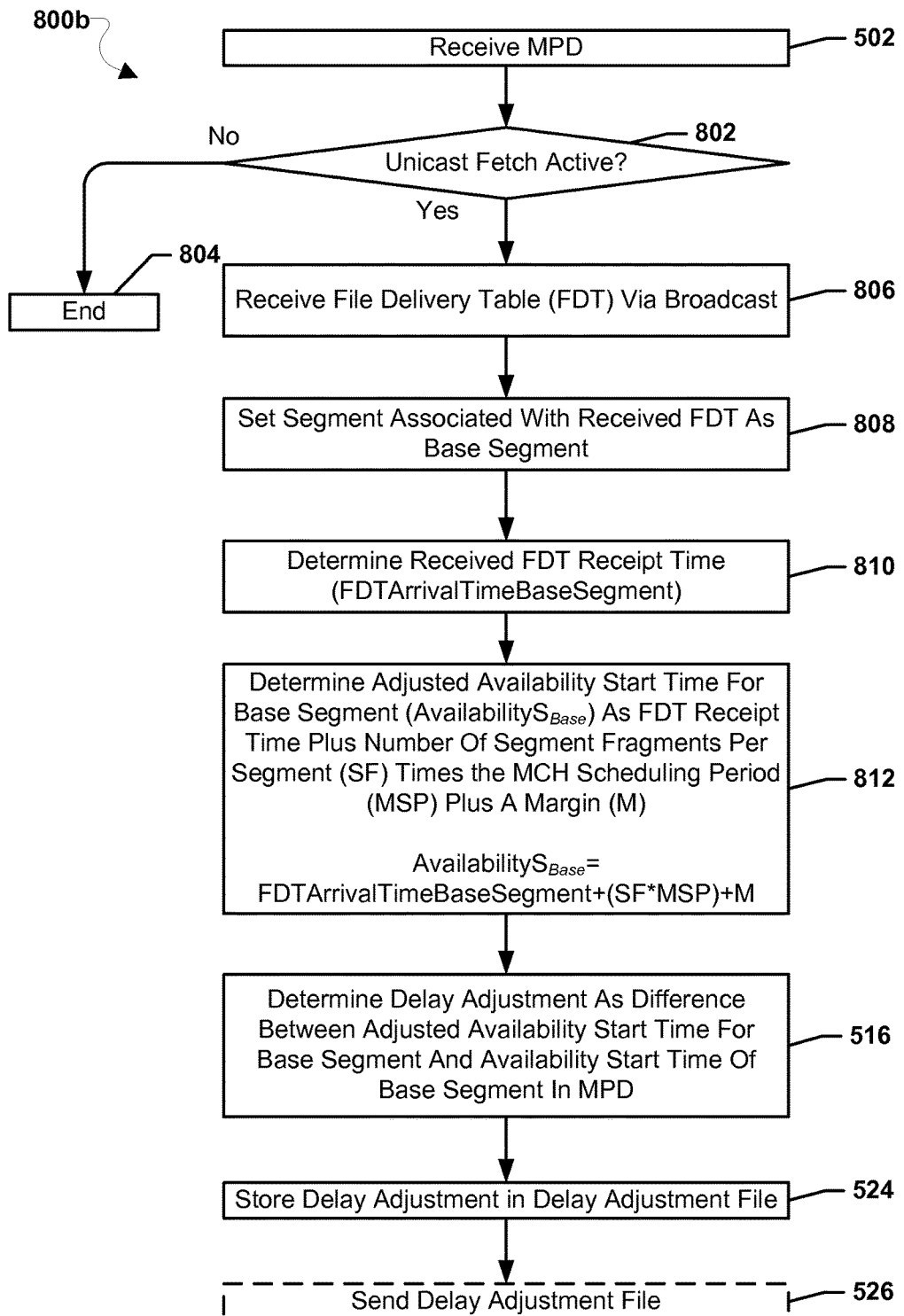
FIG. 8B is a process flow diagram illustrating an embodiment method for generating a delay adjustment message in a unicast mode based on any determined FDT receipt time.

FIG. 8B illustrates an embodiment method 800b for generating a delay adjustment message in a unicast mode based on any determined FDT receipt time. The method 800b is similar to the method 800a described above with reference to FIG. 8A, except that a delay adjustment message indicating shifts in the segment availability timeline may be generated without necessarily shifting the segment availability timeline. In an embodiment, the operations of the method 800b may be performed by a Multicast Service Device Client running on a processor of a receiver device, such as a smart phone. In another embodiment, the operations of the method 800b may be performed by a client application, such as a DASH client, running on a processor of a receiver device.

In blocks 502, 802, 804, 806, 808, 810, 812, and 516 the Multicast Service Device Client or client application may perform operations of like numbered blocks of the method 800a described above with reference to FIG. 8A to determine the delay adjustment. In blocks 524 and 526 the Multicast Service Device Client or client application may perform operations of like numbered blocks of the method 500b described above with reference to FIG. 5B to store and send the delay adjustment file.

Figure 9A:
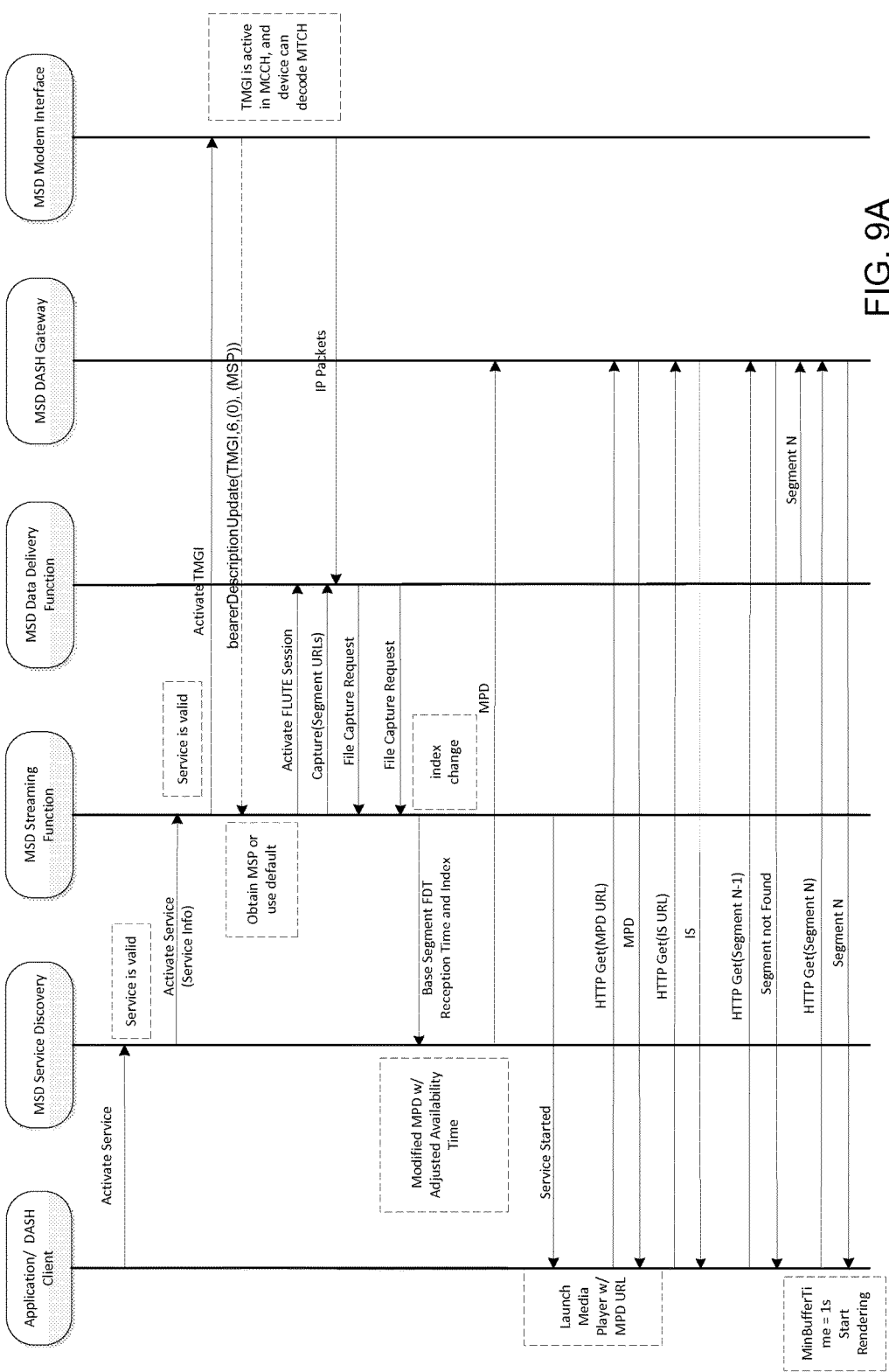
FIG. 9A is a message flow diagram illustrating interactions between the Multicast Service Device Client and an Application/DASH client on a receiver device according to an embodiment.

FIG. 9A is a message flow diagram illustrating interactions between the Multicast Service Device Client and an Application/DASH client on a receiver device according to an embodiment. The Application/DASH client may request a service be activated by sending a request to a Multicast Service Device Client Service Discovery Function. The Multicast Service Device Client Service Discover Function may receive the service request, determine the service is valid, and send service information to the Multicast Service Device Client Streaming Function to Activate the Service. The Multicast Service Device Client Streaming Function may determine the service is valid, and send a request to activate the temporary mobile group identifier (TMGI) for the service to the Multicast Service Device Client Modem Interface. The Multicast Service Device Client Streaming Function may also request the Multicast Service Device Client Data Delivery Function activate a FLUTE Session and request the Multicast Service Device Client Data Delivery Function capture segment URLs.

Once the temporary mobile group identifier is active in the mobile control channel (MCCH) and the device can decode the media transport channel (MTCH) IP packets received by the modem may be delivered from the Multicast Service Device Client Modem Interface to the Multicast Service Device Client Data Delivery Function. Optionally, the MSD Modem Interface may delivery a bearer description updated to the MSP Streaming Function. The Multicast Service Device Client Data Delivery Function may send file capture requests to the MSP Streaming Function. As segment N, N+1, N+2, etc. are received and decoded they may be sent to the Multicast Service Device Client Dash Gateway.

In an embodiment, when the Multicast Service Device Client Streaming Function determines an index change between received segment fragments, the Multicast Service Device Client Service Discovery Function may indicate the base segment FDT receipt time and index number to the Multicast Service Device Service Discovery Function which may modify the MPD to adjust availability start times as discussed above. The Multicast Service Device Client Service Discovery Function may send the modified MPD to the Multicast Service Device Client DASH Gateway. The Multicast Service Device Client Streaming Function may indicate the service has started to the Application/DASH Client.

The Application/DASH client may launch a media player and point the media player toward the URL of the modified MPD. The Application/DASH client may send an HTTP Get( ) Request for the modified MPD at the modified MPD URL. The Multicast Service Device Client DASH Gateway may respond with the modified MPD. The Application/DASH client may send an HTTP Get( ) Request for the initial segment (IS) at the IS URL. The Multicast Service Device Client DASH Gateway may respond with the IS. The Application/DASH client may send an HTTP Get( ) Request for the segment N−1. No segment N−1 may be available, and the Multicast Service Device Client DASH Gateway may respond that the segment was not found (e.g., 404 Not Found). The Application/DASH client may send an HTTP Get( ) Request for the segment N+1. The Multicast Service Device Client DASH Gateway may respond with the segment N+1.

Figure 9B:
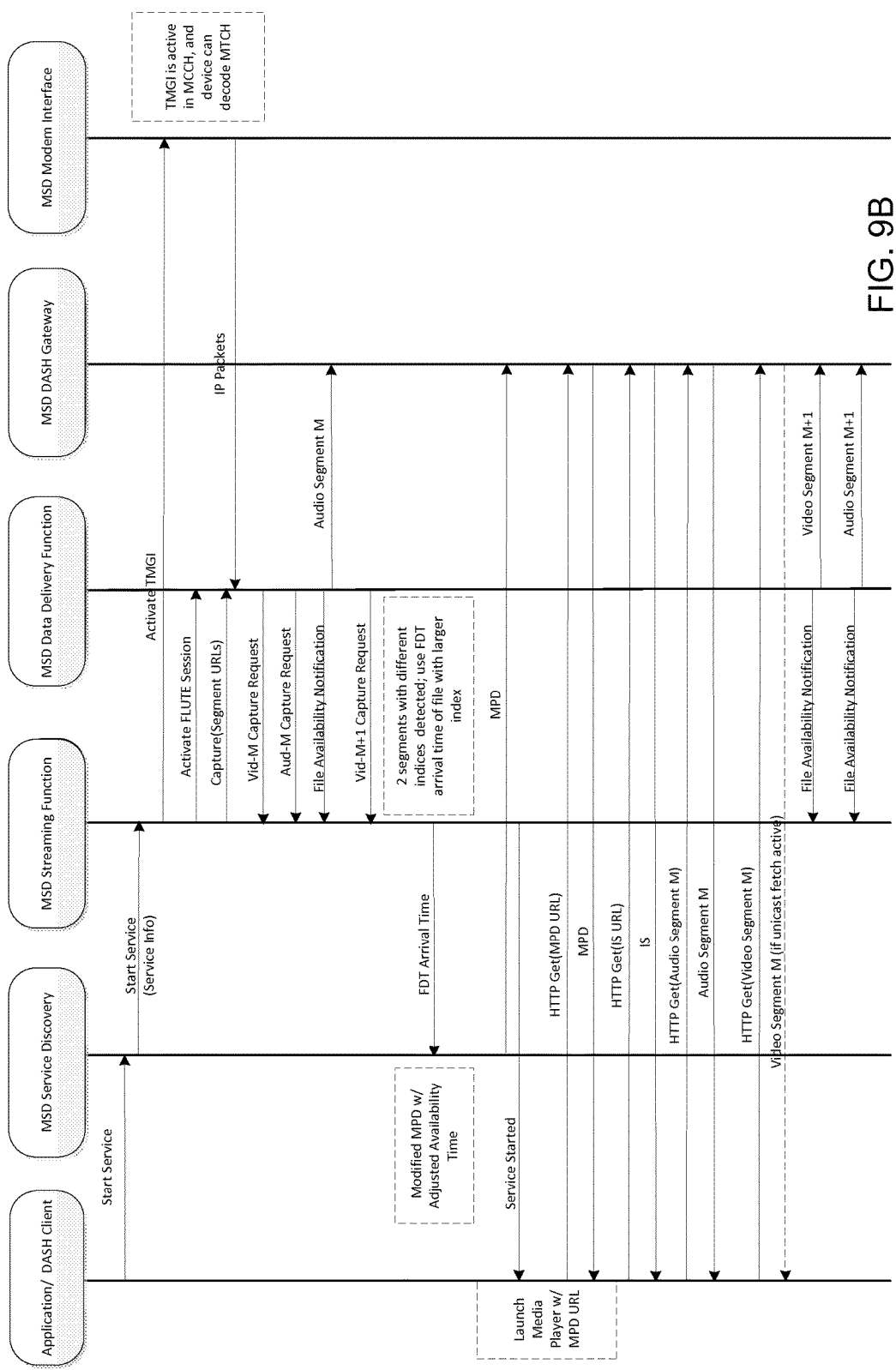
FIG. 9B is a message flow diagram illustrating interactions between the Multicast Service Device Client and an Application/DASH client on a receiver device according to another embodiment.

FIG. 9B is a message flow diagram illustrating interactions between the Multicast Service Device Client and an Application/DASH client on a receiver device according to another embodiment. The flow illustrated in FIG. 9B is similar to that described above with reference to FIG. 9A, except that in FIG. 9B Video and Audio segments may be captured independently. As the Multicast Service Device Client Data Delivery Function sends capture requests for Video segments indexed M and Audio segments indexed M it may also send capture requests for a next video segment indexed M+1. In an embodiment, when the Multicast Service Device Client Streaming Function determines an index change between received the video segment M and video segment M+1, the Multicast Service Device Client Service Discovery Function may indicate that video segment M+1 is the base segment and indicate the base segment FDT receipt time and index number to the Multicast Service Device Service Discovery Function which may modify the MPD to adjust availability start times as discussed above. The Multicast Service Device Client Service Discovery Function may send the modified MPD to the Multicast Service Device Client DASH Gateway. The Multicast Service Device Client Streaming Function may indicate the service has started to the Application/DASH Client.

The Application/DASH client may launch a media player and point the media player toward the URL of the modified MPD. The Application/DASH client may send an HTTP Get( ) Request for the modified MPD at the modified MPD URL. The Multicast Service Device Client DASH Gateway may respond with the modified MPD. The Application/DASH client may send an HTTP Get( ) Request for the initial segment (IS) at the IS URL. The Multicast Service Device Client DASH Gateway may respond with the IS. The Application/DASH client may send an HTTP Get( ) Request for the audio segment M and receive audio segment M. In an embodiment, video segment M may be received via Unicast fetch when active, and the Multicast Service Device Streaming function may be notified of the availability of video segment M+1 and audio segment M+1 when those segments become available via broadcast or multicast.

While FIGS. 9A and 9B illustrate the Multicast Service Device Service Discovery Function modifying the MPD, in other embodiments the Multicast Service Device Service Discovery Function may generate a delay adjustment message or file including an indication of a delay adjustment that may be used to shift the availability start times in the MPD such that the times reflect when segments will actually be available to the Application/DASH client on the receiver device. Thus, the Multicast Service Device Client or the Application/DASH client may use the delay adjustment message or file to shift availability start times in the MPD and/or request segments when segments will actually be available to the Application/DASH client on the receiver device.

Figure 10:
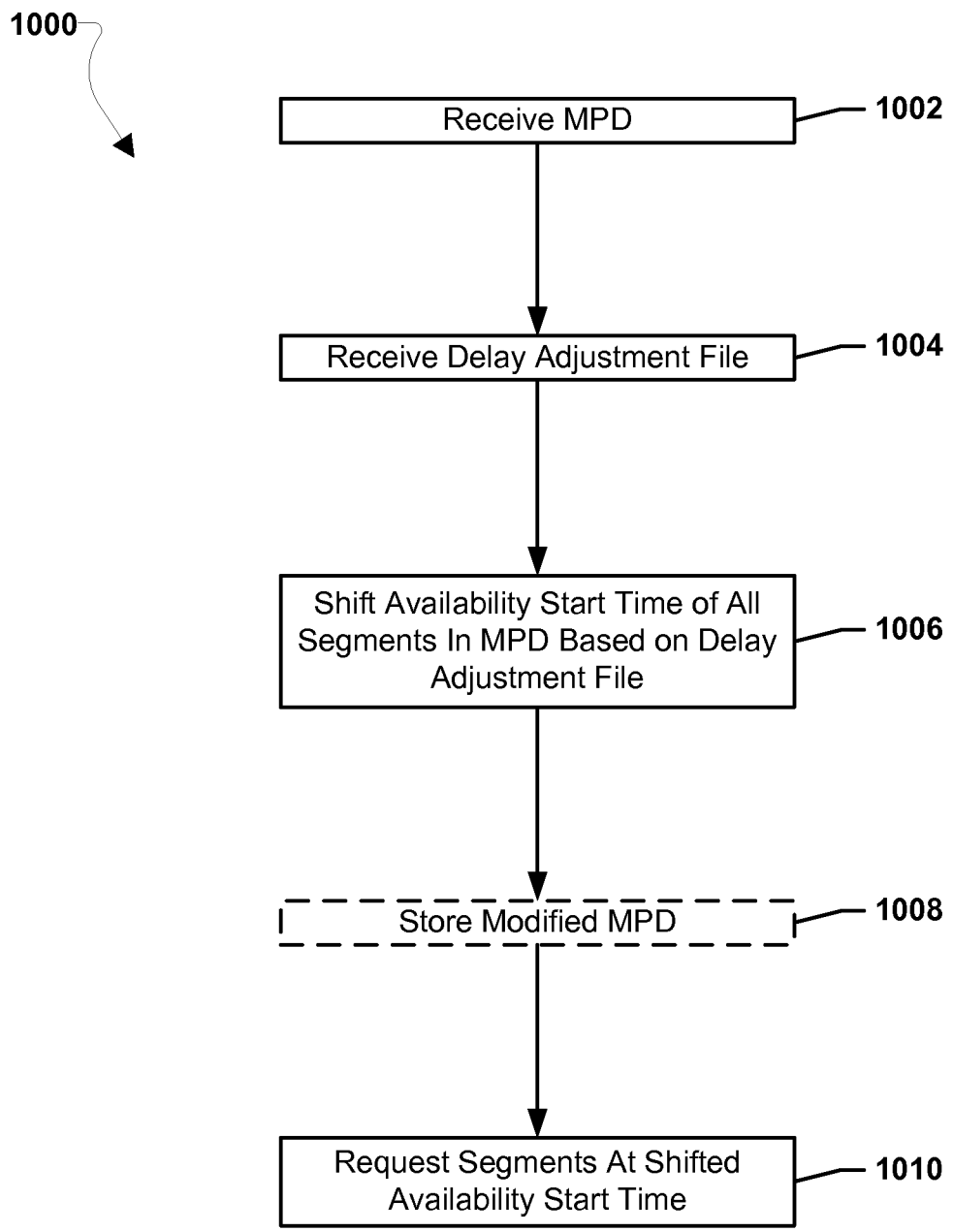
FIG. 10 is a process flow diagram illustrating an embodiment method for adjusting availability start times based on a delay adjustment message.

FIG. 10 is a process flow diagram illustrating an embodiment method for adjusting availability start times based on a delay adjustment message. In an embodiment, the operations of the method 1000 may be performed by a client application, such as a DASH client, running on a processor of a receiver device, such as a smart phone. In block 1002 the client application may receive an MPD. In an embodiment, the client application may receive an MPD via an HTTP server on the receiver device via a Multicast Service Device Client. In block 1004 the client application may receive a delay adjustment message. In an embodiment, the client application may receive and a delay adjustment message via an HTTP server on the receiver device via a Multicast Service Device Client.

In block 1006, the client application may shift the availability start time of some or all segments in the MPD based on the delay adjustment message. In an embodiment, shifting the availability start time based on the delay adjustment message may include using an indication of a delay adjustment and/or other value to adjust the time at which each segment will be available on the receiver device. In an embodiment, shifting the availability start time may include modifying the MPD itself to generate a modified MPD. In another embodiment, shifting the availability start time may involve changing an indication of when a segment will be available on the receiver device without modifying the MPD itself. In an embodiment in which the MPD is modified, in optional block 1008 the client application may store the modified MPD in a memory available to the client application. In block 1010, the client application may request segments at the shifted availability start times.

Figure 11A:
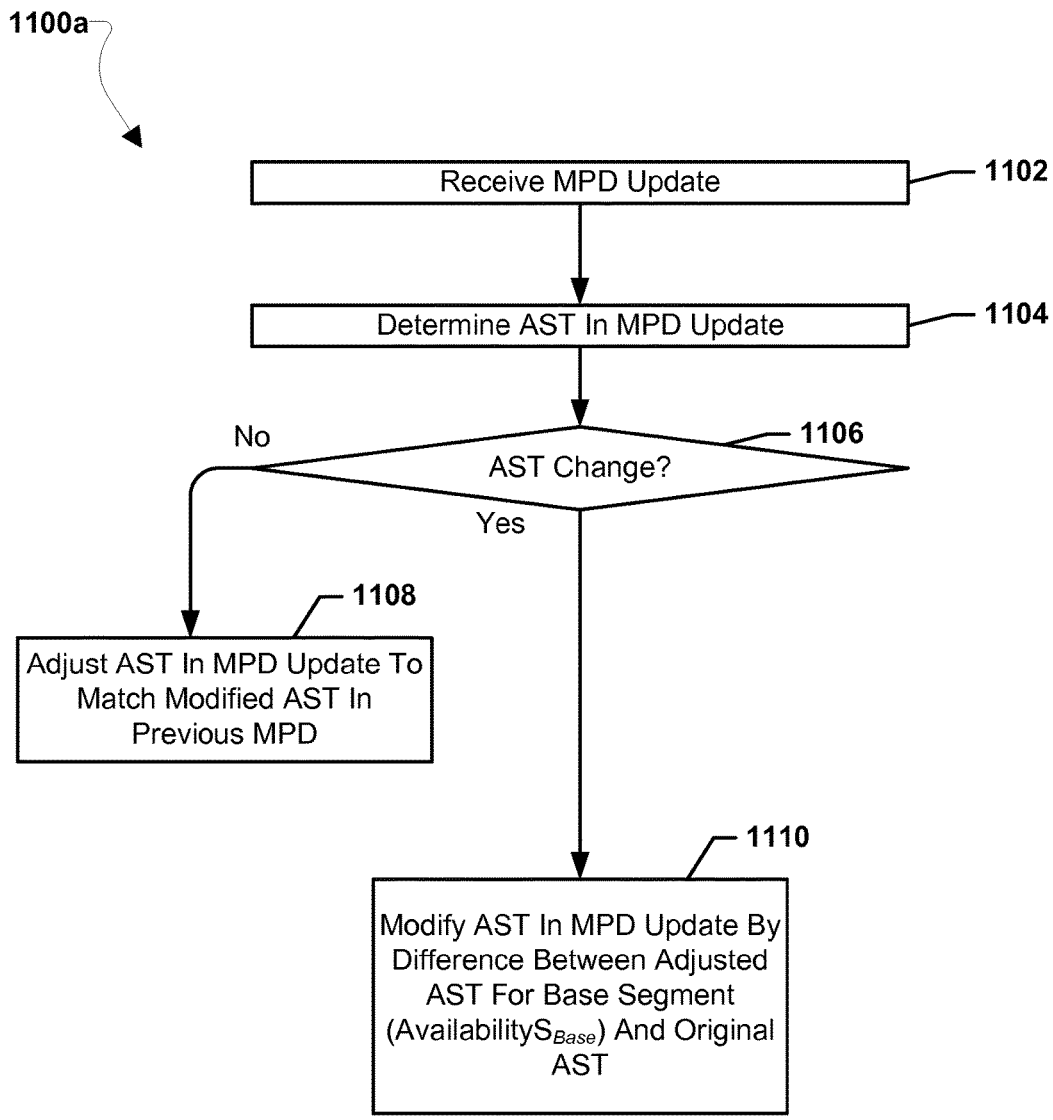
FIG. 11A is a process flow diagram illustrating an embodiment method for handling MPD updates.

FIG. 11A is a process flow diagram illustrating an embodiment method for handling MPD updates. In an embodiment, the operations of the method 1100a may be performed by a Multicast Service Device Client running on a processor of a receiver device, such as a smart phone. In another embodiment, the operations of the method 1100a may be performed by a client application, such as a DASH client, running on a processor of a receiver device.

In block 1102, the Multicast Service Device Client or client application may receive an MPD update. In an embodiment, the MPD update may be received from the network, and the headend may set the availability start time of the segments in the MPD update. In an embodiment, the availability start time in the MPD update may be set by the network and may account for the worst case end-to-end transport delay from the encoder generating the segments to the receiver device. In an embodiment the client application may receive the MPD update via the Multicast Service Device Client.

In block 1104 the Multicast Service Device Client or client application may determine the availability start time (AST) set in the MPD update. In determination block 1106 the Multicast Service Device Client or client application may determine whether an AST change between the originally received MPD and the MPD update has occurred. For example, the Multicast Service Device Client or client application may compare the AST indicated in the original MPD before any modification of the MPD to the AST in the MPD update.

In response to determining that the AST in the MPD update is the same as the original AST (i.e., determination block 1106="No"), the Multicast Service Device Client or client application may adjust the AST in the MPD update to match the modified AST in the previously modified MPD in block 1108. In response to determining that the ASTs do not match (i.e., determination block 1106="Yes"), the Multicast Service Device Client or client application may modify the AST in the MPD update by the difference between the determined adjusted availability start time for the base segment (Availability$S_{Base}$) and the original AST prior to modification.

Figure 11B:
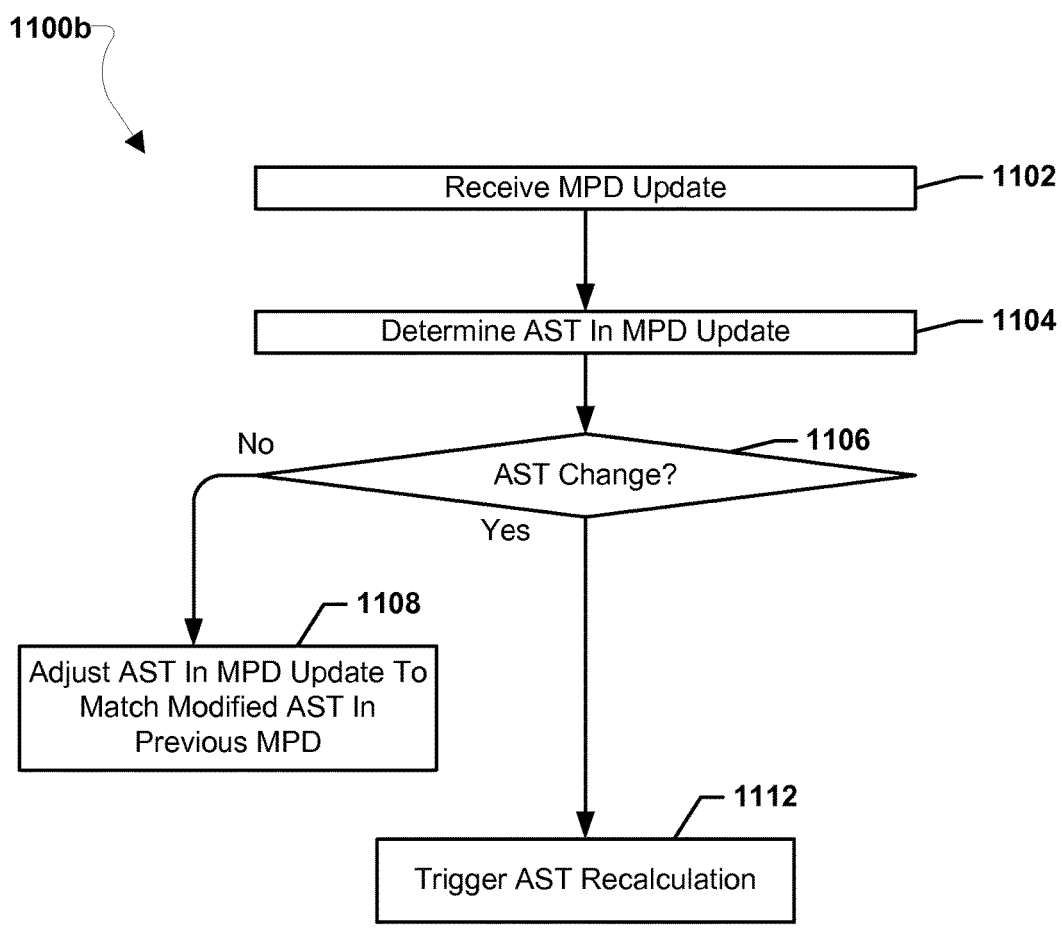
FIG. 11B is a process flow diagram illustrating another embodiment method for handling MPD updates.

FIG. 11B illustrates an embodiment method 1100b for handling MPD updates. The method 1100b is similar to the method 1100a described above with reference to FIG. 11A, except that a change in AST in the MPD update may trigger an availability start time recalculation. In an embodiment, the operations of the method 1100b may be performed by a Multicast Service Device Client running on a processor of a receiver device, such as a smart phone. In another embodiment, the operations of the method 1100b may be performed by a client application, such as a DASH client, running on a processor of a receiver device. In blocks 1102, 1104, 1106, and 1108 the Multicast Service Device Client or client application may perform operations of like numbered blocks of the method 1100a described above with reference to FIG. 11A.

In response to determining the ASTs do not match (i.e., determination block 1106="Yes"), the Multicast Service Device Client or client application may trigger recalculation of the availability start time in block 1112. For example, the Multicast Service Device Client or client application may send an interrupt causing the Multicast Service Device Client or client application to perform operations of one of the methods 500a, 500b, 600a, 600b, 800a, or 800b described above with reference to FIG. 5A, 5B, 6A, 6B, 8A, or 8B, to modify availability start times in the MPD update. As a further example, triggering an availability start time recalculation may include issuing a notification to an application that activated a service associated with the segment.

Figure 12:
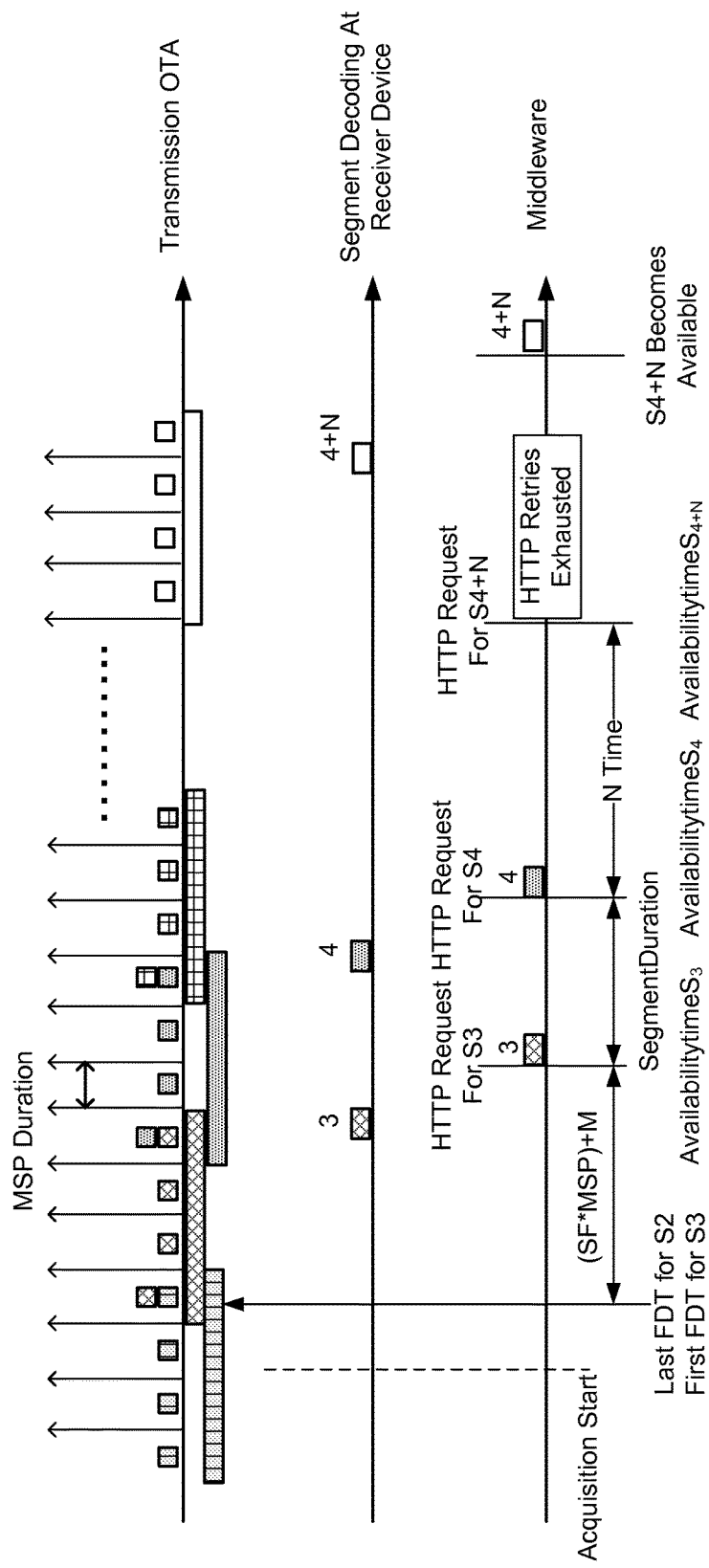
FIG. 12 illustrates availability time lines, MPD availability start times, transmission times, and arrival times according to another embodiment.

FIG. 12 illustrates availability time lines, MPD availability start times, transmission times, and arrival times according to another embodiment. FIG. 12 illustrates that over time, though the availability start time of a segment, such as segment 3, may be determined and the availability start time shifted to account for when the segment may actually be available at the receiver device (e.g., based on the receipt time of its first FDT), timing drift on the receiver device may cause the availability start times in the modified MPD to no longer be valid.

After some time N, the availability start time, Availabilitytime$S_{4+N}$ may be indicated in the modified MPD and the DASH client may issue a HTTP request for the segment S4+N. However, due to receiver device timing drift the HTTP retries may be exhausted by the DASH client without receiving segment S4+N. Thus, segment S4+N may become available after the DASH client has stopped attempting to request segment S4+N due to receiver device timing drift. In various embodiments, the receipt a segment S4+N after the HTTP retries of the DASH client are exhausted (e.g., once segment S4+N+1 is requested) may trigger recalculation of the availability start time. In this manner, the availability start time recalculation may account for receiver device timing drift.

Figure 13:
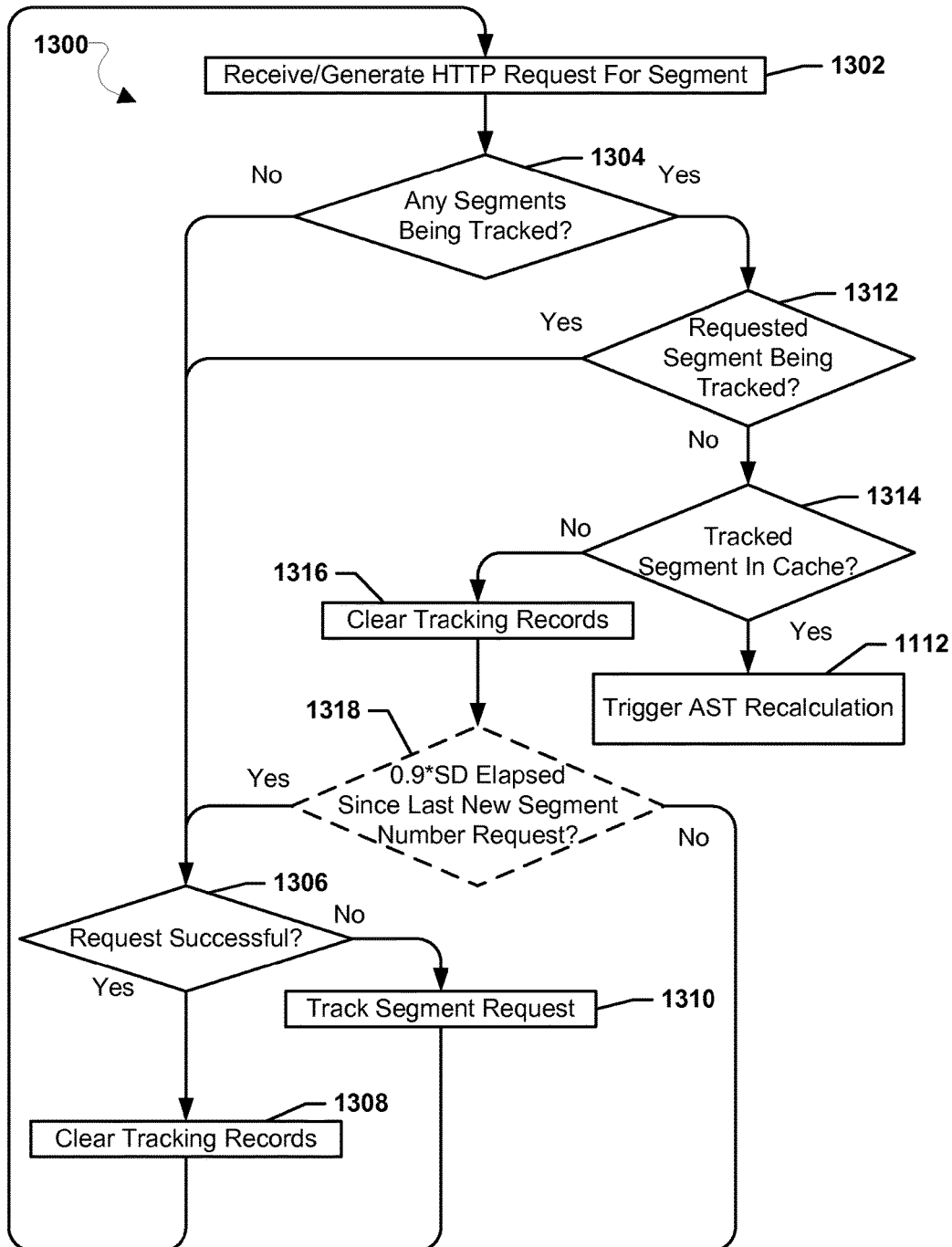
FIG. 13 is a process flow diagram illustrating an embodiment method for accounting for receiver device timing drift.

FIG. 13 illustrates an embodiment method 1300 for accounting for receiver device timing drift. In an embodiment, the operations of the method 1300 may be performed by a Multicast Service Device Client running on a processor of a receiver device, such as a smart phone. In another embodiment, the operations of the method 1300 may be performed by a client application, such as a DASH client, running on a processor of a receiver device.

In block 1302, the Multicast Service Device Client may receive a HTTP request for a segment or the client application may generate a HTTP request. The HTTP request may indicate the URI of the segment and the segment number. In determination block 1304 the Multicast Service Device Client or client application may determine whether any segments are currently being tracked. In various embodiments, segments may be tracked when a HTTP request associated with that segment has failed.

In response to determining that no segments are being tracked (i.e., determination block 1304="No"), the Multicast Service Device Client or client application may determine whether the request is successful in block 1306. For example, the Multicast Service Device Client or client application may determine whether or not a 400 series HTTP response indicating the requested segment was unavailable was received to determine whether the request was successful. In response to determining that the request was successful (i.e., determination block 1306="Yes"), the Multicast Service Device Client or client application may clear the tracking records in block 1308 and receive or generate a next HTTP request for a next segment in block 1302.

In response to determining that the request failed (i.e., determination block 1306="No"), the Multicast Service Device Client or client application may begin tracking the requested segment in block 1310 and receive or generate a HTTP request for the same segment again in block 1302.

In response to determining that a segment is being tracked (i.e., determination block 1304="Yes"), the Multicast Service Device Client or client application may determine whether the requested segment is being tracked in determination block 1312. In response to determining that the requested segment is being tracked (i.e., determination block 1312="Yes"), as discussed above, the Multicast Service Device Client or client application may determine whether the request is successful and clear the tracking records or continue to track the segment in blocks 1306, 1308, and 1310.

In response to determining that a segment that is being tracked is not the requested segment (i.e., determination block 1312="No"), the Multicast Service Device Client or client application may determine whether the tracked segment is in the cache (e.g., in a memory location allocated to received segment storage) in block 1314. In this manner, the Multicast Service Device Client or client application may check whether a segment the Multicast Service Device Client or client application previously requested but failed to receive has subsequently been received.

In response to determining that the tracked segment is not in the cache (i.e., determination block 1314="No"), the Multicast Service Device Client or client application may clear the tracking records in block 1316. In an optional embodiment, in block 1318 the Multicast Service Device Client or client application may determine whether ninety percent of a segment duration (e.g., 0.9*SD) has elapsed since the last new segment number was requested. In this manner, start up scenarios in which multiple segments may be requested at once may be distinguished from regularly timed requests occurring approximately every segment duration. In such an optional embodiment, in response to determining that ninety percent of a segment duration has not elapsed (i.e., determination block 1318="No"), the Multicast Service Device Client or client application may receive or generate a HTTP request for a segment in block 1302. While illustrated as ninety percent of a segment duration (e.g., 0.9*SD), any percentage value of a segment duration may be selected. For example, ten percent, fifty percent, ninety five percent, or any other percentage value of a segment duration may be substituted for the ninety percent of a segment duration in the examples described herein.

Upon clearing the tracking records in block 1316, or in an optional embodiment in response to determining that ninety percent of a segment duration has elapsed (i.e., determination block 1318="Yes"), the Multicast Service Device Client or client application may determine whether the request is successful and clear the tracking records or continue to track the segment in blocks 1306, 1308, and 1310.

In response to determining that the tracked segment is in the cache (i.e., determination block 1314="No"), the Multicast Service Device Client or client application may trigger recalculation of the availability start time in block 1112. For example, the Multicast Service Device Client or client application may send an interrupt causing the Multicast Service Device Client or client application to perform operations of one of the methods 500a, 500b, 600a, 600b, 800a, or 800b described above with reference to FIG. 5A, 5B, 6A, 6B, 8A, or 8B, to modify availability start times in the MPD. In this manner, timing drift at the receiver device may be identified by the late arrival of segments and the timing drift may be accounted for by the Multicast Service Device Client or client application.

Figure 14:
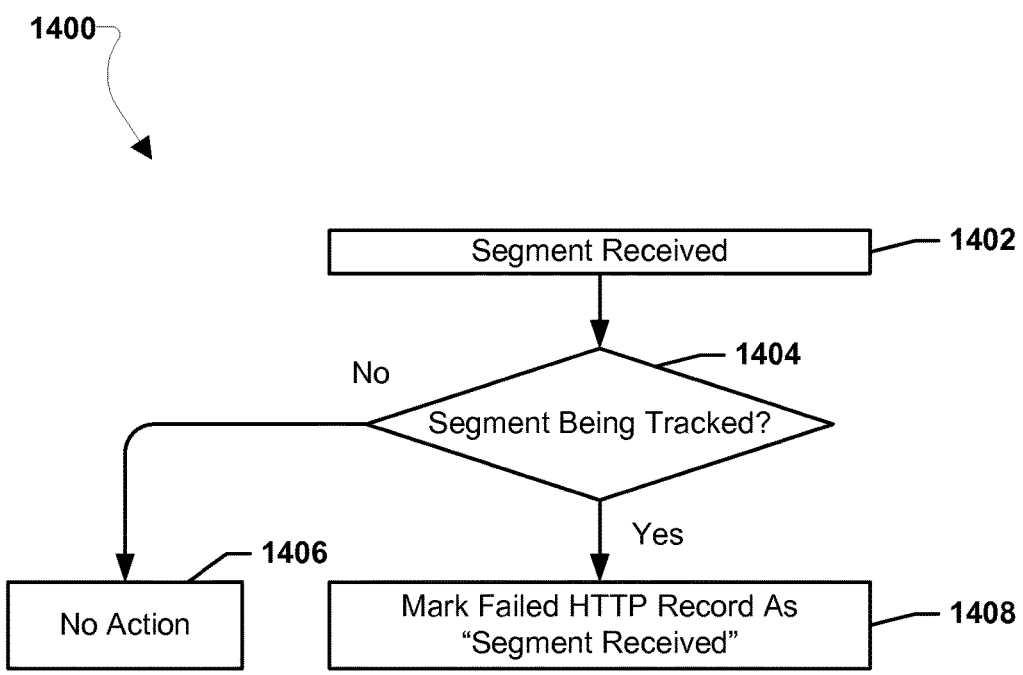
FIG. 14 is a process flow diagram illustrating an embodiment method for marking failed HTTP records.

FIG. 14 illustrates an embodiment method 1400 for marking failed HTTP records. In an embodiment, the operations of the method 1400 may be performed by a Multicast Service Device Client running on a processor of a receiver device, such as a smart phone. In another embodiment, the operations of the method 1400 may be performed by a client application, such as a DASH client, running on a processor of a receiver device. In various embodiments, the operations of the method 1400 may be performed in conjunction with the operations of the methods 1500a and/or 1500b described below with reference to FIGS. 15A and 15B.

In block 1402, the Multicast Service Device Client or client application may receive a segment. For example, the segment may be received via broadcast or multicast OTA transmissions. In determination block 1404, the Multicast Service Device Client or client application may determine whether the segment received is being tracked. For example, the Multicast Service Device Client or client application may determine whether a Failed HTTP Record exists associated with the URI and/or segment index of the received segment. In response to determining that the segment is not being tracked (i.e., determination block 1404="No"), the Multicast Service Device Client or client application may take no action in block 1406. In response to determining that the segment is being tracked (i.e., determination block 1408="Yes"), the Multicast Service Device Client or client application may mark the failed HTTP record as "segment received." In this manner, failed HTTP requests associated with later received segments may be identified and distinguished from failed HTTP requests associated with un-received segments.

Figure 15A:
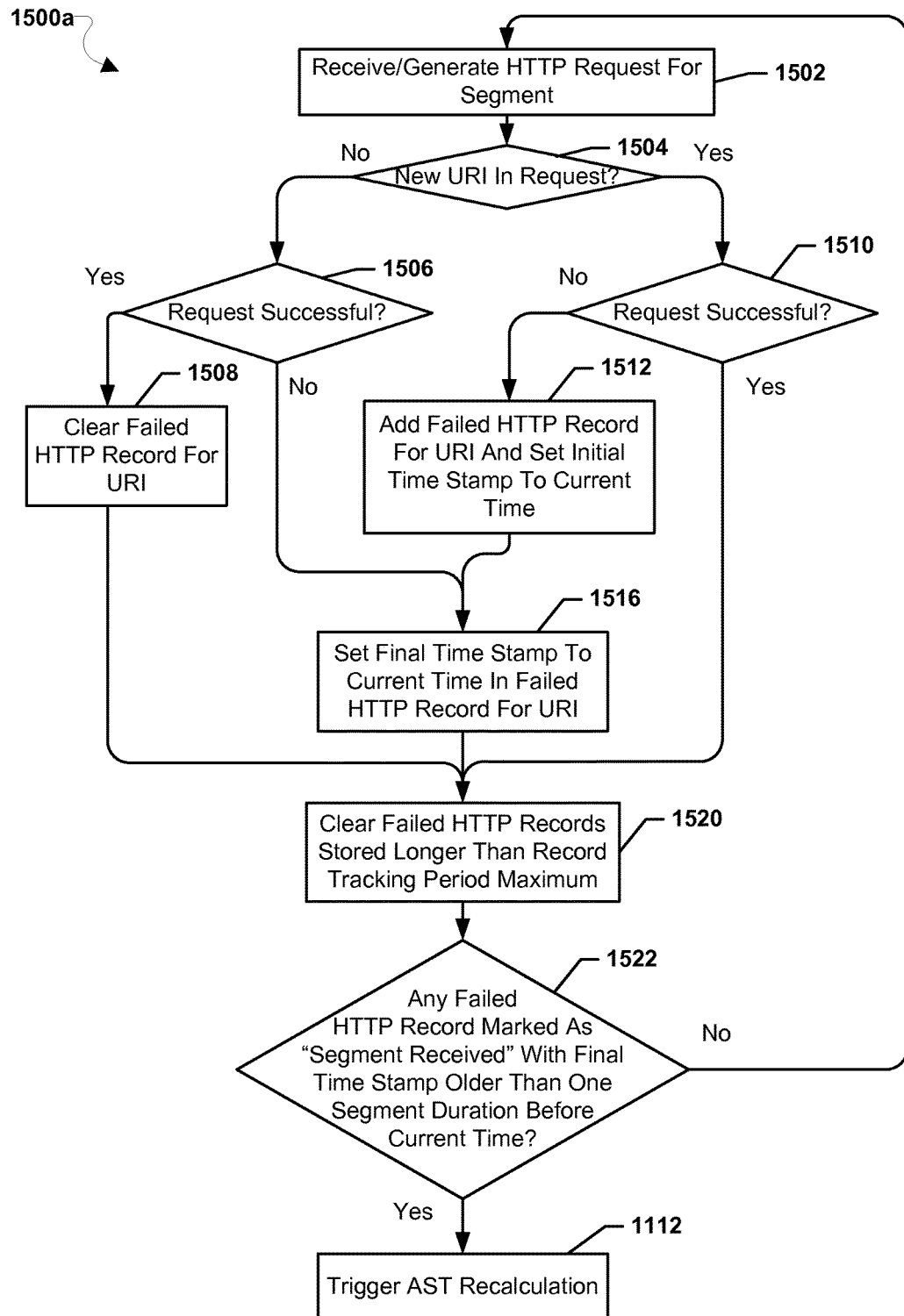
FIG. 15A is a process flow diagram illustrating another embodiment method for accounting for receiver device timing drift.

FIG. 15A illustrates an embodiment method 1500a for accounting for receiver device timing drift. In an embodiment, the operations of the method 1500a may be performed by a Multicast Service Device Client running on a processor of a receiver device, such as a smart phone. In another embodiment, the operations of the method 1500a may be performed by a client application, such as a DASH client, running on a processor of a receiver device. In various embodiments, the operations of the method 1500a may be performed in conjunction with the operations of the methods 1400 described above with reference to FIG. 14.

In block 1502, the Multicast Service Device Client may receive an HTTP request for a segment or the client application may generate an HTTP request. The HTTP request may indicate the URI of the segment and the segment number. In determination block 1504, the Multicast Service Device Client or client application may determine whether there is a new URI indicated in the request. For example, the Multicast Service Device Client or client application may compare the URI in the HTTP request to the URI in the previous HTTP request to determining whether the URI is new.

In response to determining the URI is new (i.e., determination block 1504="No"), the Multicast Service Device Client or client application may determine whether the request was successful in block 1506. For example, the Multicast Service Device Client or client application may determine whether or not a 400 series HTTP response indicating the requested segment was unavailable was received to determine whether the request was successful. In response to determining that the request was successful (i.e., determination block 1506="Yes"), the Multicast Service Device Client or client application may clear any failed HTTP record for the URI in block 1508.

In response to determining that the URI is not new (i.e., determination block 1504="Yes"), the Multicast Service Device Client or client application may determine whether the request was successful in block 1510. For example, the Multicast Service Device Client or client application may determine whether or not a 400 series HTTP response indicating the requested segment was unavailable was received to determine whether the request was successful. In response to determining the request failed (i.e., determination block 1510="No"), the Multicast Service Device Client or client application may add a failed HTTP record for the URI and set the initial time stamp in the failed URI record to the current time in block 1512.

In response to determining that the request was not successful (i.e., determination block 1506="No"), or upon adding a failed HTTP record for the URI in block 1512, the Multicast Service Device Client or client application may set the final time stamp in the failed HTTP record for the URI to the current time in block 1516. In this manner, the time from the initial time stamp to the final time stamp in the failed HTTP record for the URI may indicate the tracking period for that failed HTTP record.

In response to clearing the failed HTTP record for the URI in block 1508, setting the final time stamp in block 1516, or determining that the request was successful (i.e., determination block 1510="Yes"), the Multicast Service Device Client or client application may clear any failed HTTP records stored longer than a record tracking period maximum in block 1520. For example, the record tracking period maximum may be twice the FFR period, such as ten seconds. Failed HTTP records with the time from the initial time stamp to the final time stamp in the failed HTTP record longer than the record tracking period maximum may be cleared (e.g., deleted).

In determination block 1522, the Multicast Service Device Client or client application determine whether any failed HTTP record marked as "segment received" with a final time stamp older than one segment duration before the current time exist in a memory available to the Multicast Service Device Client or client application. In response to determining that no failed HTTP records marked "segment received" are older than one segment duration (i.e., determination block 1522="No"), the Multicast Service Device Client or client application may receive or generate the next HTTP request in block 1502.

In response to determining that a failed HTTP record marked "segment received" is older than one segment duration (i.e., determination block 1522="Yes"), the Multicast Service Device Client or client application may trigger recalculation of the availability start time in block 1112. For example, the Multicast Service Device Client or client application may send an interrupt causing the Multicast Service Device Client or client application to perform operations of one of the methods 500a, 500b, 600a, 600b, 800a, or 800b described above with reference to FIG. 5A, 5B, 6A, 6B, 8A, or 8B, to modify availability start times in the MPD. In this manner, timing drift at the receiver device may be identified by the late arrival of segments and the timing drift may be accounted for by the Multicast Service Device Client or client application.

Figure 15B:
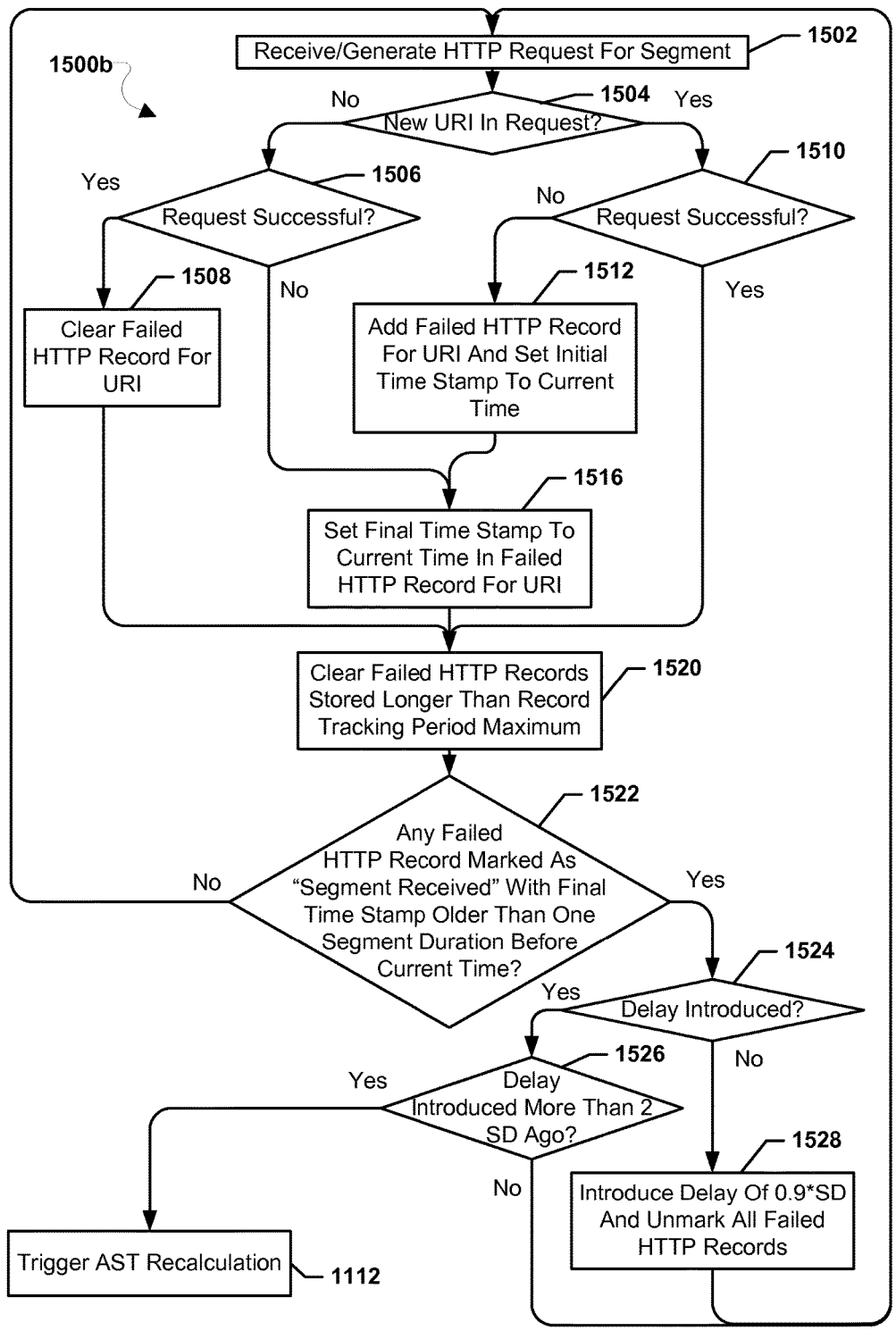
FIG. 15B is a process flow diagram illustrating a third embodiment method for accounting for receiver device timing drift.

FIG. 15B illustrates an embodiment method 1500b for accounting for receiver device timing drift. Embodiment method 1500b is similar to method 1500a described above with reference to FIG. 15A, except that a delay may be introduced before triggering an availability start time recalculation. In an embodiment, the operations of the method 1500b may be performed by a Multicast Service Device Client running on a processor of a receiver device, such as a smart phone. In another embodiment, the operations of the method 1500b may be performed by a client application, such as a DASH client, running on a processor of a receiver device. In blocks 1502, 1504, 1506, 1508, 1510, 1512, 1516, 1518, 1520, and 1522, the Multicast Service Device Client or client application may perform operations of like numbered blocks of the method 1500a described above with reference to FIG. 15A.

In response to determining that a failed HTTP record marked "segment received" is older than one segment duration (i.e., determination block 1522="Yes"), the Multicast Service Device Client or client application may determine whether a delay has already been introduced in determination block 1524. In response to determining a delay has not been introduced (i.e., determination block 1524="No"), in block 1528 the Multicast Service Device Client or client application may introduce a delay of ninety percent of a segment duration (0.9*SD) and unmark all failed HTTP records. In this manner, the availability start time recalculation may not be immediately triggered and segments for failed HTTP records may have to be received a second time before those segments may be re-marked as "segment received." The forced re-request of a segment may enable recalculation of availability start times to be avoided when segments may be received prior to end of their respective availability start time. In block 1502 the Multicast Service Device Client or client application may receive or generate the next HTTP request.

In response to determining that a delay is already introduced (i.e., determination block 1524="Yes"), the Multicast Service Device Client or client application may determine whether the delay was introduced more than two segment durations ago. In response to determining that the delay was not introduced more than two segment durations ago (i.e., determination block 1526="No"), in the Multicast Service Device Client or client application may receive or generate the next HTTP request in block 1502.

In response to determining the delay was introduced more than two segment durations ago (i.e., determination block 1526="Yes"), the Multicast Service Device Client or client application may trigger recalculation of the availability start time in block 1112. For example, the Multicast Service Device Client or client application may send an interrupt causing the Multicast Service Device Client or client application to perform operations of one of the methods 500a, 500b, 600a, 600b, 800a, or 800b described above with reference to FIG. 5A, 5B, 6A, 6B, 8A, or 8B, to modify availability start times in the MPD. In this manner, timing drift at the receiver device may be identified by the late arrival of segments and the timing drift may be accounted for by the Multicast Service Device Client or client application.

Figure 16:
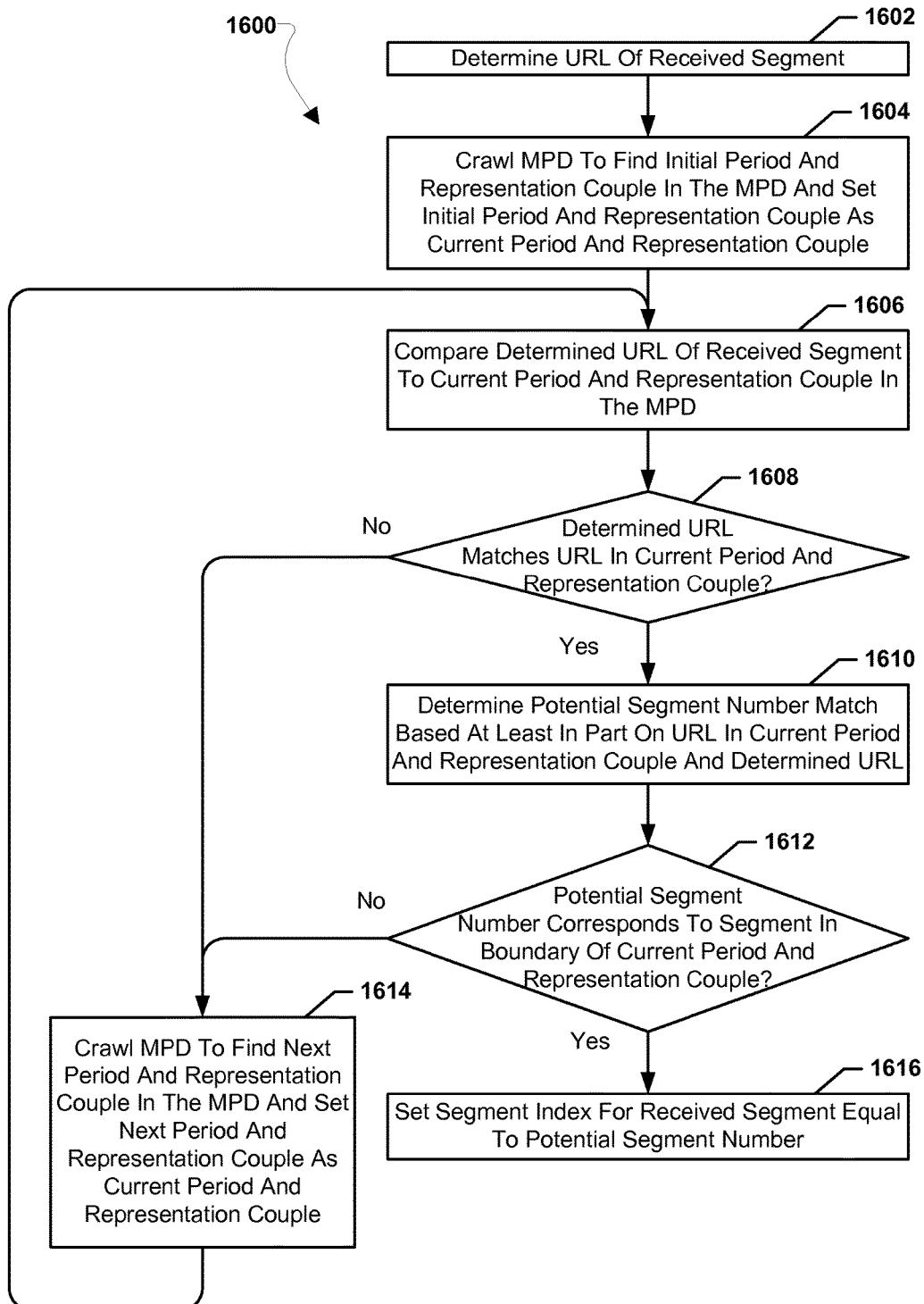
FIG. 16 is a process flow diagram illustrating an embodiment method for determining a segment index by URL matching.

FIG. 16 illustrates an embodiment method 1600 for determining a segment index by URL matching. In an embodiment, the operations of the method 1600 may be performed by a Multicast Service Device Client running on a processor of a receiver device, such as a smart phone. In another embodiment, the operations of the method 1600 may be performed by a client application, such as a DASH client, running on a processor of a receiver device. In various embodiments, the operations of the method 1600 may be performed in conjunction with the operations of the methods 500a or 500b described above with reference to FIGS. 5A and 5B, respectively. For example, the operations of the method 1600 may be performed after receiving an MPD (block 502 of FIG. 5A or 5B) and the segment fragment (block 504 of FIG. 5A or 5B) and before determining whether a segment index change occurred (block 506 of FIG. 5A or 5B).

In block 1602 the Multicast Service Device Client or client application may determine the URL of the received segment. For example, the URL for the received segment may follow a URL template "xxx$number$yyy". As another example, audio and video segments corresponding to the same time duration may have the same $time$ tag in the URL template. In block 1604 the Multicast Service Device Client or client application may crawl the MPD to find an initial period and representation couple in the MPD and set the initial period and representation couple as the current period and representation couple. In the various MPD, crawling the MPD may include parsing the file, such as an XML file, representing the MPD. As discussed herein, period and representation couples may be the unique representations defined by the MPD. Each period defined in the MPD may include attributes for one or more representation, for example one or more adaptation sets, and the combination of a period and an individual representation from the one or more representations may constitute a period and representation couple. The period and representation couples in the MPD may include attributes describing each period and representation for the service, including period boundaries, URL formats, segment durations, segment timescales, starting numbers, bandwidth, period identifiers, etc.

In block 1606 the Multicast Service Device Client or client application may compare the determined URL of the received segment to the current period and representation couple in the MPD. For example, the Multicast Service Device Client or client application may compare the URL in the received segment to the URL indicated in the period and representation couple.

In determination block 1608 the Multicast Service Device Client or client application may determine whether the determined URL for the segment matches the URL in the current period and representation couple. In response to determining the URLs do not match (i.e., determination block 1608="No"), the Multicast Service Device Client or client application may crawl the MPD to find the next period and representation couple in the MPD and set the next period and representation couple as the current period and representation couple in block 1614. In block 1606 the Multicast Service Device Client or client application may compare the determined URL to the new current period and representation couple in the MPD.

In response to determining the URLs do match (i.e., determination block 1608="Yes"), the Multicast Service Device Client or client application may determine a potential segment number match based at least in part on the URL in the current period and representation couple and determined URL in block 1610. For example, the Multicast Service Device Client or client application may determine a potential segment number based at least in part on the URL by identifying a segment index at an end of a segment URL preceded by at least a non-numeric character and optionally a non-numeric character followed by a file extension.

In determination block 1612 the Multicast Service Device Client or client application may determine whether the potential segment number corresponds to the segment boundary of the current period and representation couple. The boundaries of the period may be determined based on either the period@start attribute or period@duration attribute of the MPD or by determining the different between the next period start attribute and the current period start attribute. In this manner the Multicast Service Device Client or client application may verify that the segment number corresponds to a segment within the boundaries of the current period.

In response to determining the segment number is not within the boundary of the current period (i.e., determination block 1612="No"), the Multicast Service Device Client or client application may crawl the MPD to crawl the MPD to find the next period and representation couple in the MPD and set the next period and representation couple as the current period and representation couple in block 1614. In the event that no match may be found, the procedure fails and the Multicast Service Device Client or client application may either not apply any adjustment to the MPD, or just add the margin M as an adjustment to the AST.

In response to determining the segment number is not within the boundary of the current period (i.e., determination block 1612="Yes"), the Multicast Service Device Client or client application may set the segment index for the received segment equal to the potential segment number in block 1614.

Figure 17A:
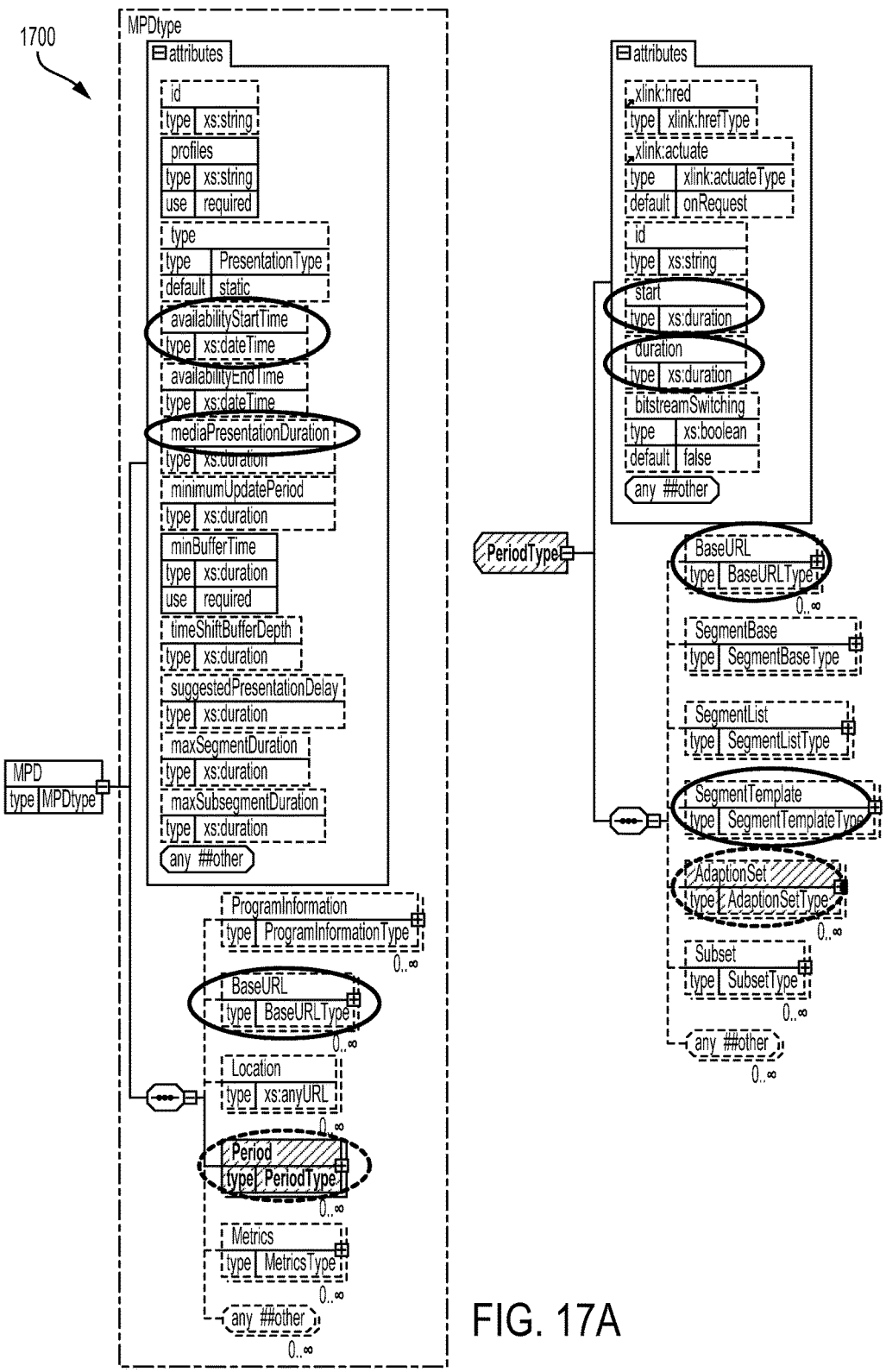
FIGS. 17A, 17B, and 17C are block diagrams of elements of an example MPD according to an embodiment.
Figure 17B:
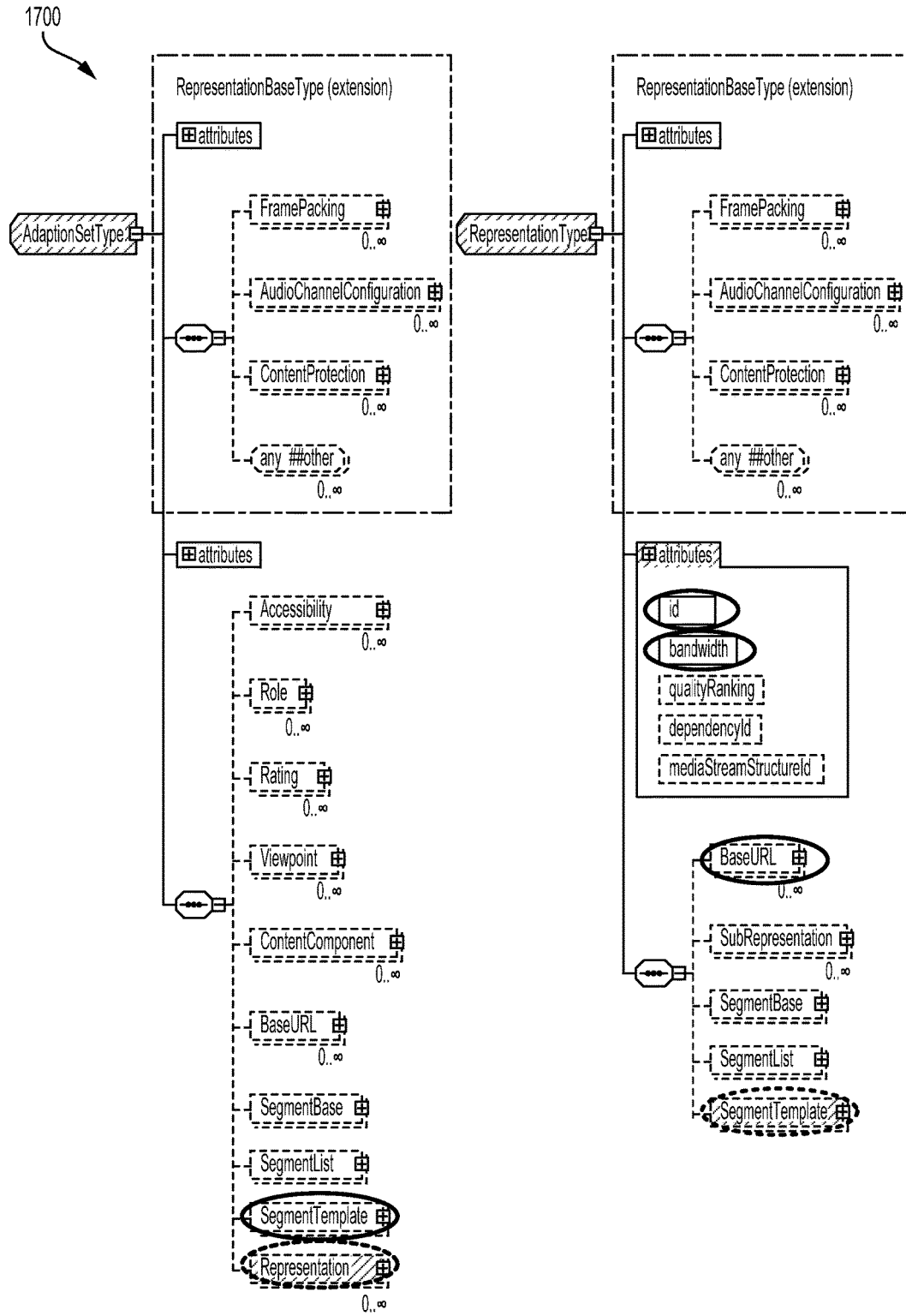
Figure 17C:
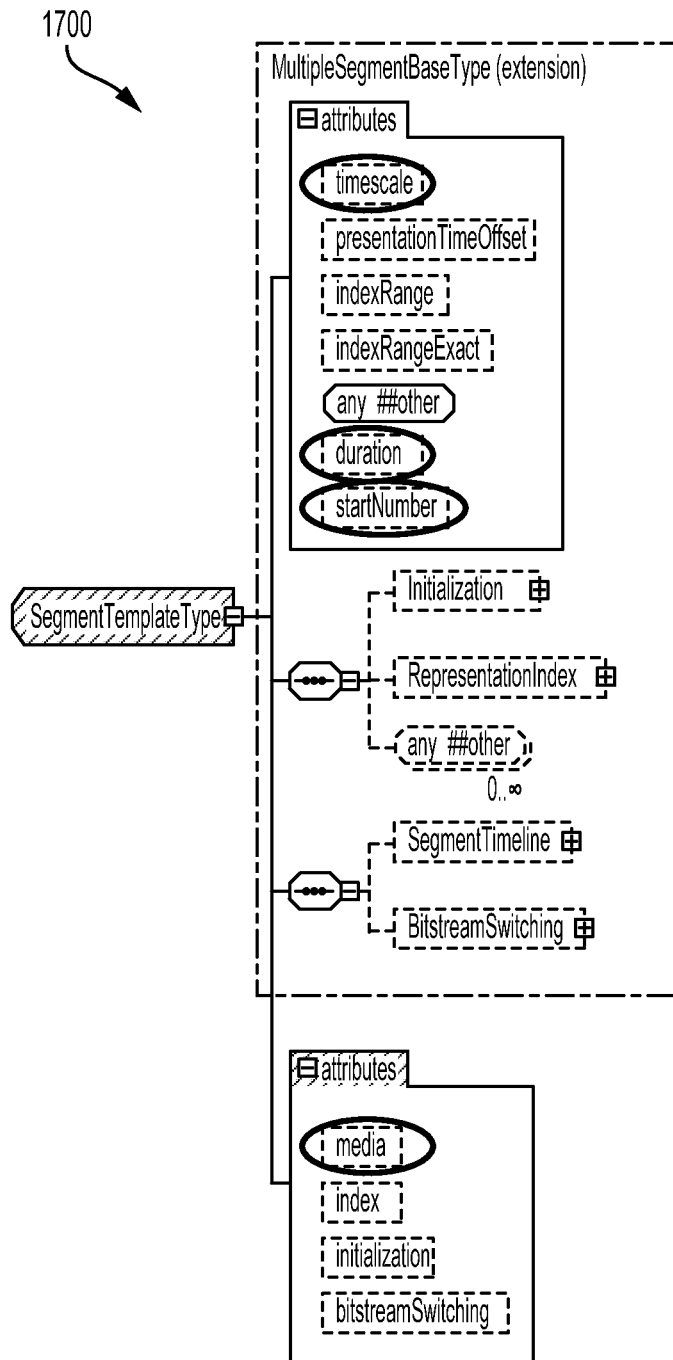

FIGS. 17A, 17B, and 17C are block diagrams of elements of an example MPD 1700 according to an embodiment. As illustrated in FIGS. 17A, 17B, and 17C, key attributes of the MPD may be identified by the Multicast Service Device Client or client application as the MPD is crawled to identify period and representation couples. These key elements may include the availability start time, media presentation duration, period, period start, period duration, period base URL, period segment template, adaptation set, adaptation set base URL, adaptation set segment template, representation, representation identifier, representation bandwidth, representation base URL, and representation segment template.

Figure 18:
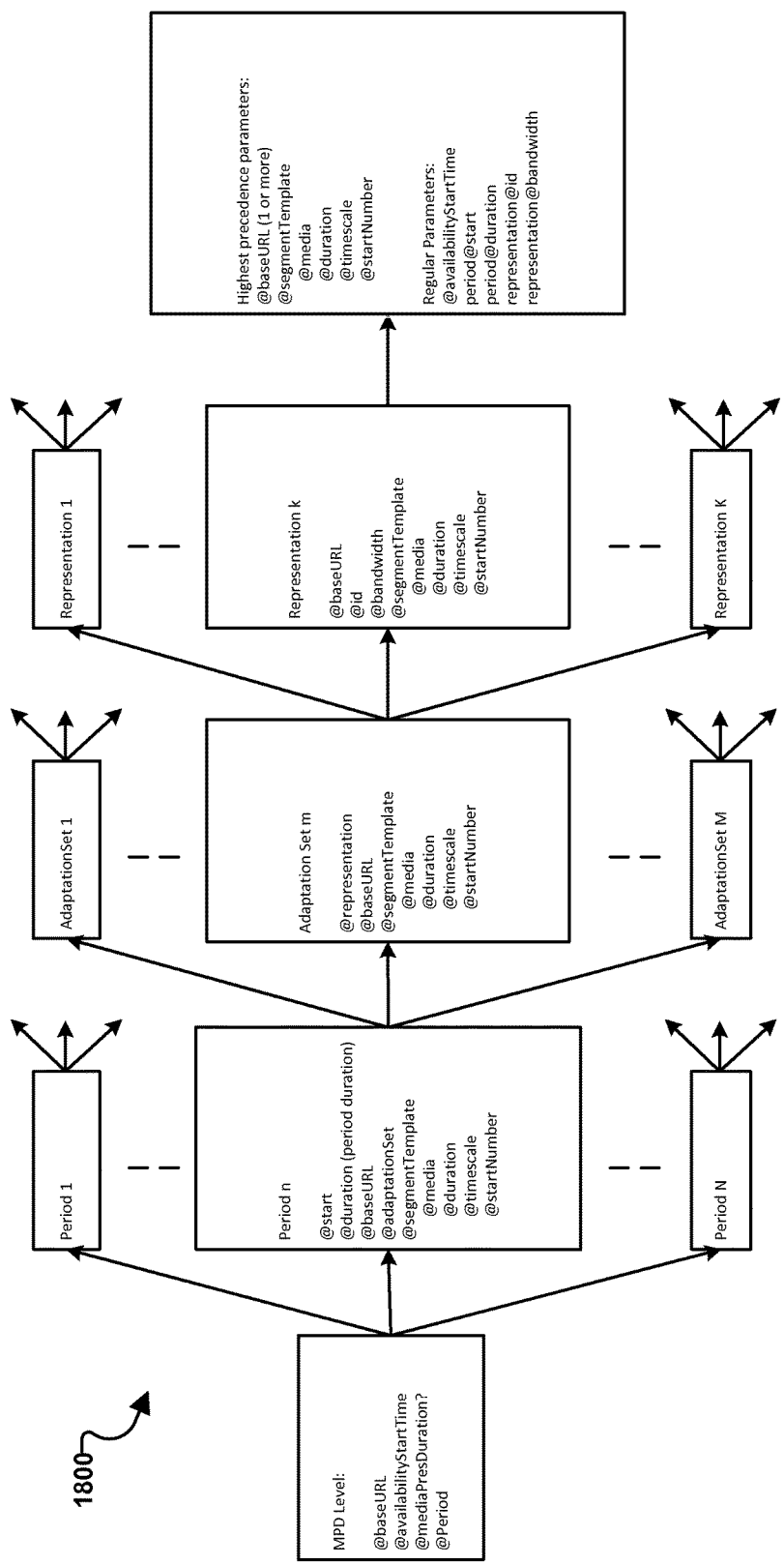
FIG. 18 is a block diagram of an XML tree of an example MPD according to an embodiment.

FIG. 18 is a block diagram of an XML tree of an example MPD 1800 according to an embodiment. As illustrated in FIG. 18, the MPD 1800 may include multiple periods, adaptation sets, and representations. In the various embodiments, the Multicast Service Device Client or client application may crawl the XML tree of the MPD 1800 sequentially along each leaf of the tree from each period to its respective adaptation sets and to each respective representation of those adaptations. The Multicast Service Device Client or client application may identify URLs as the MPD 1800 is crawled, such as base portions of URLs matching the template "xxx$number$yyy", to determine matches to the URL of a received segment.

Figure 19:
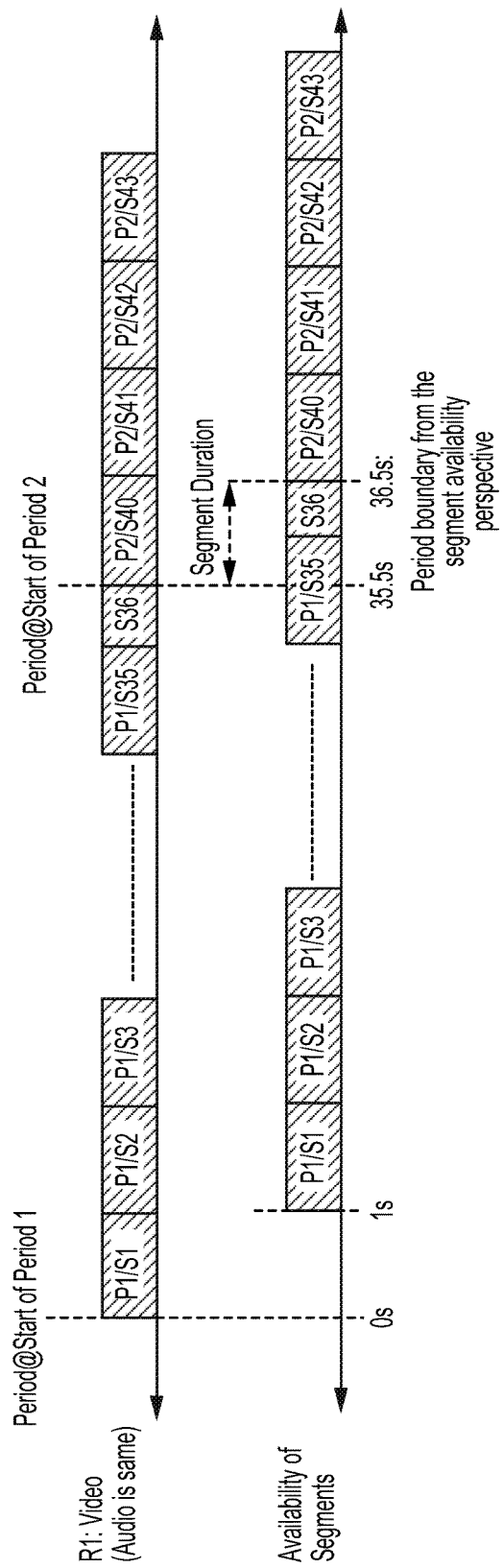
FIG. 19 illustrates availability timelines of segments according to an example.

FIG. 19 illustrates availability timelines of segments according to an example. In particular, FIG. 19 illustrates the availability start times of the segments of video service representation (R1) as listed in its associated MPD over the actual availability start times of the segments on the receiver device. As illustrated in FIG. 19 a single segment duration video service may have a first period that ends with a short duration segment of 0.5 seconds, S36. Assuming that segment S1 becomes available for period 1 at 1 second, segment S36 may become available for period 1 at 36 seconds. The availability end time of segment S36 and period 1 may then be 36.5 seconds based on the segment duration of 0.5 seconds for segment S36.

FIG. 20 is an example schema portion of a single segment duration MPD 2000 according to an embodiment showing periods 1 and 2, each with their own respective adaptation sets 1 and 2, each having their own representation 1. The MPD shows the availability start of segments per the timeline shown in FIG. 19.

Figure 21:
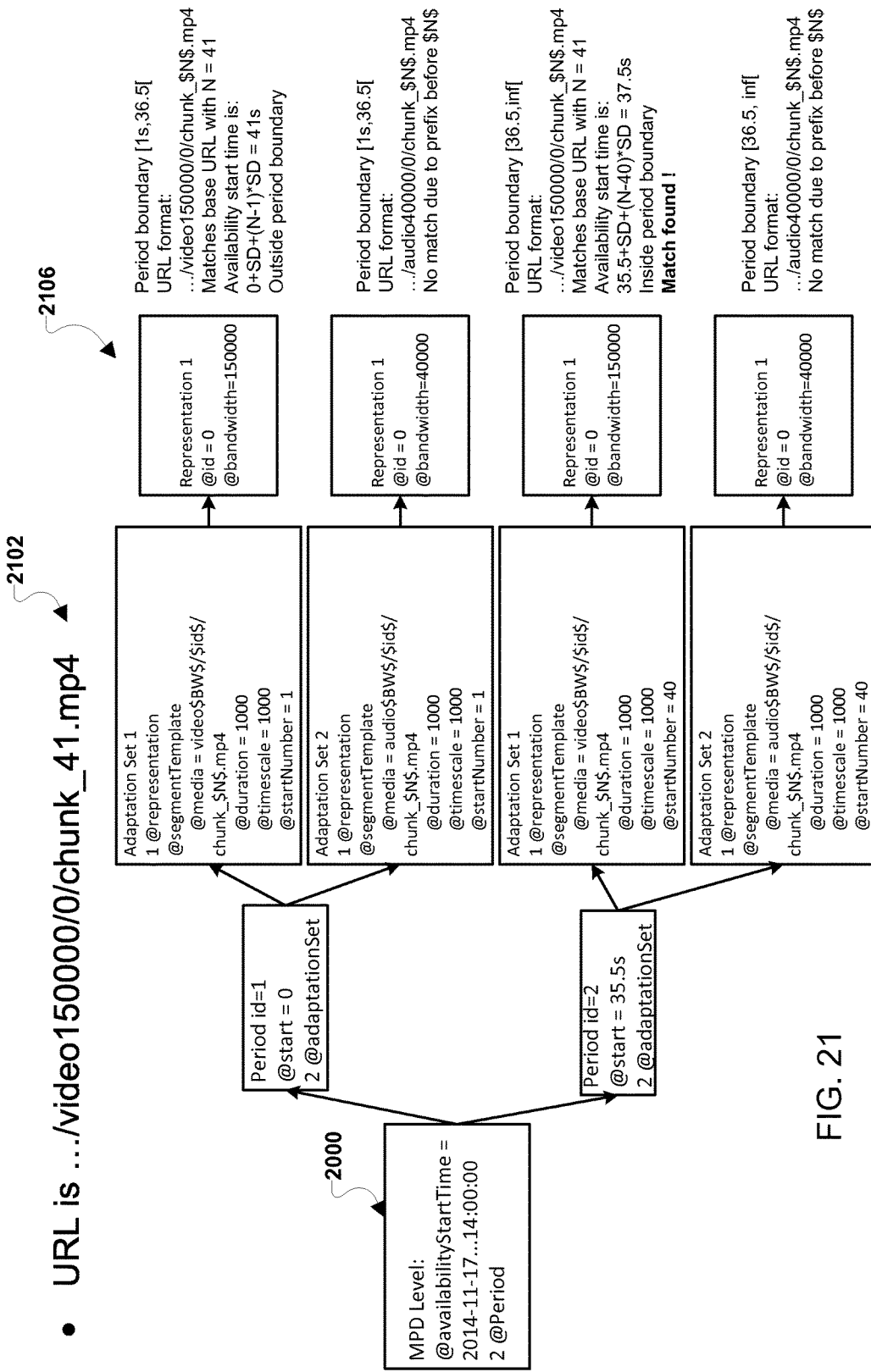
FIG. 21 is a block diagram illustrating various results of crawling an MPD and matching URLs in period and representation couples according to an embodiment.

FIG. 21 is a block diagram illustrating various results of crawling the MPD 2000 illustrated in FIG. 20 and matching URLs in period and representation couples according to an embodiment. The Multicast Service Device Client or client application may determine the URL of the received segment 2102 is "/video150000/0/chunk_41.mp4 and may attempt to match the URL 2102 to the period and representation couples 2106 to find a match. The period and representation couple for period 2 adaptation set 1 representation 1 may match the URL 2102 because the bandwidth 15000 may match and the id 0 may match the elements in the URL 2102. The availability start time of the segment may be determined as the start time of the period 35.5 s plus the segment duration of 1000 ms+the segment index N=41−the starting segment number 40, such that the availability start time may be 37.5 seconds which may be inside the period boundary of 36.5 seconds to infinity. Thus the match may be valid and the segment index for the received segment may be confirmed to be 41.

Figure 22:
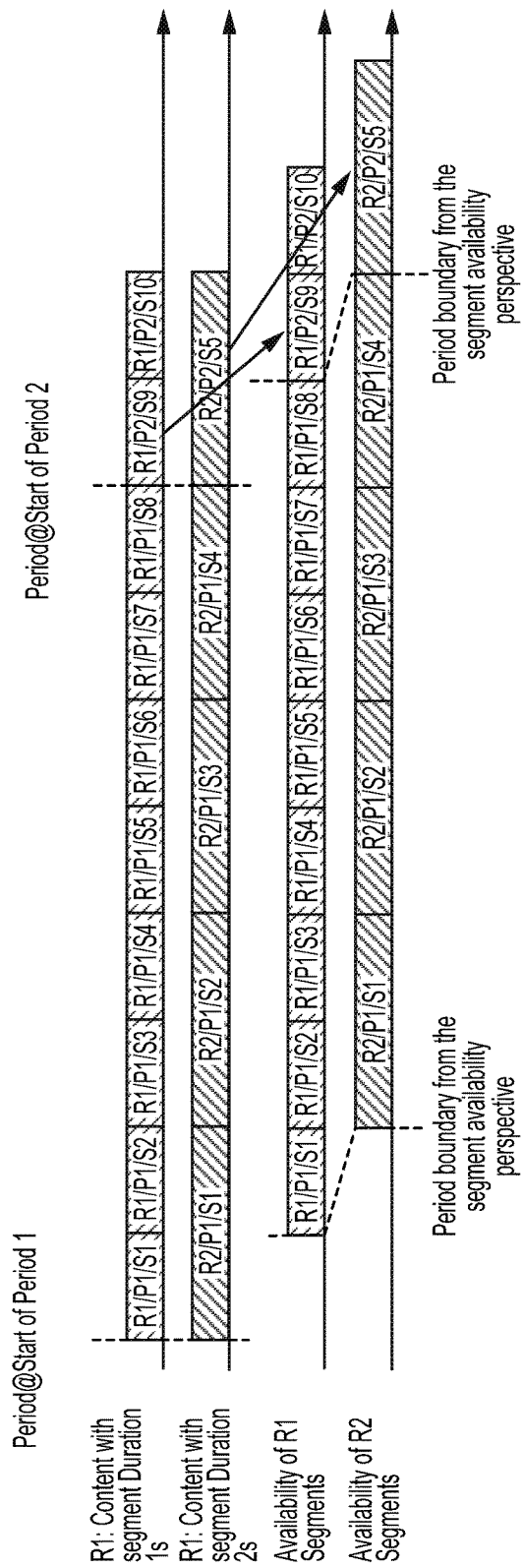
FIG. 22 illustrates availability timelines of segments according to an embodiment.

FIG. 22 illustrates availability timelines of segments according to an embodiment in which multiple segment durations may be described in the MPD. The content may have two representations, a first representation (R1) with a segment duration of 1 second and a second representation (R2) with a segment duration of 2 seconds. In particular, FIG. 22 illustrates the availability start times of the segments of representations R1 and R2 as listed in its associated MPD over the actual availability start times of the segments on the receiver device. As illustrated in FIG. 22 the availability start time of the first segment of a representation R1 or R2 depends on the segment duration for the representation to which that segment may belong. One of these representations may be expected to be broadcast at any given time in one service area.

FIG. 23 is an example schema portion of a two segment duration MPD 2300 according to an embodiment showing periods 1 and 2, each with their own respective adaptation sets 1 each having two representations 0 and 1 with different segment durations, 1 second and 2 seconds, respectively. The example MPD corresponds to the timeline shown in FIG. 22.

Figure 24:
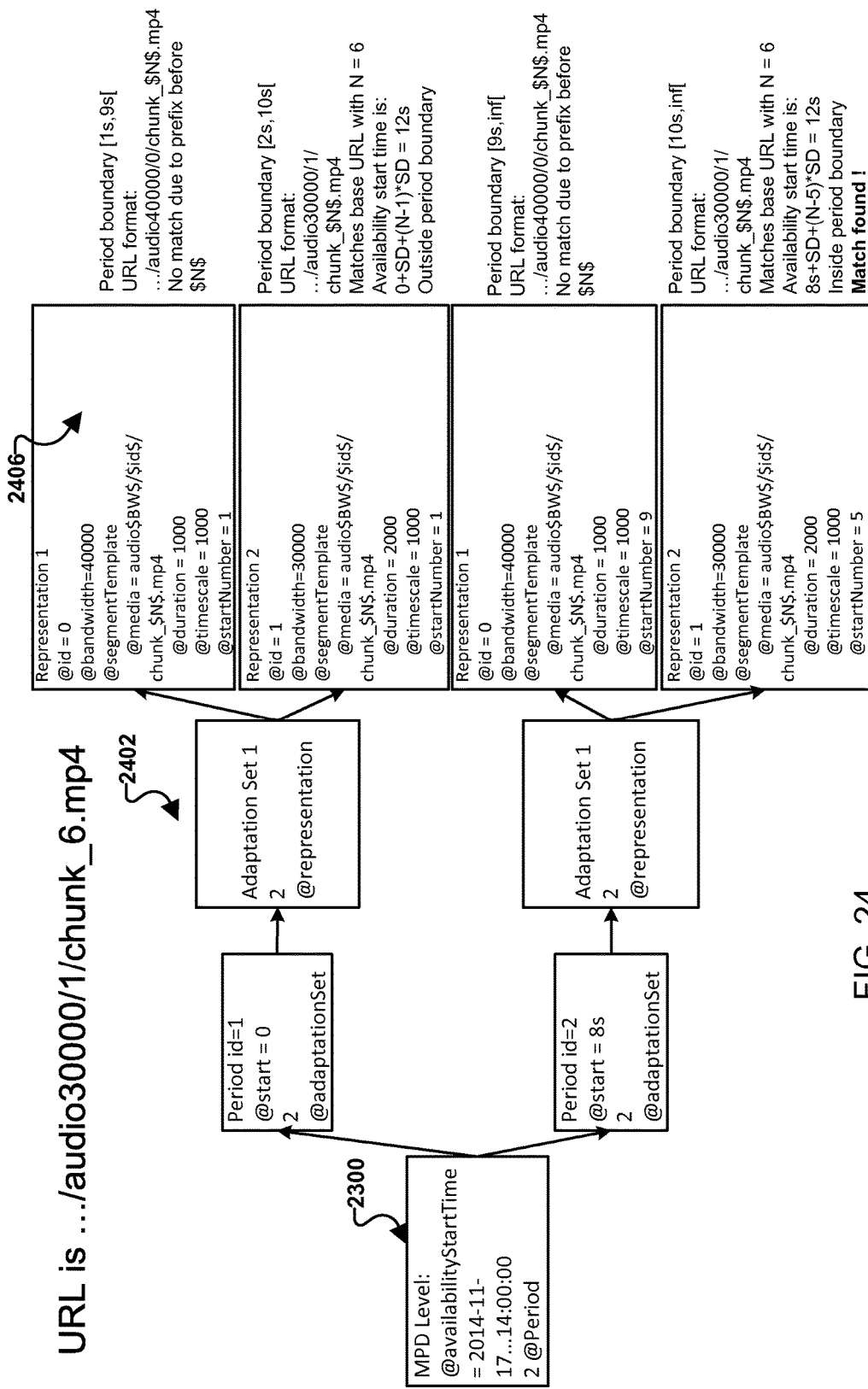
FIG. 24 is a block diagram illustrating various results of crawling an MPD and matching URLs in period and representation couples according to another embodiment.

FIG. 24 is a block diagram illustrating various results of crawling the MPD 2300 illustrated in FIG. 23 and matching URLs in period and representation couples according to an embodiment. The Multicast Service Device Client or client application may determine the URL of the received segment 2402 is "/audio30000/1/chunk_6.mp4 and may attempt to match the URL 2402 to the period and representation couples 2406 to find a match. The period and representation couple for period 2 adaptation set 1 representation 2 may match the URL 2402 because the bandwidth 30000 may match and the id 1 may match the elements in the URL 2402. The availability start time of the segment may be determined as the start time of the period 8 s plus the segment duration of 2000 ms+the segment index N=6−the starting segment number 5, such that the availability start time may be 12 seconds which may be inside the period boundary of 10 seconds to infinity. Thus, the match may be valid and the segment index for the received segment may be confirmed to be 6.

Figure 25:
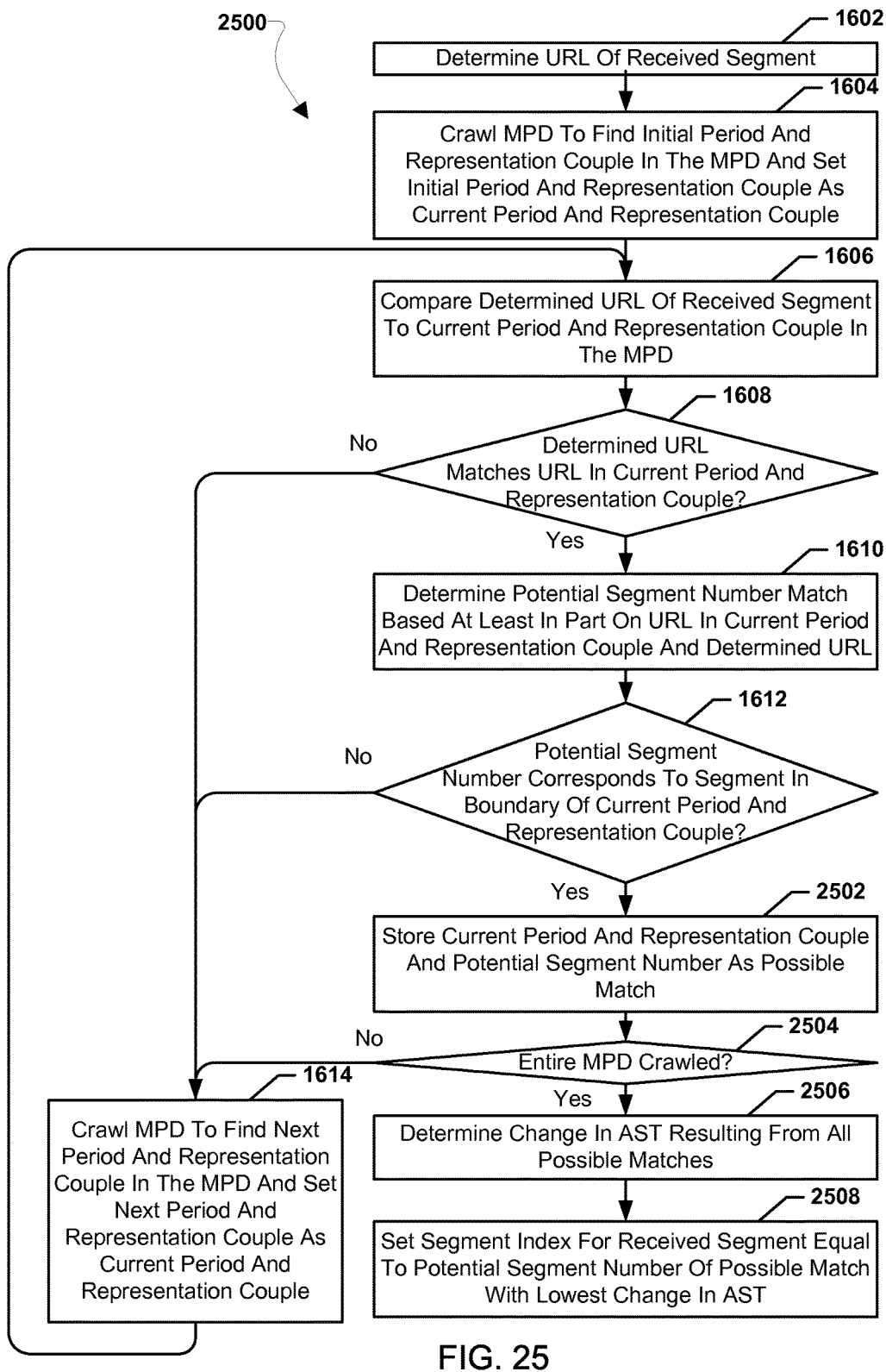
FIG. 25 is a process flow diagram illustrating another embodiment method for determining a segment index by URL matching.
Figure 26:
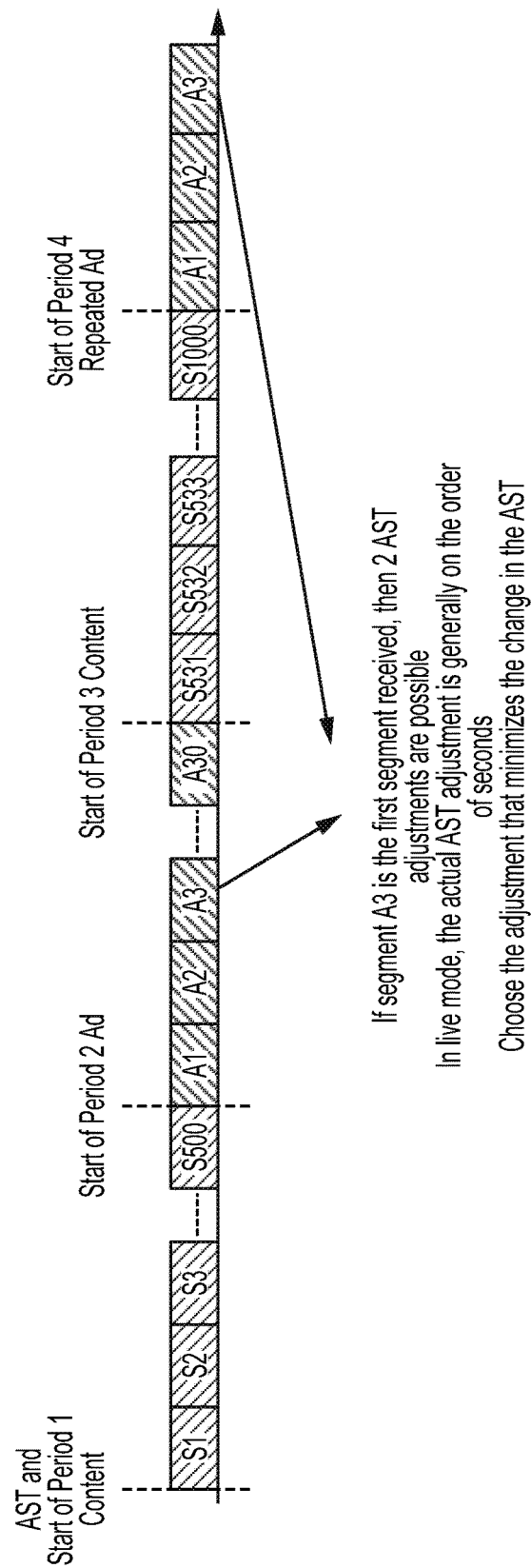
FIG. 26 illustrates an availability timeline of repeating segments according to an embodiment.

FIG. 25 illustrates an embodiment method 2500 for determining a segment index by URL matching when more than one period and representation couple may match the URL of the segment and have a valid boundary for the segment. For example, as illustrated in the availability timeline of FIG. 26, some services may include repeating segments, such as advertisements, and when a repeating segment, such as A3 is received, the segment URL may match the URL of more than one period and representation couple with a valid period. To select the best candidate matching period and representation couple, the operations of method 2500 may enable the Multicast Service Device Client or client application to select the segment number as the segment number corresponding to the period and representation couple resulting in the lowest AST change. In an embodiment, the operations of the method 2500 may be performed by a Multicast Service Device Client running on a processor of a receiver device, such as a smart phone. In another embodiment, the operations of the method 2500 may be performed by a client application, such as a DASH client, running on a processor of a receiver device. In various embodiments, the operations of the method 2500 may be performed in conjunction with the operations of the methods 500a or 500b described above with reference to FIGS. 5A and 5B, respectively. For example, the operations of method 2500 may be performed after receiving an MPD (block 502 of FIG. 5A or 5B) and the segment fragment (block 504 of FIG. 5A or 5B) and before determining whether a segment index change occurred (block 506 of FIG. 5A or 5B).

In blocks 1602-1612 the Multicast Service Device Client or client application may perform operations of like numbered blocks of the method 1600 described above with reference to FIG. 16. In response to determining that a potential segment number is in the segment boundary of the current period and representation couple (i.e., determination block 1612="Yes"), the Multicast Service Device Client or client application may store the current period and representation couple and potential segment number as a possible match in block 2502.

In determination block 2504 the Multicast Service Device Client or client application may determine whether the entire MPD has been crawled. In response to determining the entire MPD has not been crawled (i.e., determination block 2504="No"), the Multicast Service Device Client or client application may crawl the MPD to find a next period and representation couple in the MPD and set the next period and representation couple as the current period and representation couple in block 1614.

In response to determining the entire MPD has been crawled (i.e., determination block 2504="Yes"), the Multicast Service Device Client or client application may determine an AST change resulting from all possible stored matches in block 2506. For example, the Multicast Service Device Client or client application may calculate an AST resulting from the reception of the segment. The AST resulting from the reception of the segment may be calculated in any manner, such as based on the methods described above with reference to any of FIGS. 5A-15B or any other method. For example, once a segment index change has occurred, the method 2500 may apply the procedures in FIG. 5A or 5B to determine the MPD timeline modifications as part of block 2506. The Multicast Service Device Client or client application may then subtract the original ASTs for each possible stored match from the calculated AST resulting from the reception of the segment to determine an AST change resulting for each possible stored match.

In block 2508 the Multicast Service Device Client or client application may set the segment index for the received segment equal to the potential segment number of the possible match with the lowest change in AST. For example, by comparing the determined AST changes for each individual possible stored match together, the lowest determined AST change may be identified, and the segment index for the received segment may be the segment index associated with the possible match with the identified lowest determined AST change. In this manner, in block 2508 the Multicast Service Device Client or client application may select the MPD timeline adjustment that results in the smaller time modification to the existing timeline in the MPD (e.g. the one that results in the smallest AST change). In an embodiment, the Multicast Service Device Client or client application may store the delay adjustment resulting in the smallest change in the availability start time (i.e., smallest availability start time change).

Figure 27:
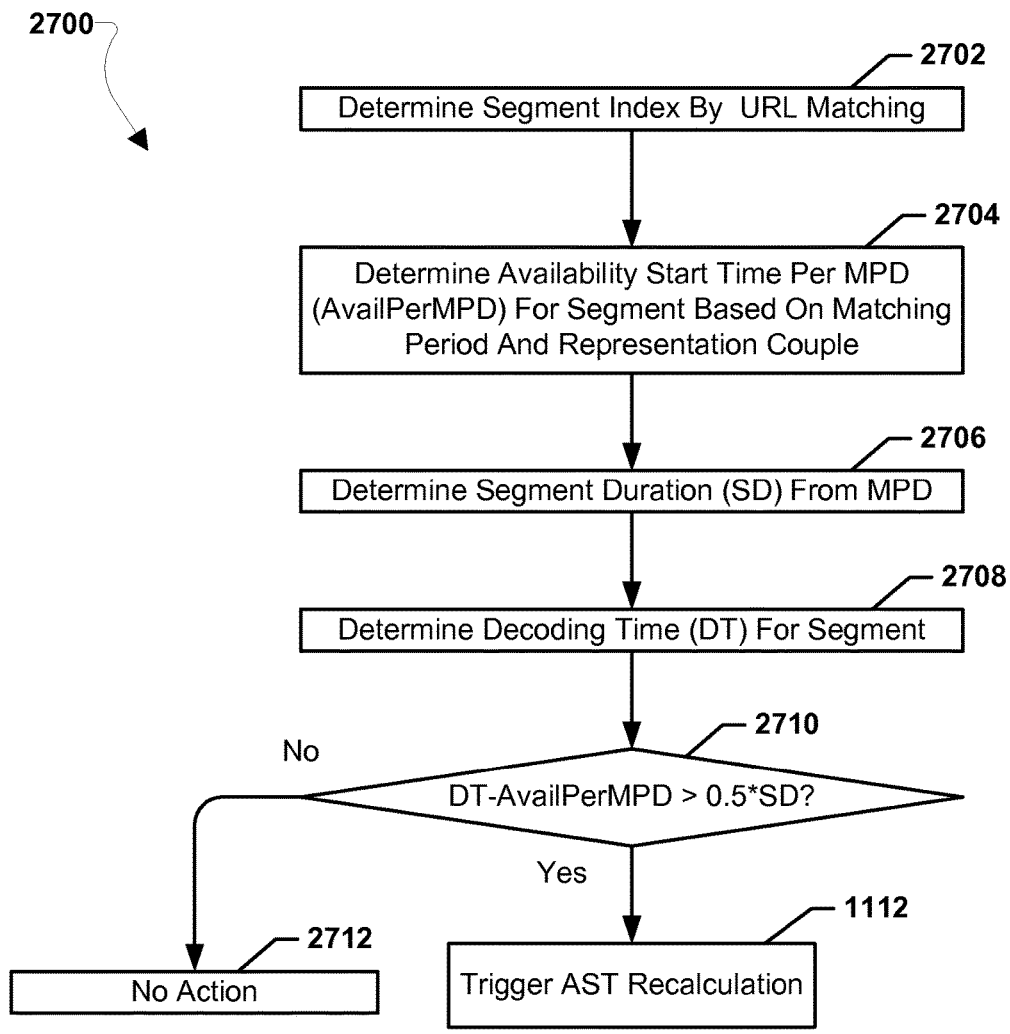
FIG. 27 is a process flow diagram illustrating an embodiment method for accounting for receiver device timing drift based on URL matching.

FIG. 27 illustrates an embodiment method 2700 for accounting for receiver device timing drift based on URL matching. In an embodiment, the operations of the method 2700 may be performed by a Multicast Service Device Client running on a processor of a receiver device, such as a smart phone. In another embodiment, the operations of the method 2700 may be performed by a client application, such as a DASH client, running on a processor of a receiver device.

In block 2702, the Multicast Service Device Client or client application may determine the segment index of a received segment by URL matching. For example, the Multicast Service Device Client or client application may perform operations of the methods 1600 or 2500 described above with reference to FIGS. 16 and 25, respectively, to determine the segment index by URL matching.

In block 2704 the Multicast Service Device Client or client application may determine an availability start time per the MPD (AvailPerMPD) for the segment with the determined segment index based on the matching period and representation couple. In block 2706 the Multicast Service Device Client or client application may determine a segment duration (SD) from the MPD. In block 2708 the Multicast Service Device Client or client application may determine a decoding time (DT) for the segment. The decoding time (DT) may be the time at which the segment actually became available on the receiver device.

In determination block 2710 the Multicast Service Device Client or client application may determine whether the decoding time (DT) minus the availability start time per the MPD (AvailPerMPD) is greater than 0.5 times the segment duration (SD). While illustrated as half a segment duration (e.g., 0.5*SD), determining whether the decoding time (DT) minus the availability start time per the MPD (AvailPerMPD) is greater than 0.5 times the segment duration (SD) is merely one example comparison of a threshold to which the difference between the decoding time (DT) and the availability start time per the MPD (AvailPerMPD) may be compared. Other thresholds, including fixed value thresholds or thresholds set as fractions of the segment duration, such as 0.1*SD, 0.6*SD, 0.9*SD, or any other fraction of the segment duration, may be a substituted for the 0.5 times the segment duration (SD) threshold discussed herein. In response to determining DT-AvailPerMPD is greater than or equal to 0.5*SD (i.e., determination block 2710="No"), the Multicast Service Device Client or client application may determine no timing drift has occurred and may take no action in block 2712. The factor (such as 0.5) may be provisioned on the device or received as part of configuration file broadcast by the network.

In response to determining DT-AvailPerMPD is greater than 0.5*SD (i.e., determination block 2710="Yes"), the Multicast Service Device Client or client application may determine timing drift has occurred and trigger recalculation of the availability start time in block 1112 as described above with reference to FIG. 11B. The Multicast Service Device Client or client application may also notify the application that the MPD has been modified.

Figure 28:
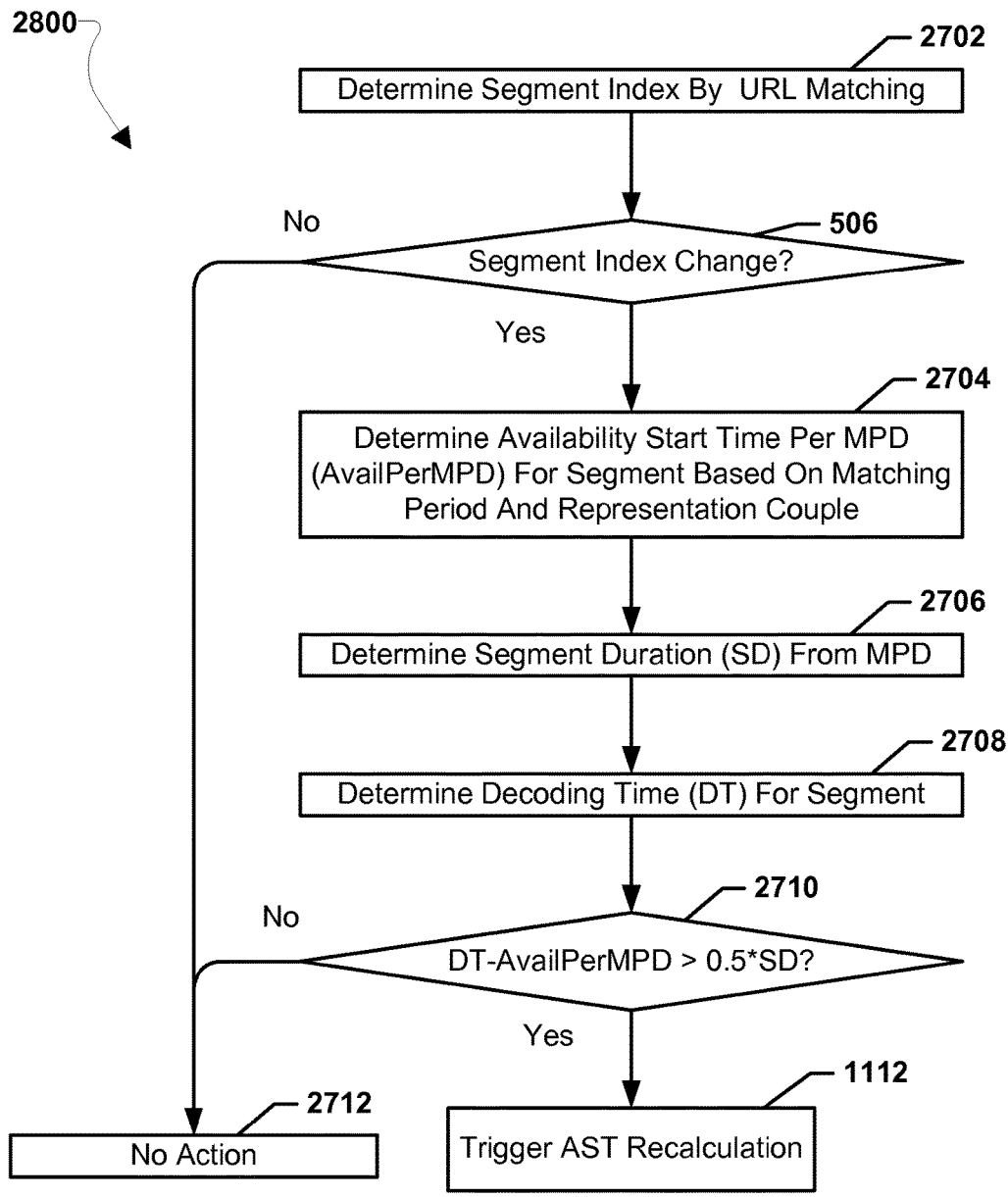
FIG. 28 is a process flow diagram illustrating another embodiment method for accounting for receiver device timing drift based on URL matching.

FIG. 28 illustrates an embodiment method 2800 for accounting for receiver device timing drift based on URL matching. The method 2800 is similar to the method 2700 described above with reference to FIG. 27, except that recalculation of the availability start time may be triggered in response to a segment index change. In an embodiment, the operations of the method 2800 may be performed by a Multicast Service Device Client running on a processor of a receiver device, such as a smart phone. In another embodiment, the operations of the method 2800 may be performed by a client application, such as a DASH client, running on a processor of a receiver device.

In block 2702 the Multicast Service Device Client or client application may perform operations of like numbered block of the method 2700 described above with reference to FIG. 27. In determination block 506 the Multicast Service Device Client or client application may determine whether a segment index change has occurred as described above with reference to FIG. 5A. In response to determining a segment index has not changed (i.e., determination block 506="No"), the Multicast Service Device Client or client application may take no action in block 2712 as described above with reference to FIG. 27.

In response to determining a segment index has changed (i.e., determination block 506="Yes"), the Multicast Service Device Client or client application may perform operations in blocks 2704, 2706, 2708, 2710, 2712, and 1112 of like numbered blocks of the method 2700 described above with reference to FIG. 27.

Figure 29:
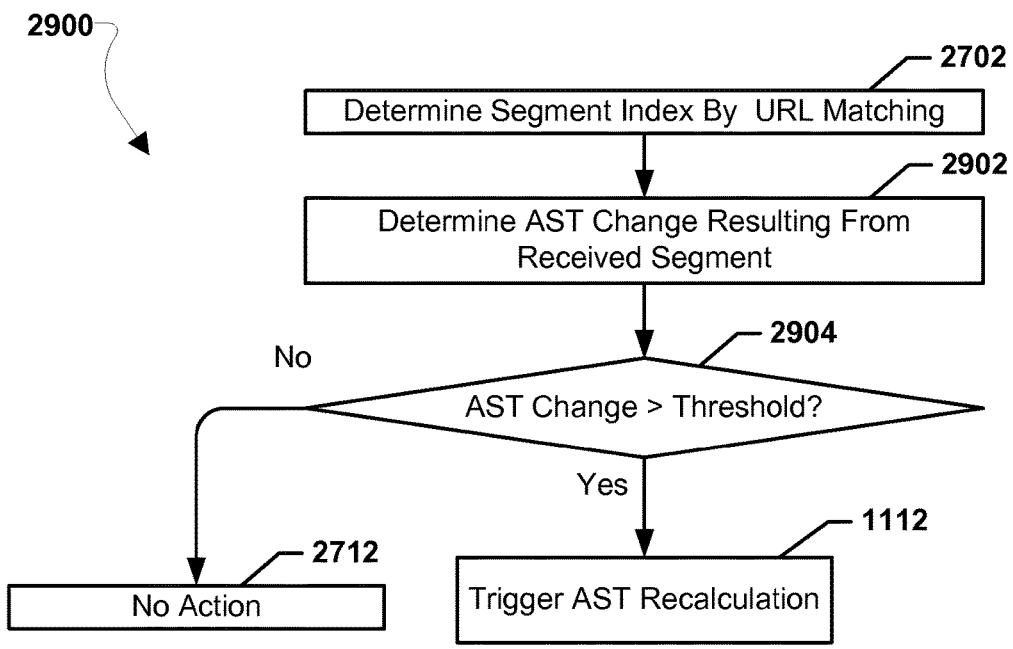
FIG. 29 is a process flow diagram illustrating a third embodiment method for accounting for receiver device timing drift based on URL matching.

FIG. 29 illustrates an embodiment method 2900 for accounting for receiver device timing drift based on URL matching. The method 2900 is similar to the method 2700 described above with reference to FIG. 27, except that an availability start time recalculation may be triggered in response to determining an AST change would be above a threshold, such as one segment duration. In an embodiment, the operations of the method 2900 may be performed by a Multicast Service Device Client running on a processor of a receiver device, such as a smart phone. In another embodiment, the operations of the method 2900 may be performed by a client application, such as a DASH client, running on a processor of a receiver device.

In block 2702 the Multicast Service Device Client or client application may perform operations of like numbered block of the method 2700 described above with reference to FIG. 27.

In block 2902 the Multicast Service Device Client or client application may determine an AST change resulting from the received segment. For example, the Multicast Service Device Client or client application may calculate an AST resulting from the reception of the segment. The AST resulting from the reception of the segment may be calculated in any manner, such as based on the methods described above with reference to any of FIGS. 5A-15B or any other method. The Multicast Service Device Client or client application may then subtract the original AST for the segment from the calculated AST resulting from the reception of the segment to determine an AST change resulting from the segment.

In determination block 2904 the processor may determine whether the AST change is greater than a threshold. The threshold may be a value stored in a memory of the receiver device, and may be any value (pre-provisioned, user definable, defined in the MPD, etc.), such as equal to a segment duration, less than one segment duration, greater than one segment duration, etc. In response to determining the AST change is less than or equal to the threshold (i.e., determination block 2904="No"), the Multicast Service Device Client or client application may take no action in block 2712 as described above with reference to FIG. 27. In response to determining the AST change is greater than the threshold (i.e., determination block 2904="Yes"), the Multicast Service Device Client or client application may trigger an availability start time recalculation in block 1112 as described above with reference to FIG. 27.

In various embodiments, the operations of methods 2700, 2800, and 2900 described above with reference to FIGS. 27, 28, and 29, respectively, may be applied periodically at constant time intervals, or constant segment count intervals.

Figure 30:
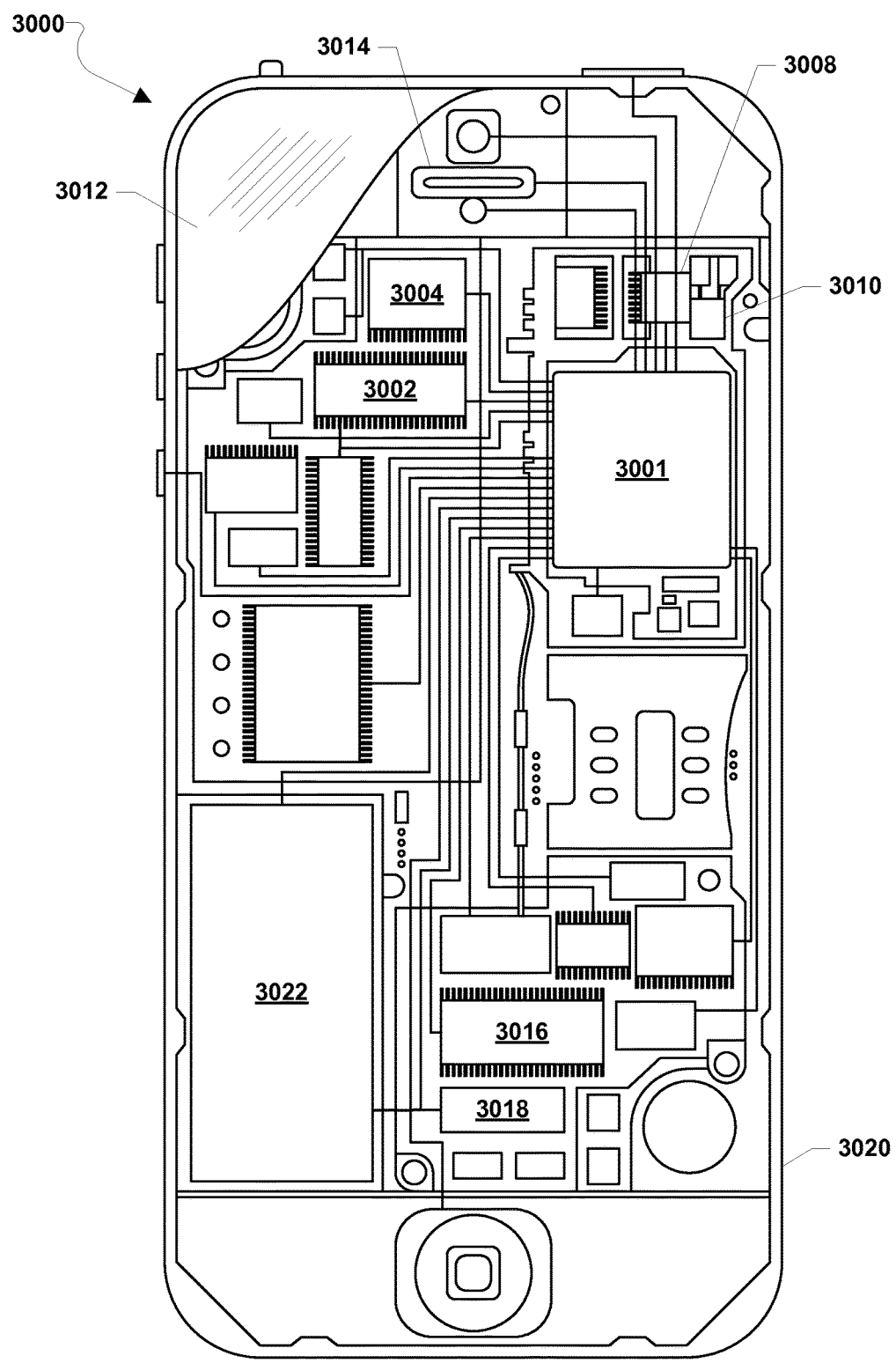
FIG. 30 is a component diagram of an example mobile device suitable for use with the various embodiments.

The various embodiments (including, but not limited to, embodiments discussed above with reference to FIGS. 3A-29) may be implemented in any of a variety of mobile devices (i.e., receiver devices), an example of which is illustrated in FIG. 30. For example, the mobile device 3000 may include a processor 3001 coupled to a touch screen controller 3004 and an internal memory 3002. The processor 3001 may be one or more multicore integrated circuits (ICs) designated for general or specific processing tasks. The internal memory 3002 may be volatile or non-volatile memory, and may also be secure and/or encrypted memory, or unsecure and/or unencrypted memory, or any combination thereof. The touch screen controller 3004 and the processor 3001 may also be coupled to a touch screen panel 3012, such as a resistive-sensing touch screen, capacitive-sensing touch screen, infrared sensing touch screen, etc. The mobile computing device 3000 may have one or more radio signal transceivers 3008 (e.g., Peanut®, Bluetooth®, Zigbee®, Wi-Fi, RF, cellular, etc.) and antennae 3010, for sending and receiving, coupled to each other and/or to the processor 3001. The transceivers 3008 and antennae 3010 may be used with the above-mentioned circuitry to implement the various wireless transmission protocol stacks and interfaces. The mobile computing device 3000 may include a cellular network wireless modem chip 3016 that enables communication via a cellular network and is coupled to the processor. The mobile computing device 3000 may include a peripheral device connection interface 3018 coupled to the processor 3001. The peripheral device connection interface 3018 may be singularly configured to accept one type of connection, or multiply configured to accept various types of physical and communication connections, common or proprietary, such as USB, FireWire, Thunderbolt, or PCIe. The peripheral device connection interface 3018 may also be coupled to a similarly configured peripheral device connection port (not shown). The mobile computing device 3000 may also include speakers 3014 for providing audio outputs. The mobile computing device 3000 may also include a housing 3020, constructed of a plastic, metal, or a combination of materials, for containing all or some of the components discussed herein. The mobile computing device 3000 may include a power source 3022 coupled to the processor 3001, such as a disposable or rechargeable battery. The rechargeable battery may also be coupled to the peripheral device connection port to receive a charging current from a source external to the mobile computing device 3000.

Figure 31:
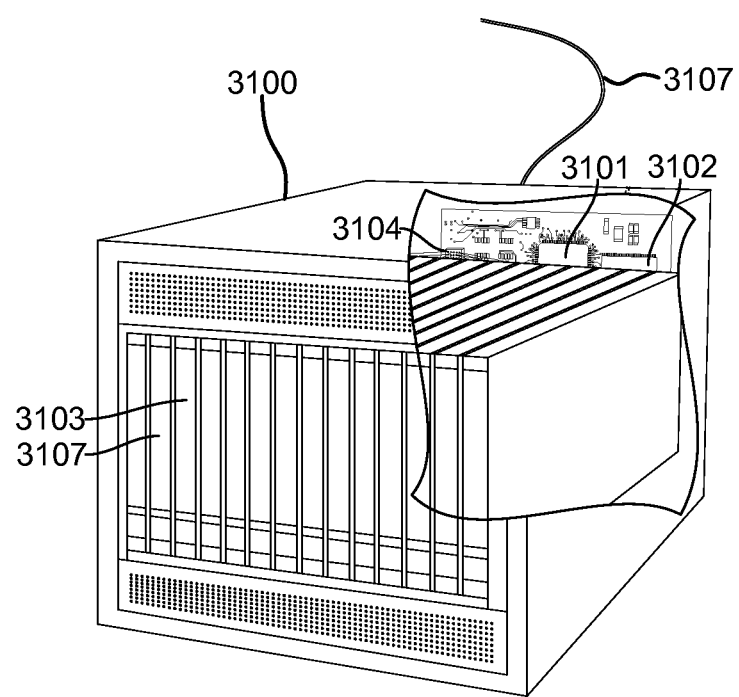
FIG. 31 is a component diagram of an example server suitable for use with the various embodiments.

The various embodiments (including, but not limited to, embodiments discussed above with reference to FIGS. 3A-29) may also be implemented on any of a variety of commercially available server devices, such as the server 3100 illustrated in FIG. 31. Such a server 3100 typically includes a processor 3101 coupled to volatile memory 3102 and a large capacity nonvolatile memory, such as a disk drive 3104. The server 3100 may also include a floppy disc drive, compact disc (CD) or DVD disc drive 3106 coupled to the processor 3101. The server 3100 may also include one or more network transceivers 3103, such as a network access port, coupled to the processor 3101 for establishing network interface connections with a communication network 3107, such as a local area network coupled to other announcement system computers and servers, the Internet, the public switched telephone network, and/or a cellular network (e.g., CDMA, TDMA, GSM, PCS, 3G, 4G, LTE, or any other type of cellular network).

The processors 3001 and 3101 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 3001 and 3101. The processors 3001 and 3101 may include internal memory sufficient to store the application software instructions. In many devices the internal memory may be a volatile or nonvolatile memory, such as flash memory, or a mixture of both. For the purposes of this description, a general reference to memory refers to memory accessible by the processors 3001 and 3101 including internal memory or removable memory plugged into the device and memory within the processors 3001 and 3101 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for accounting for actual times when segments will be available on a receiver device, comprising:
   determining whether a segment index change or a baseURL change occurs between two received segment fragments at the receiver device;
   setting a latest segment indicated by the segment index change as a base segment in response to determining that the segment index change or the baseURL change occurred;
   determining a receipt time of a transmission associated with a base segment;
   determining an adjusted availability start time of the base segment at the receiver device based at least in part on the receipt time of the transmission associated with the base segment;
   determining a delay adjustment at the receiver device as a difference between the adjusted availability start time of the base segment and an availability start time of the base segment in a segment availability timeline received at the receiver device; and
   storing the delay adjustment in a memory of the receiver device.

2. The method of claim 1,
   wherein:
     determining a receipt time of a transmission associated with the base segment comprises determining a receipt time for a first packet for the base segment; and
     determining an adjusted availability start time of the base segment at the receiver device based at least in part on the receipt time of the transmission associated with the base segment comprises determining an adjusted availability start time of the base segment at the receiver device based at least in part on the receipt time of the first packet for the base segment.

3. The method of claim 2, wherein:
   determining a receipt time for a first packet for the base segment comprises determining a receipt time for a first file delivery table (FDT) for the base segment; and determining an adjusted availability start time of the base segment at the receiver device based at least in part on the receipt time of the first packet for the base segment comprises determining an adjusted availability start time of the base segment at the receiver device based at least in part on the receipt time of the first FDT for the base segment.

4. The method of claim 3, wherein determining whether a segment index change occurs between two received segment fragments at the receiver device comprises determining whether a segment index change occurs between two received segment fragments at the receiver device based at least in part on identifying a segment index at an end of a segment Uniform Resource Locator (URL)) preceded by at least a non-numeric character.

5. The method of claim 4, wherein the end of the segment URL is preceded by at least a non-numeric character followed by a file extension.

6. The method of claim 3, wherein determining whether a segment index change occurs between two received segment fragments at the receiver device comprises determining a segment index based at least in part on Uniform Resource Locator (URL)) matching to a segment template.

7. The method of claim 6, wherein URL matching to the segment template comprises determining whether a URL for a received segment matches a URL in a period and representation couple in a manifest file describing segment availability.

8. The method of claim 7, wherein the manifest file describing the segment availability is a segment availability timeline.

9. The method of claim 7, further comprising:
determining whether a potential segment number for the received segment corresponds to a boundary of the period and representation couple; and
setting the segment index equal to the potential segment number in response to determining that the potential segment number for the received segment corresponds to the boundary of the period and representation couple.

10. The method of claim 6, further comprising:
determining whether a URL for a received segment matches any URLs in a plurality of period and representation couples in the segment availability timeline;
determining whether a plurality of potential segment number matches for the received segment correspond to boundaries of the plurality of period and representation couples with URLs matching the URL for the received segment in response to determining that the URL for the received segment matches any URLs in the plurality of period and representation couples; and
determining availability start time changes resulting from each of the plurality of potential segment number matches for the received segment corresponding to the boundaries of the plurality of period and representation couples with URLs matching the URL of the received segment in response to determining that the plurality of potential segment number matches for the received segment correspond to boundaries of the plurality of period and representation couples with URLs matching the URL of the received segment.

11. The method of claim 10, further comprising storing the delay adjustment resulting in the smallest availability start time change.

12. The method of claim 10, further comprising setting the segment index equal to a potential segment number with a lowest determined availability start time change.

13. The method of claim 1,
wherein:
determining a receipt time of a transmission associated with the base segment comprises determining a receipt time of a first packet of an object corresponding to the base segment as described in a first file delivery table (FDT) for the base segment; and
determining an adjusted availability start time of the base segment at the receiver device based at least in part on the receipt time of the transmission associated with the base segment comprises determining an adjusted availability start time of the base segment at the receiver device based at least in part on the receipt time of a first packet of an object corresponding to the base segment.

14. The method of claim 1,
wherein:
determining a receipt time of a transmission associated with the base segment comprises determining a receipt time for a first file delivery table (FDT) for the base segment; and
determining an adjusted availability start time of the base segment at the receiver device based at least in part on the receipt time of the transmission associated with the base segment comprises determining an adjusted availability start time of the base segment at the receiver device based at least in part on the receipt time of the first FDT for the base segment.

15. The method of claim 14, wherein the first FDT for the base segment is a File Delivery Over Unidirectional Transport (FLUTE) FDT.

16. The method of claim 14, wherein determining an adjusted availability start time of the base segment at the receiver device based at least in part on the receipt time of the first FDT for the base segment comprises determining an adjusted availability start time of the base segment at the receiver device as the receipt time of the first FDT plus a number of segment fragments per segment multiplied times a Multicast Channel (MCH) scheduling period plus a margin.

17. The method of claim 1, wherein the segment availability timeline is a Dynamic Adaptive Streaming Over Hypertext Transfer Protocol (DASH) Media Presentation Description (MPD).

18. A method for accounting for actual times when segments will be available on a receiver device, comprising:
determining whether unicast fetch is active on a receiver device;
receiving a file delivery table (FDT) via broadcast or multicast transmission on the receiver device;
setting a segment associated with the received FDT as a base segment in response to receiving the FDT;
determining a receipt time for the received FDT for the base segment;
determining an adjusted availability start time of the base segment at the receiver device as the receipt time of the received FDT plus a number of segment fragments per segment multiplied times a Multicast Channel (MCH) scheduling period plus a margin;
determining a delay adjustment at the receiver device as a difference between the adjusted availability start time of the base segment and an availability start time of the base segment in a segment availability timeline received at the receiver device; and
storing the delay adjustment in a memory of the receiver device.

19. The method of claim 18, wherein:
the received FDT is a first FDT for the base segment, a last FDT for the base segment, or an intermediate FDT for the base segment; and
the received FDT is a File Delivery Over Unidirectional Transport (FLUTE) FDT.

20. The method of claim 18, further comprising requesting the base segment or any previous segment indicated in the segment availability timeline via unicast.

21. A receiver device, comprising:
a memory; and
a processor coupled to the memory and configured with processor-executable instructions to perform operations comprising:
determining whether a segment index change or a baseURL change occurs between two received segment fragments at the receiver device;
setting a latest segment indicated by the segment index change as a base segment in response to determining that the segment index change or the baseURL change occurred;
determining a receipt time of a transmission associated with a base segment;
determining an adjusted availability start time of the base segment at the receiver device based at least in part on the receipt time of the transmission associated with the base segment;
determining a delay adjustment at the receiver device as a difference between the adjusted availability start time of the base segment and an availability start time of the base segment in a segment availability timeline received at the receiver device; and
storing the delay adjustment in the memory.

22. The receiver device of claim 21,
wherein the processor is configured with processor-executable instructions to perform operations such that:
determining a receipt time of a transmission associated with the base segment comprises determining a receipt time for a first file delivery table (FDT) for the base segment; and
determining an adjusted availability start time of the base segment at the receiver device based at least in part on the receipt time of the transmission associated with the base segment comprises determining an adjusted availability start time of the base segment at the receiver device based at least in part on the receipt time of the first FDT for the base segment.

23. The receiver device of claim 22, wherein the processor is configured with processor-executable instructions to perform operations such that determining whether a segment index change occurs between two received segment fragments at the receiver device comprises determining whether a segment index change occurs between two received segment fragments at the receiver device based at least in part on identifying a segment index at an end of a segment URL preceded by at least a non-numeric character,
wherein the end of the segment URL is preceded by at least a non-numeric character followed by a file extension.

24. The receiver device of claim 22, wherein the processor is configured with processor-executable instructions to perform operations such that determining whether a segment index change occurs between two received segment fragments at the receiver device comprises determining a segment index based at least in part on URL matching to a segment template.

25. The receiver device of claim 21,
wherein the processor is configured with processor-executable instructions to perform operations such that:
determining a receipt time of a transmission associated with the base segment comprises determining a receipt time of a first packet of an object corresponding to the base segment as described in a first file delivery table (FDT) for the base segment; and
determining an adjusted availability start time of the base segment at the receiver device based at least in part on the receipt time of the transmission associated with the base segment comprises determining an adjusted availability start time of the base segment at the receiver device based at least in part on the receipt time of a first packet of an object corresponding to the base segment.

26. The receiver device of claim 21,
wherein the processor is configured with processor-executable instructions to perform operations such that:
determining a receipt time of a transmission associated with the base segment comprises determining a receipt time for a first file delivery table (FDT) for the base segment; and
determining an adjusted availability start time of the base segment at the receiver device based at least in part on the receipt time of the transmission associated with the base segment comprises determining an adjusted availability start time of the base segment at the receiver device based at least in part on the receipt time of the first FDT for the base segment.

27. The receiver device of claim 26, wherein the first FDT for the base segment is a File Delivery Over Unidirectional Transport (FLUTE) FDT.

28. A receiver device, comprising:
a memory; and
a processor coupled to the memory and configured with processor-executable instructions to perform operations comprising:
determining whether unicast fetch is active on a receiver device;
receiving a file delivery table (FDT) via broadcast or multicast transmission on the receiver device;
setting a segment associated with the received FDT as a base segment in response to receiving the FDT;
determining a receipt time for the received FDT for the base segment;
determining an adjusted availability start time of the base segment at the receiver device as the receipt time of the received FDT plus a number of segment fragments per segment multiplied times a Multicast Channel (MCH) scheduling period plus a margin;
determining a delay adjustment at the receiver device as a difference between the adjusted availability start time of the base segment and an availability start time of the base segment in a segment availability timeline received at the receiver device; and
storing the delay adjustment in the memory.

29. The receiver device of claim 28, wherein:
the received FDT is a first FDT for the base segment, a last FDT for the base segment, or an intermediate FDT for the base segment; and
the received FDT is a File Delivery Over Unidirectional Transport (FLUTE) FDT.

* * * * *